(12) United States Patent
Horiguchi et al.

(10) Patent No.: US 9,114,731 B2
(45) Date of Patent: Aug. 25, 2015

(54) VEHICLE SEAT

(75) Inventors: Kenji Horiguchi, Kariya (JP); Hiroyuki Kuretake, Kariya (JP); Hideki Kinoshita, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 778 days.

(21) Appl. No.: 13/378,317

(22) PCT Filed: Jun. 3, 2010

(86) PCT No.: PCT/JP2010/059427
§ 371 (c)(1),
(2), (4) Date: Mar. 1, 2012

(87) PCT Pub. No.: WO2011/007625
PCT Pub. Date: Jan. 20, 2011

(65) Prior Publication Data
US 2012/0169099 A1    Jul. 5, 2012

(30) Foreign Application Priority Data

Jul. 15, 2009 (JP) ................................. 2009-166479
Aug. 25, 2009 (JP) ................................. 2009-194385
Oct. 16, 2009 (JP) ................................. 2009-239554
Feb. 23, 2010 (JP) ................................. 2010-037044

(51) Int. Cl.
*B60N 2/00* (2006.01)
*B60N 2/06* (2006.01)
*B60N 2/02* (2006.01)
*B60N 2/14* (2006.01)
*B60N 2/16* (2006.01)
(Continued)

(52) U.S. Cl.
CPC ................. *B60N 2/06* (2013.01); *B60N 2/0232* (2013.01); *B60N 2/14* (2013.01); *B60N 2/161* (2013.01); *B60N 2/162* (2013.01); *B60N 2/164* (2013.01); *B60N 2/165* (2013.01); *B60N 2/1615* (2013.01); *B60N 2/58* (2013.01); *A61G 5/14* (2013.01); *B60N 2002/0256* (2013.01); *B60N 2205/30* (2013.01)

(58) Field of Classification Search
CPC ......... A47C 9/002; B60N 2/3065; A61G 5/14
USPC ........................... 297/314, 334, 339, DIG. 10
See application file for complete search history.

(56) References Cited

U.S. PATENT DOCUMENTS 3,158,398 A * 11/1964 Stryker .......................... 297/333
4,688,851 A *  8/1987 Whiteford ..................... 297/313
(Continued)

FOREIGN PATENT DOCUMENTS

JP     60-168632      8/1985
JP     61-124431      8/1986
(Continued)

*Primary Examiner* — David R Dunn
*Assistant Examiner* — Alexander Harrison
(74) *Attorney, Agent, or Firm* — Christensen Fonder P.A.

(57) ABSTRACT

A vehicle seat according to the present invention may include a seat cushion that is composed of a stationary cushion portion and a movable cushion portion, in which the movable cushion portion is capable of being tilted so as to be low in a getting in/out side while being raised with respect to the stationary cushion portion, and a cushion tilting mechanism that is disposed under the seat cushion and is configured to tilt the movable cushion portion while raising the same with respect to the stationary cushion portion.

18 Claims, 31 Drawing Sheets

(51) Int. Cl.
  *B60N 2/58* (2006.01)
  *A61G 5/14* (2006.01)

(56) References Cited

U.S. PATENT DOCUMENTS

| | | | | |
|---|---|---|---|---|
| 4,690,457 | A | * | 9/1987 | Poncy et al. .................. 297/337 |
| 4,838,612 | A | * | 6/1989 | Cross ............................ 297/338 |
| 4,846,529 | A | * | 7/1989 | Tulley ...................... 297/344.23 |
| 4,872,223 | A | * | 10/1989 | Baird ................................ 4/480 |
| 5,316,370 | A | * | 5/1994 | Newman ...................... 297/313 |
| 5,375,910 | A | * | 12/1994 | Murphy .................. 297/256.13 |
| 5,466,041 | A | * | 11/1995 | Hoffman et al. ........... 297/188.1 |
| 5,584,530 | A | * | 12/1996 | Rogers et al. .............. 297/188.1 |
| 5,660,437 | A | | 8/1997 | Bauer et al. |
| 6,702,383 | B2 | * | 3/2004 | Newman et al. ............... 297/313 |
| 7,093,899 | B2 | * | 8/2006 | Fisher et al. .................. 297/334 |
| 2009/0322133 | A1 | | 12/2009 | Yamada et al. |

FOREIGN PATENT DOCUMENTS

| | | |
|---|---|---|
| JP | 7-108857 | 4/1995 |
| JP | 7-149176 | 6/1995 |
| JP | 8-216747 | 8/1996 |
| JP | 2001-277913 A | 10/2001 |
| JP | 2003-127725 A | 5/2003 |
| JP | 2007-135778 A | 6/2007 |

* cited by examiner

VEHICLE SEAT

PRIORITY CLAIM

The present application is a National Phase entry of PCT Application No. PCT/JP2010/059427, filed Jun. 3, 2010, which claims priority from Japanese Patent Application No. 2009-166479, filed Jul. 15, 2009, Japanese Patent Application No. 2009-194385, filed Aug. 25, 2009, Japanese Patent Application No. 2009-239554, filed Oct. 16, 2009, and Japanese Patent Application No. 2010-037044, filed Feb. 23, 2010, the disclosures of which are hereby incorporated by reference herein in their entirety.

TECHNICAL FIELD

The present invention relates to a vehicle seat having a seat cushion and a seat back.

BACKGROUND ART

A related vehicle seat is disclosed in Japanese Laid-Open Utility Model Publication No. 60-168632.

As shown in FIG. 32, in the vehicle seat disclosed in Japanese Laid-Open Utility Model Publication No. 60-168632, a seat cushion 504 and a seat back 505 are disposed on a seat frame 502. The seat 504 is capable of being tilted with respect to the seat frame 502 such that a side facing a door opening can be low. Therefore, an occupant sitting on the seat cushion 504 can easily clear a side portion 504s of the seat cushion 504 by tilting the seat cushion 504 with respect to the seat frame 502 when the occupant gets out of a vehicle. Thus, the side portion 504s does not become an obstacle when the occupant gets out of the vehicle.

However, in a passenger car or other such vehicles, a seat cushion surface 504z of the seat cushion 504 is placed in a low position. Further, in a sitting posture of the occupant, his/her thighs can be positioned higher than his/her buttocks. Thus, if the side portion 504s is lowered while the seat cushion surface 504z is maintained in the low position, the occupant's knees are greatly bent when he/she stands up from the seat cushion 504. Therefore, the occupant must weigh on his/her knees. This results in a burden for an aged person or other such persons.

In order to improve this point, it might be possible to raise the seat cushion 504 with respect to the seat frame 502 when the occupant gets out of the vehicle. However, if the seat cushion 504 is raised in a construction as shown in FIG. 32, the buttocks and the thighs of the sitting occupant can be raised together. As a result, the thighs of the occupant come close to a steering wheel or other such components. The thighs of the occupant can interfere with the steering wheel or other such components when he/she gets out of the vehicle.

Thus, there is a need in the art to provide an improved vehicle seat.

SUMMARY OF THE INVENTION

A first aspect of the present invention provides a vehicle seat including a seat cushion that is composed of a stationary cushion portion and a movable cushion portion, in which the movable cushion portion is capable of being tilted so as to be low in a getting in/out side while being raised with respect to the stationary cushion portion, and a cushion tilting mechanism that is disposed under the seat cushion and is configured to tilt the movable cushion portion while raising the same with respect to the stationary cushion portion.

According to the present invention, the cushion tilting mechanism can be operated when an occupant gets in and out of a vehicle. As a result, the movable cushion portion of the seat cushion can be raised with respect to the stationary cushion portion, so that the movable cushion portion can be tilted so as to be low in the getting in/out side. Therefore, the occupant sitting on the seat cushion can have a substantially half-crouching position, so that the knees of the occupant can be extended. Further, even when the movable cushion portion of the seat cushion is raised, the thighs of the occupant do not easily interfere with the steering wheel or other such members.

Further, since the movable cushion portion of the seat cushion is tilted so as to be low in the getting in/out side, there is no need for the occupant to raise his/her legs when the occupant clears a side portion of the seat cushion, so that the occupant can maintain the substantially half-crouching position.

In the second aspect of the present invention, when the movable cushion portion is tilted, a side support portion positioned in the getting in/out side of the movable cushion portion can be integrally tilted. Therefore, it is possible to further easily get in and out of the vehicle.

In the third aspect of the present invention, the cushion tilting mechanism has a first link that is rotatable from a folded position to a raised position under the seat cushion, a second link that is positioned to intersect with the first link and is connected thereto so as to be substantially symmetrically movable with the first link, and a drive portion that is capable of rotating the first and second links from the folded position to the raised position. Further, when the first link and the second link is rotated from the folded position to the raised position, the movable cushion portion of the seat cushion can be tilted so as to be low in the getting in/out side while being raised with respect to the stationary cushion portion.

Thus, because the first link and the second link intersecting with each other are used, it is possible to adjust an inclination angle of the movable cushion portion of the seat cushion in an upper limit position.

In the fourth aspect of the present invention, the cushion tilting mechanism has a connection mechanism that is capable of vertically rotatably connecting the movable cushion portion of the seat cushion to a support member, and a drive portion that is capable of vertically rotating the movable cushion portion about a rotation center of the connection mechanism. Further, when the movable cushion portion rotates upwardly about the rotation center of the connection mechanism, the movable cushion portion can be tilted so as to be low in the getting in/out side while being raised with respect to the stationary cushion portion.

Thus, when the movable cushion portion rotates upwardly about the rotation center of the connection mechanism, the movable cushion portion can be raised with respect to the stationary cushion portion and be tilted so as to be low in the getting in/out side. Therefore, the cushion tilting mechanism can be structurally simplified.

In the fifth aspect of the present invention, the vehicle seat further includes a longitudinal slide mechanism that is configured to slide a seat frame supporting the seat cushion and a seat back along a vehicle floor, and a frame raising/lowering mechanism that is configured to raise and lower the seat frame with respect to the vehicle floor.

Therefore, it is possible to adjust a position of the vehicle seat with respect to the vehicle floor by the slide mechanism and the frame raising/lowering mechanism.

In the sixth aspect of the present invention, when a raising switch is operated while a door of a door opening is opened, the cushion tilting mechanism can be driven in a direction in which the movable cushion portion of the seat cushion can be raised.

Thus, it is possible to perform raising operation of the cushion tilting mechanism only when the occupant would like to get out of the vehicle. Therefore, the occupant can be effectively prevented from accidentally operating the cushion tilting mechanism.

In the seventh aspect of the present invention, the cushion tilting mechanism has a drive mechanism that is configured to horizontally reciprocate a movable portion under the seat cushion, and a link mechanism that is configured such that when the movable portion moves in a predetermined direction due to the action of the drive mechanism, the movable cushion portion of the seat cushion can be tilted according to an amount of motion of the movable portion.

In the present invention, the drive mechanism positioned under the seat cushion is constructed to horizontally reciprocate the movable portion. Therefore, a height of the drive mechanism can be reduced as compared with the construction in which the movable portion is vertically reciprocated. As a result, a seating position of the seat cushion that is positioned above the drive mechanism can be kept low.

Further, because the movable portion is constructed to be horizontally reciprocated, a reciprocation stroke of the movable portion can be increased while the seating position of the seat cushion is kept low. As a result, the movable cushion portion of the seat cushion can be largely inclined when the occupant gets in and out of the vehicle, so as to increase a rising amount of a buttock receiving portion that constitutes a portion of the movable cushion portion.

In the eighth aspect of the present invention, the vehicle seat further includes a rotation mechanism that is configured to horizontally rotate the seat cushion toward a door opening of a vehicle.

Therefore, the occupant can further easily get in and out of the vehicle due to the action of the rotation mechanism.

In the ninth aspect of the present invention, the link mechanism is configured to tilt the movable cushion portion of the seat cushion toward a door opening of a vehicle. The invention further includes a slide mechanism that is configured to slide the movable cushion portion, the link mechanism and the drive mechanism horizontally toward the door opening of the vehicle.

Therefore, the occupant can further easily get in and out of the vehicle due to the action of the slide mechanism.

In the tenth aspect of the present invention, the link mechanism is formed along the movable cushion portion of the seat cushion, and has a cushion support member that is integrated with the movable cushion portion, a horizontal support portion that supports a midway portion of the cushion support member horizontally as a center of vertical rotation thereof, and a link that vertically rotatably connects one end of the cushion support member nearer to the horizontal support portion and the movable portion of the drive mechanism.

Thus, one end of the seat cushion support member can be moved in a predetermined direction by the movable portion of the drive mechanism and the link of the link mechanism. Therefore, the seat cushion support member can be rotated upwardly about the horizontal support portion, so that the movable cushion portion of the seat cushion can be tilted.

In the eleventh aspect of the present invention, the link mechanism is formed along the movable cushion portion of the seat cushion, and has a cushion support member that is integrated with the movable cushion portion, a horizontal support portion that supports one end of the cushion support member horizontally as a center of vertical rotation thereof, and a link that vertically rotatably connects a midway portion of the cushion support member and the movable portion of the drive mechanism.

Thus, the midway portion of the seat cushion support member can be moved in a predetermined direction by the movable portion of the drive mechanism and the link of the link mechanism. Therefore, the seat cushion support member can be rotated upwardly about the horizontal support portion, so that the movable cushion portion of the seat cushion can be tilted.

In the twelfth aspect of the present invention, the vehicle seat further includes a closing member that is capable of closing an open portion that is formed between a lower end of the movable cushion portion and a seating surface of the stationary cushion portion in a boundary position between the movable cushion portion and the stationary cushion portion when the movable cushion portion is raised with respect to the stationary cushion portion.

According to the present invention, even if the occupant inadvertently moves his/her hand toward the open portion between the movable cushion portion and the stationary cushion portion when the movable cushion portion positioned in the getting in/out position is being lowered, the closing member can prevent his/her hand from entering the open portion. Therefore, it is possible to avoid trouble, for example, that his/her hand or the like can be caught between the movable cushion portion and the stationary cushion portion.

In the thirteenth aspect of the present invention, the closing member is composed of a fence-like plate portion that is projected downwardly from a lower end of a boundary position-side surface of the movable cushion portion, and a deformable sheet member that is capable of closing the open portion between a lower end edge of the plate portion and a boundary position-side surface of the stationary cushion portion.

Thus, because the closing member is composed of the plate portion and the deformable sheet member, the closing member 260 can be prevented from being interfered with the stationary cushion portion S, the cushion tilting mechanism 50 and the rest with a simple construction.

In the fourteenth aspect of the present invention, the sheet member is connected to the plate portion.

In the fifteenth aspect of the present invention, a proximal end portion of the sheet member is connected to a lower end edge of the plate portion attached to the movable cushion portion or is connected to the movable cushion portion in an inner side of the plate portion, wherein a distal end portion of the sheet member is connected to the boundary position-side surface of the stationary cushion portion, so that the sheet member can be unfolded as the movable cushion portion is raised. Further, a height as measured from a seating surface of the movable cushion portion to a connecting position of the plate portion and the sheet member or to the lower end edge of the plate portion is set to be larger than a height as measured from the connecting position or the lower end edge of the plate portion to the seating surface of the stationary cushion portion when the movable cushion portion is positioned in the getting in/out position.

Thus, as the movable cushion portion is lowered to a sitting position, a proximal end portion of the sheet member is pulled downwardly by a lower end edge of the plate portion of the movable cushion portion, so that the sheet member can be received in a lower side of the seating surface. That is, in a condition in which the movable cushion portion is lowered to the sitting position, a portion of the sheet member can be prevented from being left on the seating surfaces of the movable cushion portion and the stationary cushion portion. Therefore, comfort of the seat cushion can be avoided from being deteriorated. In addition, appearance of the seating surfaces can be avoided from being deteriorated.

In the sixteenth aspect of the present invention, the boundary position-side surface of the stationary cushion portion is inclined upwardly. The boundary position-side surface of the movable cushion portion is inclined downwardly. Further, the boundary position-side surface of the movable cushion portion is capable of surface-contacting the boundary position-side surface of the stationary cushion portion when the movable cushion portion is positioned in the sitting position.

Thus, when the occupant is sitting on the seat cushion in a condition in which the movable cushion portion is in the sitting position, his/her weight can be applied to the boundary position-side surface of the stationary cushion portion from the boundary position-side surface of the movable cushion portion. As a result, the boundary position-side surface of the movable cushion portion and the boundary position-side surface of the stationary cushion portion can completely surface-contact each other under the weight of the occupant, so as to prevent formation of a clearance in the boundary position between the movable cushion portion and the stationary cushion portion. Therefore, comfort of the seat cushion can be avoided from being deteriorated.

Further, as compared with the case in which the boundary position-side surfaces of the stationary cushion portion and the movable cushion portion are formed vertically, a larger clearance can be formed between both of the boundary position-side surfaces when the movable cushion portion is raised and lowered, so that the sheet member can be easily received under the seating surface.

In the seventeenth aspect of the present invention, an operating switch of a drive portion of the cushion tilting mechanism is positioned in an interior side of the door that is opened when the occupant gets out of the vehicle, so as to be positioned under a window. Further, the drive portion can be driven when the operating switch is operated while the door is opened.

According to the present invention, when the occupant gets out of the vehicle, the occupant can operate the operating switch in a forwardly tilted posture while the occupant projects the upper portion of his/her body out of the vehicle after the door is opened. When the occupant operates the operating switch, the cushion tilting mechanism is actuated, so that the movable cushion portion can be raised. Thus, because the buttocks of the occupant can be pushed up by the movable cushion portion while the occupant is in the forwardly tilted posture, the occupant can stand up in the forwardly tilted posture. As a result, the head of the occupant can be avoided from contacting the ceiling portion of the door opening of the vehicle.

In the eighteenth aspect of the present invention, the drive portion has a motor, wherein the operating switch can be turned on only when the operating switch is operated, and wherein electricity can be supplied to the motor only when the operating switch is turned on.

Therefore, the occupant can maintain the forwardly tilted posture by constantly operating the operating switch while the movable cushion portion is raised. As a result, the head of the occupant does not easily contact the ceiling portion of the door opening.

In the nineteenth aspect of the present invention, in a condition in which the door is not rotated to a desired position in an opening direction, even when the operating switch is turned on, no electricity is supplied to the motor.

Therefore, even if the occupant inadvertently touches the operating switch during driving, the movable cushion portion can never be raised.

According to the present invention, the occupant can get in and out of the vehicle in a substantially half-crouching position. Therefore, the occupant can easily get in and out of the vehicle.

DETAILED DESCRIPTION OF THE INVENTION

Embodiment 1

Figure 1:
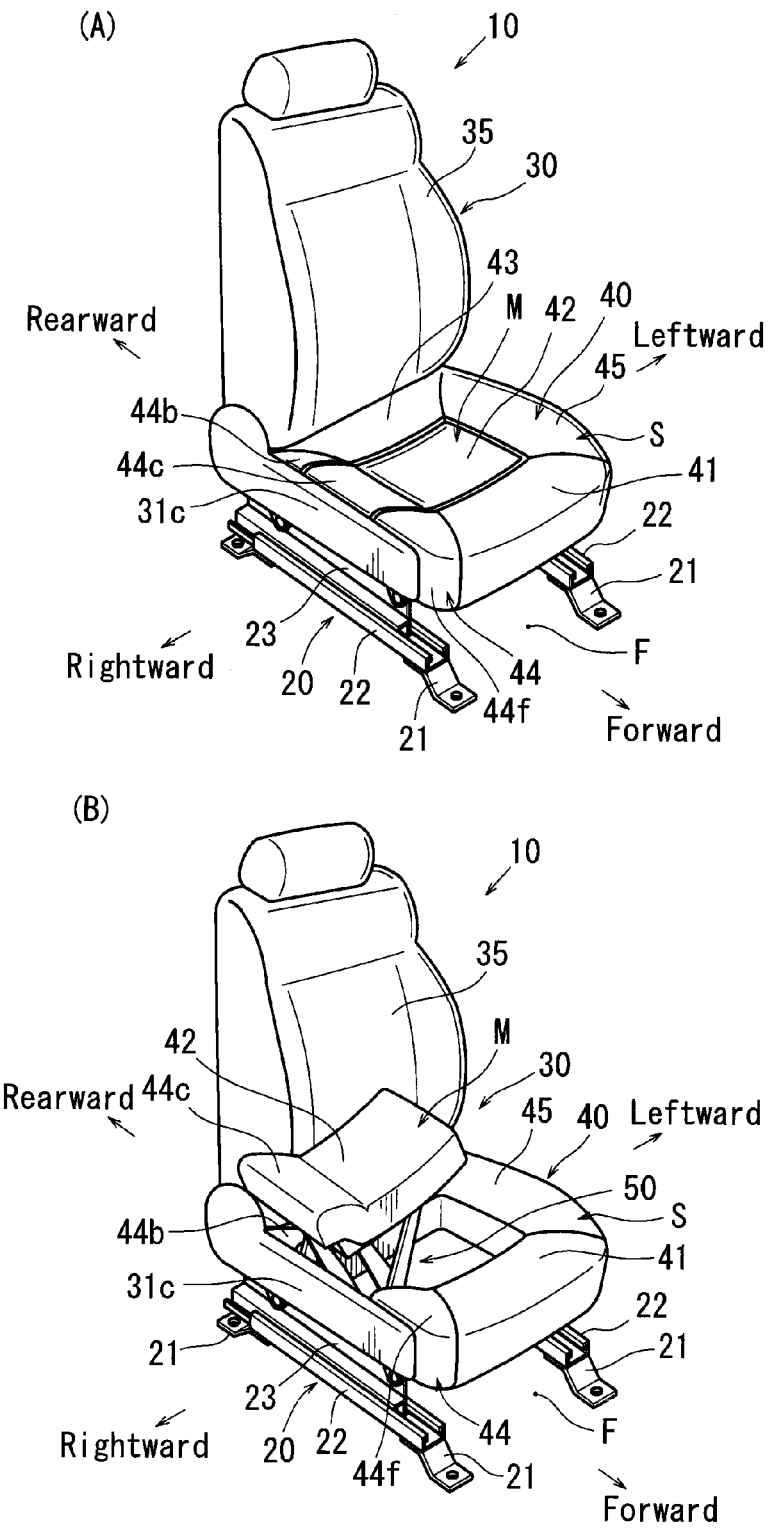
FIG. 1(A) is a schematic perspective view of a vehicle seat according to Embodiment 1 of the present invention, illustrating a condition in which the vehicle travels.
FIG. 1(B) is a schematic perspective view of the vehicle seat, illustrating a condition in which an occupant gets in and out of the vehicle.

In the following, a vehicle seat according to Embodiment 1 of the present invention will be illustrated with reference to FIGS. 1(A) to 7.

Further, forward and rearward, rightward and leftward, and upward and downward in the drawings respectively correspond to forward and rearward, rightward and leftward, and upward and downward of a vehicle seat and a passenger vehicle having the vehicle seat. Further, forward and rearward, rightward and leftward, and upward and downward referred to in the specification also correspond to forward and rearward, rightward and leftward, and upward and downward as defined above.

<Outline of Vehicle Seat 10>

A vehicle seat 10 according to the present embodiment is a seat (driver's seat or other such seats) of the vehicle having a relatively low vehicle height, which seat is constructed to allow an occupant to sit thereon from right passing through a right door opening.

Figure 2:
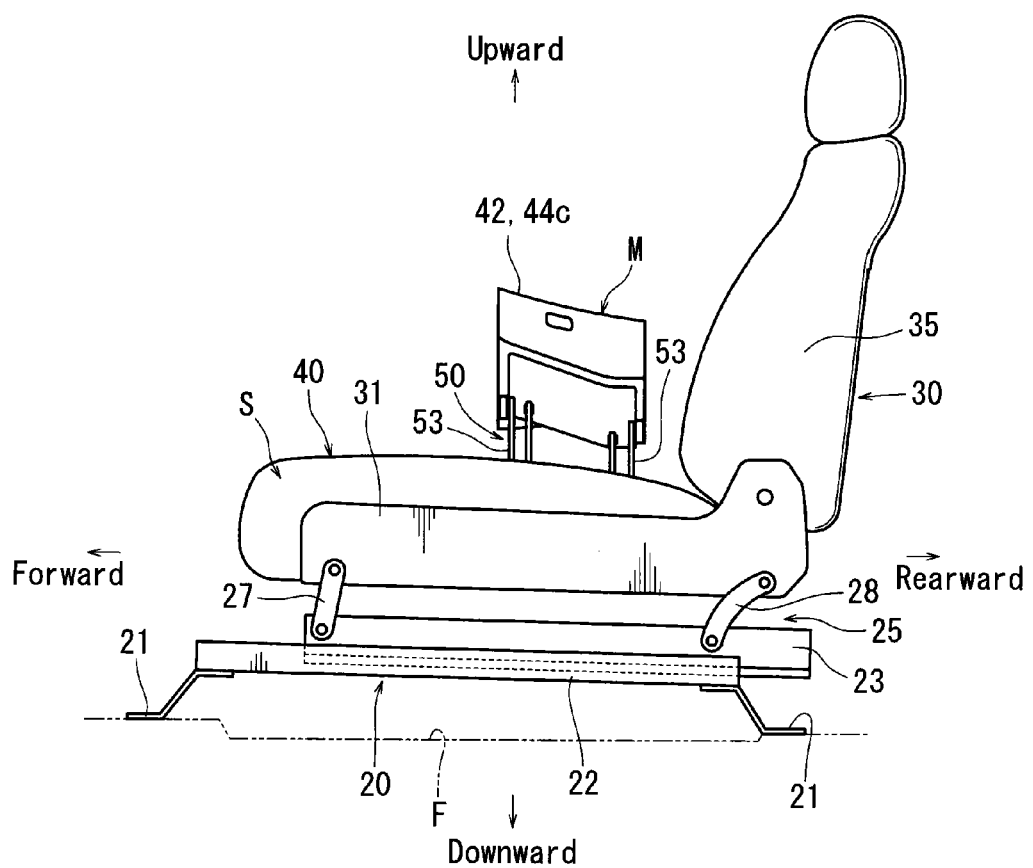
FIG. 2 is a full side view of the vehicle seat.

As shown in FIGS. 1(A), 1(B) and 2, the vehicle seat 10 has a seat main body 30, a longitudinal slide mechanism 20 that is configured to longitudinally slide the seat main body 30 with respect to a vehicle floor F, and a raising/lowering mechanism 25 (FIG. 2) that is configured to raise and lower the seat main body 30 with respect to the vehicle floor F.

As shown in FIG. 2, the seat main body 30 is composed of a seat frame 31, a seat cushion 40 that is disposed on the seat frame 31, a seat back 35 that is vertically rotatably connected to a rear end portion of the seat frame 31, and a cushion tilting mechanism 50 that is capable of raising a portion M of the seat cushion 40 with respect to the seat frame 31 and tilting the same toward the door opening.

<Regarding the Longitudinal Slide Mechanism 20>

Figure 3:
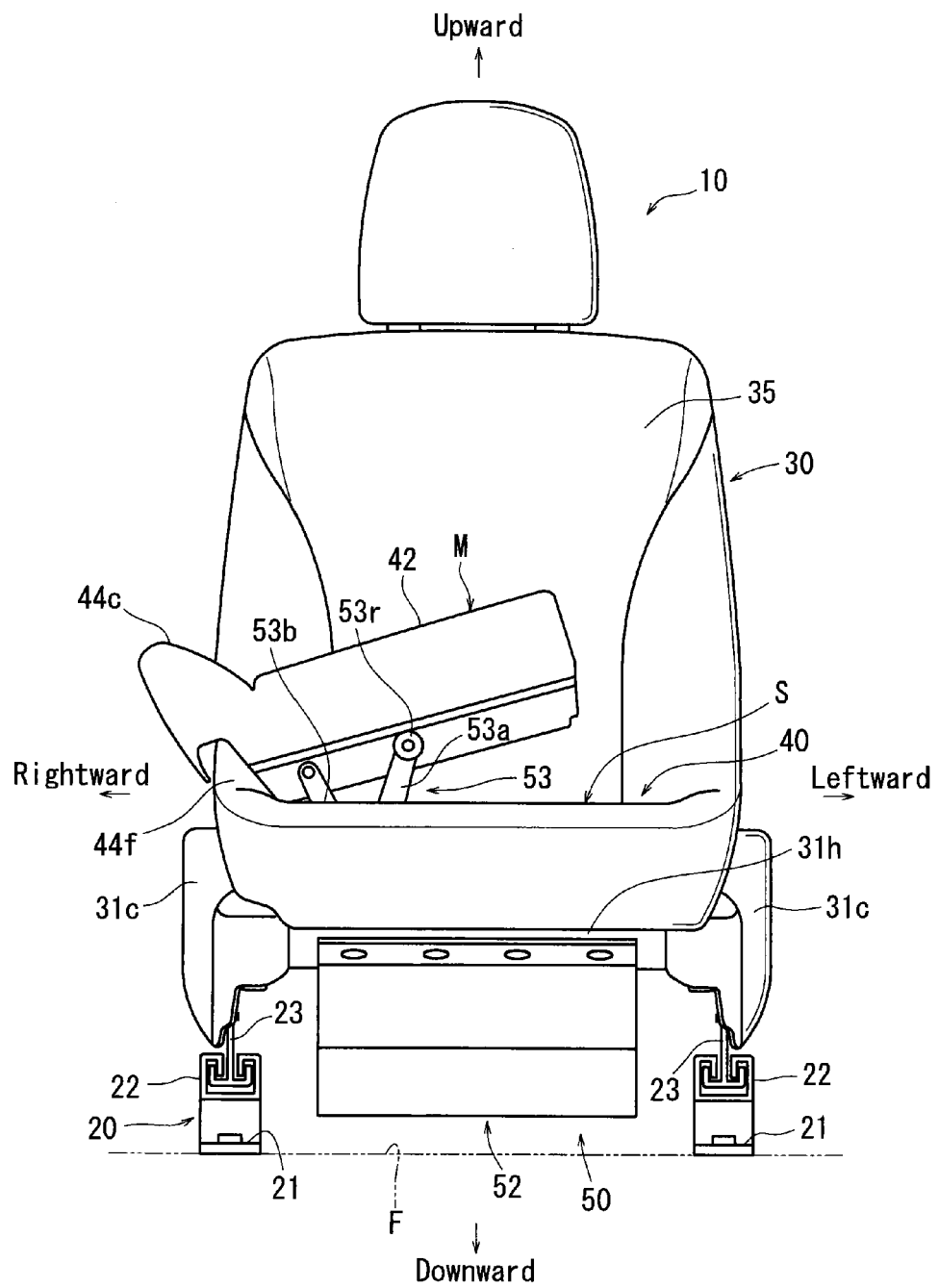
FIG. 3 is an elevational view of the vehicle seat, illustrating the condition in which the occupant gets in and out of the vehicle.

As shown in FIGS. 1(A) to 3, the longitudinal slide mechanism 20 is composed of a pair of right and left lower rails 22 that are disposed on the vehicle floor F so as to extend in a longitudinal direction, right and left upper rails 23 that are configured to be slidable in the longitudinal direction along the right and left lower rails 22, and a drive mechanism (not shown) that is configured to slide the upper rails 23 longitudinally with respect to the lower rails 22. Each of the lower rails 22 is a grooved rail having an open-topped substantially C-shape in cross section. As shown in, for example, FIG. 2, lower sides of front and rear end portions of each of the lower rails 22 are respectively connected to the vehicle floor F by support strips 21. As shown in FIG. 3, each of the upper rails 23 is a plate-shaped rail having a substantially reverse T-shape in cross section. A lower portion of each of the upper rails 23 is fit-engaged with each of the lower rails 22 from a front end or a rear end thereof. Thus, the upper rails 23 can slide in the longitudinal direction along the lower rails 22 while the upper rails 23 and the lower rails 22 are fit-engaged with each other.

Further, the longitudinal slide mechanism 20 corresponds to a slide mechanism of the present invention.

<Regarding the Raising/Lowering Mechanism 25>

The raising/lowering mechanism 25 is a mechanism that is configured to raise and lower the seat frame 31 of the seat main body 30 with respect to the right and left upper rails 23 of the slide mechanism 20. As shown in, for example, FIG. 2, the raising/lowering mechanism 25 is composed of a pair of right and left front lift links 27, a pair of right and left rear lift links 28, and a drive mechanism (not shown) as a raising/lowering drive source. The pair of right and left front lift links 27 and the pair of rear lift links 28 are constructed to raise and lower the seat frame 31 parallel to the right and left upper rails 23. Further, one end portion (a lower end portion) of each of the front lift links 27 and one end portion (a lower end portion) of each of the rear lift links 28 are vertically rotatably connected to each of the upper rails 23. Conversely, the other end portion (an upper end portion) of each of the front lift links 27 and the other end portion (an upper end portion) of each of the rear lift links 28 are vertically rotatably connected to the seat frame 31.

Further, as shown in, for example, FIG. 1(A), the seat frame 31, the front lift links 27 and the rear lift links 28 are covered by side covers 31c. In FIG. 2, the side covers 31c are omitted.

Further, the raising/lowering mechanism 25 corresponds to a frame raising/lowering mechanism of the present invention.

<Regarding the Seat Cushion 40>

As shown in FIG. 1(A), the seat cushion 40 has a cushion front portion 41, a cushion central portion 42 and a cushion rear portion 43 in order from a front side of a central portion thereof. Further, the seat cushion 40 has a right side portion 44 that is provided to a right side (a side facing the door opening (not shown)) of the central portion, and a left side portion 45 that is provided to a left side (a side facing a center of a vehicle interior) of the central portion.

The cushion front portion 41 is a portion that mainly supports the thighs of the sitting occupant, and is formed to be gently inclined such that a seating surface thereof can be lowered in a rear side thereof. The cushion central portion 42 is a portion that mainly supports the buttocks of the occupant, and is formed such that a seating surface thereof can be positioned at a lowest level and be flattened. The cushion rear portion 43 is formed to be gently inclined so as to be lowered in a front side thereof.

The right side portion 44 is inclined such that a seating surface thereof can be heightened in a right side (a side facing the door opening), and is divided into a front portion 44f, a central portion 44c and a back portion 44b. The left side portion 45 is inclined such that a seating surface thereof can be heightened in a left side (a side facing the center of the vehicle interior). That is, because the seating surface of the right side portion 44 and the seating surface of the left side portion 45 are formed as inclined surfaces that are inclined with respect to the seating surfaces of the cushion front portion 41, the cushion central portion 42 and the cushion rear portion 43, the seat cushion 40 can have an increased holding performance when the occupant sits thereon.

The cushion central portion 42 and the central portion 44c of the right side portion 44 of the seat cushion 40 are integrated with each other and are separated from remaining portions of the seat cushion 40, i.e., the front portion 44f and the back portion 44b of the right side portion 44, the cushion front portion 41, the left side portion 45 and the cushion rear portion 43. Further, the front portion 44f and the back portion 44b of the right side portion 44, the cushion front portion 41, the left side portion 45 and the cushion rear portion 43 of the seat cushion 40 are secured to the seat frame 31. Thus, in the following, the front portion 44f and the back portion 44b of the right side portion 44, the cushion front portion 41, the left side portion 45 and the cushion rear portion 43 of the seat cushion 40 will be referred to as a stationary cushion portion S.

Further, as shown in FIG. 1(B), the cushion central portion 42 and the central portion 44c of the right side portion 44 of the seat cushion 40 can be raised and lowered with respect to the stationary cushion portion S of the seat cushion 40 and the seat frame 31 due to the action of a cushion tilting mechanism 50 (which will be hereinafter described). Thus, in the following, the cushion central portion 42 and the central portion 44c of the right side portion 44 of the seat cushion 40 will be referred to as a movable cushion portion M of the seat cushion 40.

<Regarding the Cushion Tilting Mechanism 50>

The cushion tilting mechanism 50 is a mechanism that is capable of raising the movable cushion portion M of the seat cushion 40 with respect to the seat frame 31 and the stationary cushion portion S of the seat cushion 40 and is capable of tilting the same so as to be low in a side facing the door opening and high in a side facing the vehicle interior. As shown in the side view of FIG. 6, the cushion tilting mechanism 50 is composed of a base plate 52 suspended from the seat frame 31, a pair of front and rear cross links 53 disposed on the base plate 52, and a drive portion 56 that is capable of moving the cross links 53.

Figure 6:
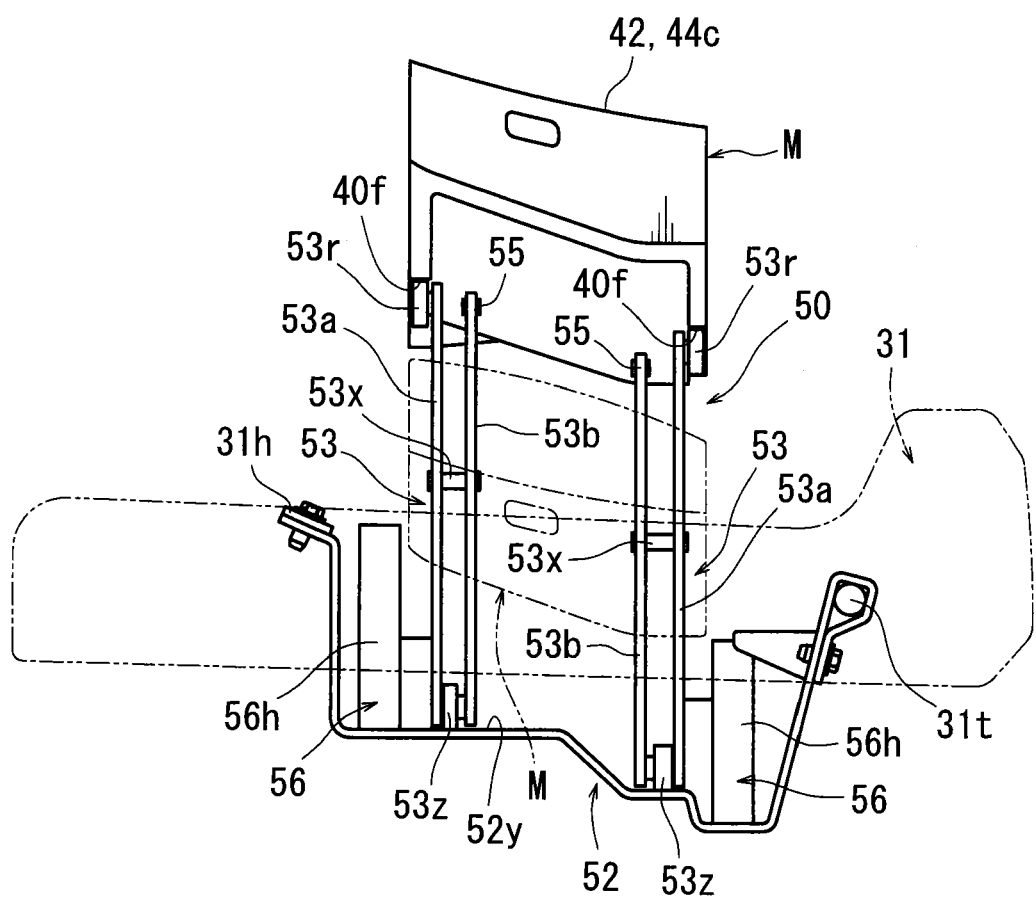
FIG. 6 is a side view of the cushion tilting mechanism of the vehicle seat (a view that is viewed from line VI-VI of FIG. 4)

As shown in FIG. 6, the base plate 52 of the cushion tilting mechanism 50 is bent into a substantially U-shape in a side view. A front upper end portion of the base plate 52 is bolted on a front beam portion 31h that is positioned in a front portion of the seat frame 31 so as to extend in a width direction. Conversely, a rear upper end portion of the base plate 52 is connected to a rear support pipe 31t that is positioned in a rear portion of the seat frame 31 so as to extend in the width direction.

The pair of front and rear cross links 53 of the cushion tilting mechanism 50 are constructed to support the movable cushion portion M of the seat cushion 40 at front and rear portions thereof, so as to raise and lower and tilt the movable cushion portion M. Further, the front and rear cross links 53 are formed symmetrically in the longitudinal direction and has the same construction as each other. Therefore, the front cross link 53 will be representatively described with reference to the elevational views shown in FIGS. 4 and 5.

Figure 4:
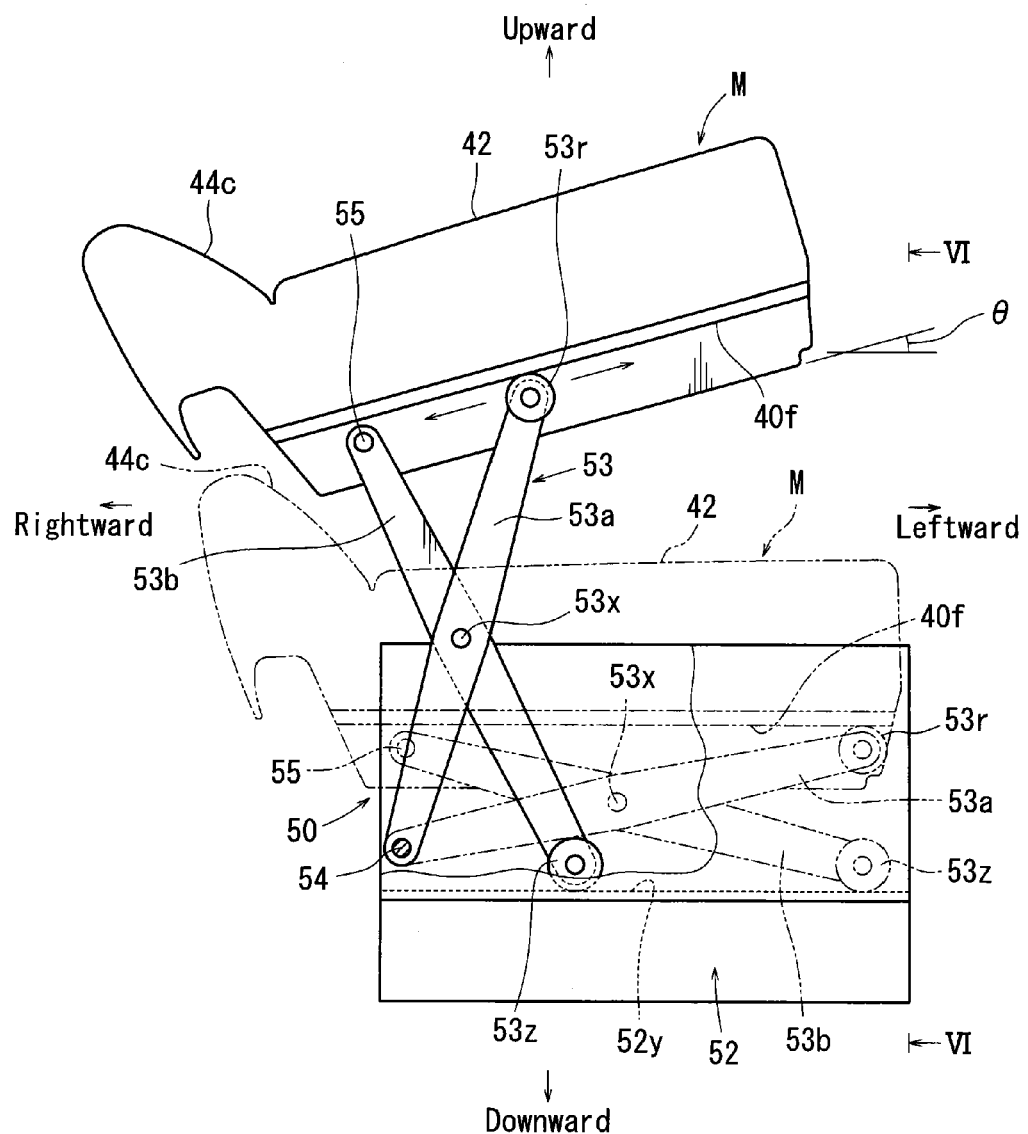
FIG. 4 is an elevational view of a cushion tilting mechanism of the vehicle seat.

As shown in FIG. 4, the cross link 53 is constructed of a linear first link 53a and a linear second link 53b. The two links 53a and 53b are vertically rotatably connected to each other by a center connection pin 53x at portions in the vicinity of the centers thereof. Further, a proximal end portion (a lower end portion) of the first link 53a is vertically rotatably connected to a receiving portion (not shown) that is formed in a right end of a front bottom portion of the base plate 52 via a lower end connection pin 54. Conversely, a roller 53r is attached to a distal end portion (an upper end portion) of the first link 53a. The roller 53r is capable of rolling over along a front side rail portion 40f that is formed in a lower side of the movable cushion portion M of the seat cushion 40 so as to be extended laterally.

A proximal end portion (an upper end portion) of the second link 53b is vertically rotatably connected to the front side rail portion 40f formed in the movable cushion portion M of the seat cushion 40 by an upper end connection pin 55 at a portion in the vicinity of a right end thereof. Conversely, a roller 53z is attached to a distal end portion (a lower end portion) of the second link 53b. The roller 53z is capable of laterally rolling over along a front bottom portion 52y of the base plate 52.

Figure 5:
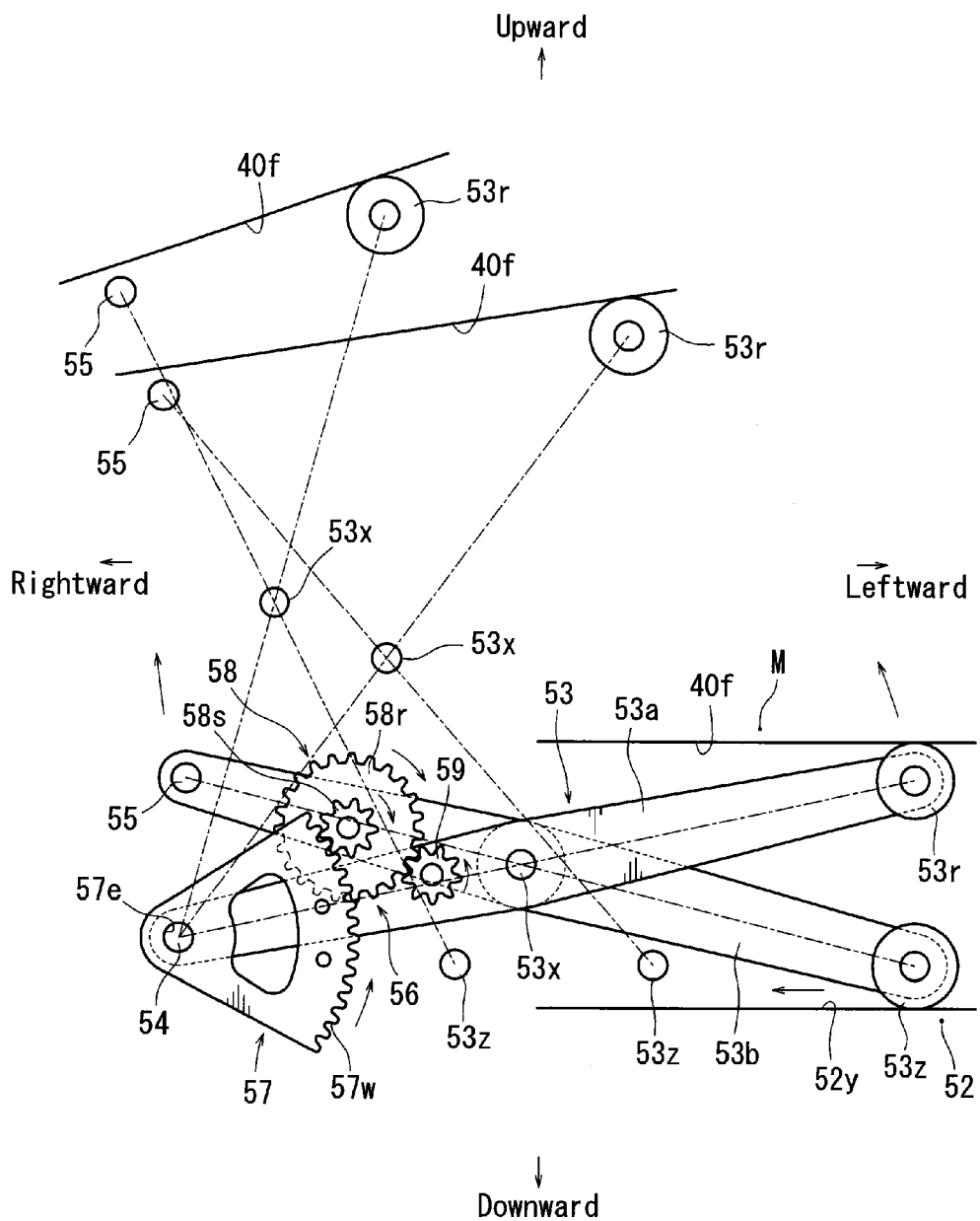
FIG. 5 is a diagram illustrating an operating principle of the cushion tilting mechanism of the vehicle seat.

As shown in FIG. 5, the drive portion 56 of the cushion tilting mechanism 50 is composed of a sector gear 57, a dual gear 58, a drive gear 59, and a motor (not shown) that is capable rotating the drive gear 59. The sector gear 57 is a gear that is configured to rotate integrally with the first link 53a of the cross link 53, and has a center hole 57e that functions as a rotation center. The center hole 57 is positioned in a portion corresponding to a center of a sector shape. Further, the lower end connection pin 54 connecting the first link 53a to the base plate 52 is unrotatably inserted into the center hole 57e of the sector gear 57. That is, the sector gear 57 is constructed to rotate integrally with the first link 53a about a rotation center in common with a rotation center of the first link 53a. The sector gear 57 has a toothed portion 57w that is formed in an outer circumferential portion (arcuate portion) thereof. The toothed portion 57w is in mesh with a small diameter gear 58s of the dual gear 58. Further, a large diameter gear 58r of the dual gear 58 is in mesh with the drive gear 59.

The dual gear 58, the drive gear 59 and the motor are received in and supported by a housing 56h (FIG. 6) of the drive portion 56. The housing 56h is positioned the base plate 52 and is secured thereto.

According to the above construction, when the motor is actuated in a condition shown in FIG. 5, the drive gear 59 can be rotated to the left (in a normal direction) (shown by an arrow), so that the large diameter gear 58r of the dual gear 58 meshing with the drive gear 59 can rotate to the right (shown by an arrow). When the dual gear 58 rotates to the right, the sector gear 57 meshing with the small diameter gear 58s of the dual gear 58 can rotate to the left (shown by an arrow). As a result, the first link 53a integrated with the sector gear 57 can be raised while rotating to the left about the lower end connection pin 54. As the first link 53a is raised, the roller 53r attached to the distal end portion thereof rolls to the right along the front side rail portion 40f of the movable cushion portion M while pushing up the movable cushion portion M of the seat cushion 40. Further, when the first link 53a integrated with the sector gear 57 is raised while rotating to the left, the second link 53b connected to the first link 53a via the central connection pin 53x can be raised while rotating to the right about the upper end connection pin 55 of the movable cushion portion M of the seat cushion 40. As a result, a right end portion of the movable cushion portion M of the seat cushion 40 is pushed up by the second link 53b, and the roller 53z attached to the distal end portion (the lower end portion) of the second link 53b rolls to the right along the front side bottom portion 52y of the base plate 52. That is, upon actuation of the motor, the drive gear 59 rotates to the left (in the normal direction). As a result, the first link 53a and the second link 53b rotate in a rising direction, so that the movable cushion portion M of the seat cushion 40 can be pushed up.

When the first link 53a and the second link 53b are respectively raised to a predetermined position, as shown by solid line in, for example, FIG. 4, the movable cushion portion M of the seat cushion 40 can be maintained in an upper limit position and be tilted such that a right side thereof (a side facing the door opening) can be lowered. Further, the central connection pin 53x connecting the first link 53a and the second link 53b is positioned such that an inclination angle θ of the movable cushion portion M is approximately 17 degrees when the movable cushion portion M of the seat cushion 40 is in the upper limit position. Thus, the inclination angle θ of the movable cushion portion M can be changed by changing the position of the central connection pin 53x.

Next, when the drive gear 59 is rotated to the right (in a reverse direction) by the motor in a condition that the movable cushion portion M of the seat cushion 40 is in the upper limit position, to the contrary of the above, the first link 53a can rotate in a folding direction (to the right) about the lower end connection pin 54, and the second link 53b can rotate in a folding direction (to the left) about the upper end connection pin 55 of the movable cushion portion M of the seat cushion 40. When the movable cushion portion M of the seat cushion 40 is returned to a lower limit position (chain double-dashed line in FIG. 1(A) and FIG. 4), the seating surface of the movable cushion portion M can be positioned to be continuous with the seating surface of the stationary cushion portion S.

<Regarding Operation of the Vehicle Seat 10 According to the Present Embodiment>

First, an operation of the vehicle seat 10 will be described starting from a condition in which the occupant has completely got in the vehicle. In this condition, as shown in FIG. 1(A), the movable cushion portion M of the seat cushion 40 is maintained in the lower limit position, so that the seating surface of the movable cushion portion M is continuous with the seating surface of the stationary cushion portion S. Further, it is possible to adjust a longitudinal position of the seat main body 30 and the height position of the seat main body 30 for physical constitution of the occupant by operating the longitudinal slide mechanism 20 and the raising/lowering mechanism 25.

Next, when the occupant gets out of the vehicle, a seat belt is detached. Thereafter, a raising switch (not shown) is operated while a right door is opened. Thus, the motor of the cushion tilting mechanism 50 can be driven while the raising switch is operated. As a result, the drive portion 56 can be actuated to rotate the first link 53a and the second link 53b of the cross link 53 in a direction in which they are raised. As a result, the movable cushion portion M of the seat cushion 40 can be raised with respect to the stationary cushion portion S and the seat frame 31, so that the buttocks of the occupant can be pushed up. Further, as the movable cushion portion M of the seat cushion 40 is raised, the movable cushion portion M can be tilted such that the side facing the door opening can be lowered. At this time, because the cushion front portion 41 (the stationary cushion portion S) of the seat cushion 40 supporting the thighs of the occupant is maintained in a fixed position with respect to the seat frame 31, it can be positioned lower than the movable cushion portion M. As a result, the occupant sitting on the seat cushion 40 can have a substantially half-crouching position in which the thighs are positioned lower than the buttocks, so that the knees of the occupant can be extended. Further, because the movable cushion portion M is inclined such that the side facing the door opening can be lowered, there is no need for the occupant to raise his/her legs when the occupant clears the central portion 44c of the right side portion 44 of the seat cushion 40. Therefore, the occupant can maintain the substantially half-crouching position.

Further, when the occupant gets in the vehicle, the occupant can sit on the movable cushion portion M of the seat cushion 40 that is positioned in the upper limit position, so that there is no need for him/her to greatly bend his/her knees in the substantially half-crouching position. Therefore, a burden on the body of the occupant can be reduced. After sitting, a lowering switch (not shown) is operated. As a result, the motor of the cushion tilting mechanism 50 can be driven, so that the drive portion 56 can be actuated to rotate the first link 53a and the second link 53b of the cross link 53 in a direction in which they are folded. As a result, the movable cushion portion M of the seat cushion 40 can be lowered. As shown in FIG. 1(A), in a condition in which the movable cushion portion M reaches the lower limit position, the seating surface of the movable cushion portion M can be continuous with the seating surface of the stationary cushion portion S. In this condition, the door is closed. Thus, the occupant can get in the vehicle.

<Advantages of the Vehicle Seat 10 According to the Present Embodiment>

In the vehicle seat 10 according to the present embodiment, the cushion tilting mechanism 50 can be operated when the occupant gets in and out of the vehicle. As a result, the movable cushion portion M (the cushion central portion 42 and the rest) of the seat cushion 40 can be raised with respect to the stationary cushion portion S (the cushion front portion 41). Further, the movable cushion portion M can be tilted so as to be low in the side facing the door opening and high in the side facing the vehicle interior. Thus, the cushion front portion 41 of the seat cushion 40 can be positioned lower than the cushion central portion 42 and the rest when the occupant gets in and out of the vehicle. Therefore, the occupant sitting on the seat cushion 40 can have the substantially half-crouching position, so that the knees of the occupant can be extended. Further, even when the cushion central portion 42 and the rest are raised, the thighs of the occupant do not easily interfere with the steering wheel or other such members.

Further, since the movable cushion portion M of the seat cushion 40 (the cushion central portion 42 and the rest) is tilted so as to be low in the side facing the door opening, there is no need for the occupant to raise his/her legs when the occupant clears the right side portion 44 of the seat cushion 40. Thus, because the occupant can get in and out of the vehicle in the substantially half-crouching position in which the thighs are positioned lower than the buttocks, the occupant can easily get in and out of the vehicle.

Further, the vehicle seat 10 has the longitudinal slide mechanism 20 that is capable of sliding the seat frame 31 along the vehicle floor F, and the raising/lowering mechanism 25 that is capable of raising and lowering the seat frame 31 with respect to the vehicle floor F. Therefore, it is possible to adjust a position of the vehicle seat 10 with respect to the vehicle floor F.

Further, when the raising switch is operated while the door is opened in the door opening, the cushion tilting mechanism 50 is operated so as to raise the movable cushion portion M of the seat cushion 40. That is, it is possible to perform raising operation of the cushion tilting mechanism 50 only when the occupant would like to get out of the vehicle. Therefore, the occupant can be effectively prevented from accidentally operating the cushion tilting mechanism 50.

<Modified Form>

Further, the present invention is not limited to the embodiment described above and can be modified without departing from the scope of the present invention. For example, in the vehicle seat 10 according to the present embodiment, the cross links 53 of the cushion tilting mechanism 50 are disposed in the front and rear portions of the movable cushion portion M of the seat cushion 40, and the first link 53a and the second link 53b of each of the above cross links 53 are raised and folded laterally. However, the cross links 53 can be disposed in right and left portions of the movable cushion portion M of the seat cushion 40, so that the first link 53a and the second link 53b of each cross link 53 can be raised and folded longitudinally.

Further, in the above example, the sector gear 57 and the rest are used as the drive portion 5 of the cushion tilting mechanism 50. However, it is also possible to use, for example, a feed screw/nut, an air cylinder or other such devices.

Figure 7:
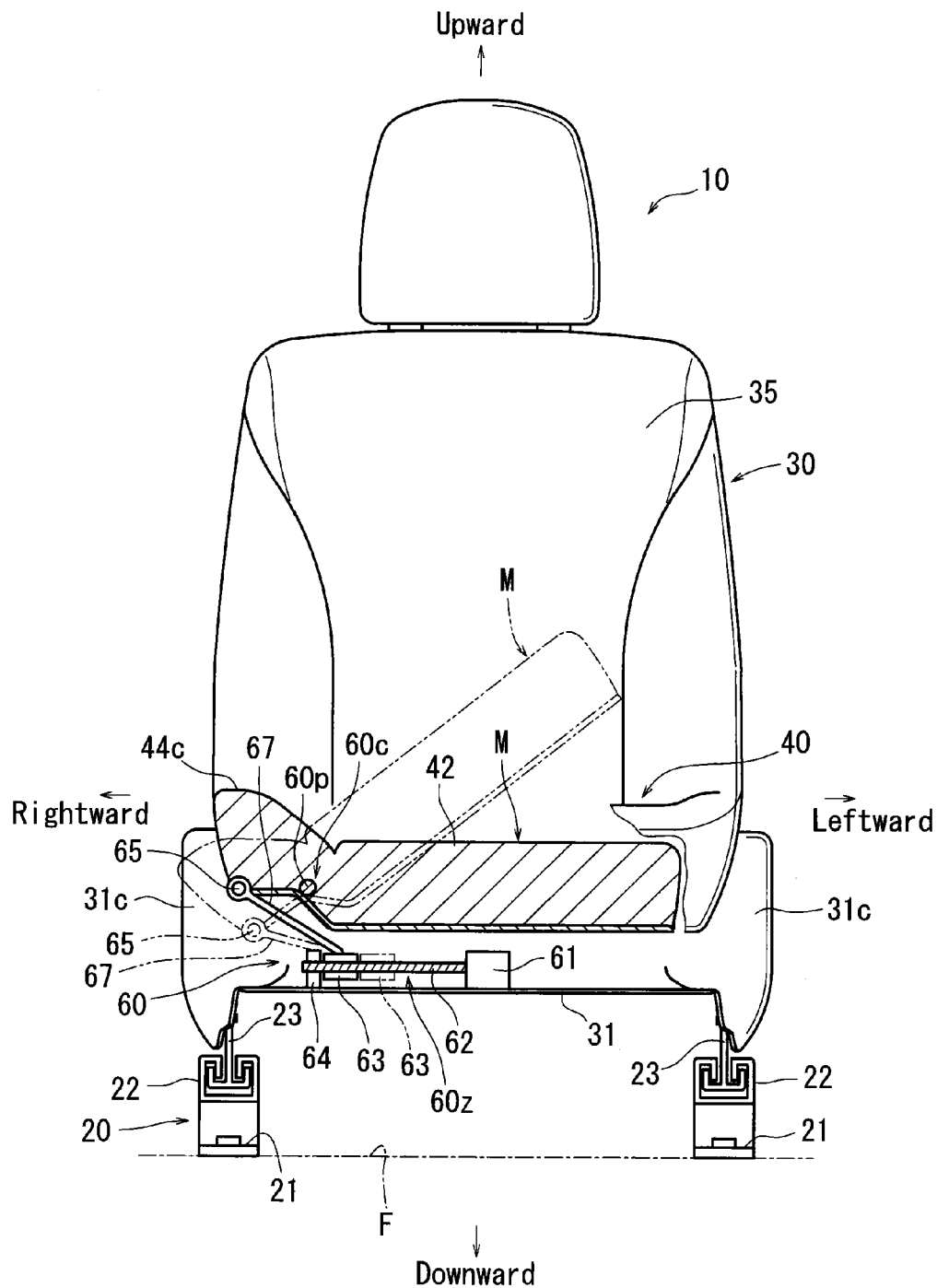
FIG. 7 is a partially cutaway elevational view of a vehicle seat according to Modified Form.

Further, instead of the cushion tilting mechanism 50 having the cross links 53 and the rest, for example, a cushion tilting mechanism 60 shown in FIG. 7 can be used.

A cushion tilting mechanism 60 shown in FIG. 7 has a hinge-like connection mechanism 60c that is capable of vertically rotatably connecting the movable cushion portion M of the seat cushion 40 to the seat frame 31, and a drive portion 60z that is capable of vertically rotating the movable cushion portion M about a rotation center of the connection mechanism 60c.

The connection mechanism 60c is composed of a cushion side hinge member (not shown) that is secured to the movable cushion portion M of the seat cushion 40, and a frame side hinge member (not shown) that is secured to the seat frame 31. Both of the hinge members are connected by a hinge pin 60p, so as to be vertically rotated relative to each other. The hinge pin 60p of the connection mechanism 60c is a rotation center of the connection mechanism 60c, and is disposed in a portion on a back surface (lower surface) of the right side portion 44 (central portion 44c) constituting the movable cushion portion M of the seat cushion 40, so as to extend longitudinally while being maintained in a substantially horizontal position. Therefore, when the movable cushion portion M of the seat cushion 40 rotates to the left (rotates upwards) in FIG. 7 about the hinge pin 60p of the connection mechanism 60c, the cushion central portion 42 of the movable cushion portion M is raised, and a right end of the right side portion 44 (the central portion 44c) of the movable cushion portion M is lowered, so that the movable cushion portion M can be tilted so as to be low in the side facing the door opening (chain double-dashed line).

Further, the seat frame 31 corresponds to a support member of the present invention.

The drive portion 60z of the cushion tilting mechanism 60 has a screw shaft 62 that is horizontally disposed on the seat frame 31 so as to extend laterally, and a nut 63 that is threadably engaged with the screw shaft 62. Connected to a proximal end portion of the screw shaft 62 is a motor 61 that is configured to rotate the screw shaft 62 about its axis. A distal end portion of the screw shaft 62 is rotatably supported by a bearing 64. Further, a proximal end portion of a linear link 67 is vertically rotatably connected to the nut 63. Similarly, a distal end portion of the linear link 67 is vertically rotatably connected to a connection pin 65 that is secured to a back surface right end position (a right side of the hinge pin 60p) of the movable cushion portion M.

According to the above construction, when the motor 61 is driven in a condition shown in, for example, FIG. 7, the screw shaft 62 rotates in a normal direction, so that the nut 63 can move to the left (toward the motor 61) along the screw shaft 62 because the screw shaft 62 and the nut 63 are threadably engaged with each other. As a result, the connection pin 65 attached to the movable cushion portion M of the seat cushion 40 is pulled downwardly and leftward by the linear link 67 (chain double-dashed line), so that the movable cushion portion M of the seat cushion 40 can rotate to the left (rotate upwardly) about the hinge pin 60p of the connection mechanism 60c. In a condition in which the nut 63 reaches a left limit position, the motor 61 stops, so that the movable cushion portion M can be maintained in a condition in which it is tilted by a predetermined angle so as to be low in the side facing the door opening (chain double-dashed line).

When the screw shaft 62 rotates in a reverse direction in this condition, the nut 63 can move to the right (toward the side facing the door opening) along the screw shaft 62 because the screw shaft 62 and the nut 63 are threadably engaged with each other. As a result, the connection pin 65 attached to the movable cushion portion M of the seat cushion 40 is pushed upwardly and rightward by the linear link 67, so that the movable cushion portion M of the seat cushion 40 can rotate to the right (rotate downwardly) about the hinge pin 60p of the connection mechanism 60c. In a condition in which the nut 63 reaches a right limit position, the motor 61 stops, so that the movable cushion portion M can be returned to an initial position. Thus, the seating surface of the movable cushion portion M can be continuous with the seating surface of the stationary cushion portion S (solid line).

Further, in the above example, the drive portion 60z of the cushion tilting mechanism 60 is constructed of the screw shaft 62 and the nut 63 and the rest. However, instead of the screw shaft 62 and the nut 63, for example, a rack/pinion, an air cylinder or other such devices can be used.

Further, the vehicle seat 10 according to the present embodiment is the seat (the driver's seat or other such seats) that is constructed to allow the occupant to sit thereon from right passing through the right door opening. In the vehicle seat 10, the movable cushion portion M of the seat cushion 40 can be tilted by the cushion tilting mechanism 50 and 60 so as to be low in a right side thereof. However, the present invention is also applicable to a vehicle seat (e.g., an assistant driver's seat) of the vehicle, which seat is constructed to allow the occupant to sit thereon from left passing through a left door opening. In the vehicle seat such as the assistant driver's seat, the movable cushion portion M of the seat cushion 40 is tilted by the cushion tilting mechanism 50 and 60 so as to be low in a left side thereof.

Further, in the present embodiment, the cushion tilting mechanism 50 and 60 is disposed on the seat frame 31. However, the cushion tilting mechanism 50 and 60 can be disposed under the seat frame 31. Further, the seat frame 31 can be omitted.

Further, in the present embodiment, the movable cushion portion M of the seat cushion 40 is tilted so as to be low in the side facing the door opening. However, the movable cushion portion M can be tilted so as to be low in one side (a getting in/out side) in the width direction and not in the side facing the door opening.

Further, in the present embodiment, the present invention is applied to a seat that is directed forwardly of the vehicle. However, the present invention is also applicable to a seat that is directed laterally of the vehicle.

Embodiment 2

In the following, a vehicle seat according to Embodiment 2 of the present invention will be described with reference to FIGS. 8 to 14.

<Conventional Construction>

In a conventional vehicle seat (Japanese Laid-Open Patent Publication No. 7-69106), a movable seat portion positioned in a center of a seat cushion is vertically rotatable about a front end side thereof. Further, a rear portion of the movable seat portion can be pushed up by a drive mechanism and a drive arm that are disposed below the seat cushion. That is, when the rear portion of the movable seat portion is pushed up by the drive mechanism and the drive arm, the movable seat portion rotates upwardly about the front end side thereof, so that a buttock receiving portion supporting the buttocks of an occupant can be raised.

The drive mechanism has a feed screw portion that is vertically positioned, a nut portion that is threadably engaged with the feed screw portion, and a motor that is configured to rotate the feed screw portion about its axis. Further, the nut portion of the drive mechanism is connected to the rear portion of the movable seat portion via the drive arm.

In the above-described vehicle seat, the drive mechanism pushing up the rear portion of the movable seat portion of the seat cushion is composed of the vertically directed feed screw portion, and the nut portion and the rest that is configured to move vertically along the feed screw portion. Thus, a height of the drive mechanism is rather great. As a result, a seating position of the seat cushion disposed on the drive mechanism is relatively high.

Further, if a length of the feed screw portion is reduced in order to keep the seating position of the seat cushion low, a push-up amount of the rear portion of the movable seat portion can be relatively reduced. As a result, it is not possible to push up the buttocks of the occupant to a desired height position.

It is an object of a vehicle seat of the present embodiment to prevent a seating position of a seat cushion from increasing, and to enable a buttock receiving portion of the seat cushion supporting the buttocks of an occupant to be raised high when the occupant gets in and out of a vehicle.

<Outline of the Vehicle Seat 10>

Figure 8:
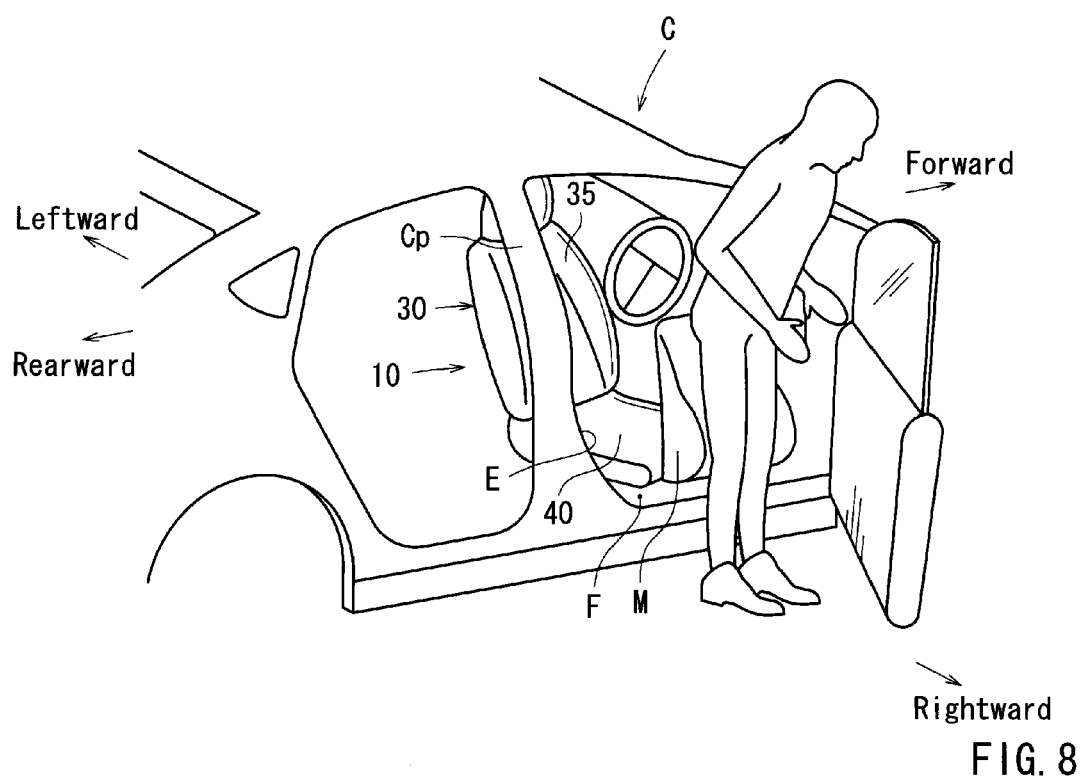
FIG. 8 is a schematic perspective view of a vehicle seat according to Embodiment 2 of the present invention, illustrating a condition in which an occupant gets in and out of a vehicle.

As shown in FIG. 8, the vehicle seat 10 according to the present embodiment is a seat (driver's seat or other such seat) of a vehicle C having a relatively low vehicle height, which seat is constructed to allow an occupant to sit thereon from right passing through a right door opening E.

Figure 10:
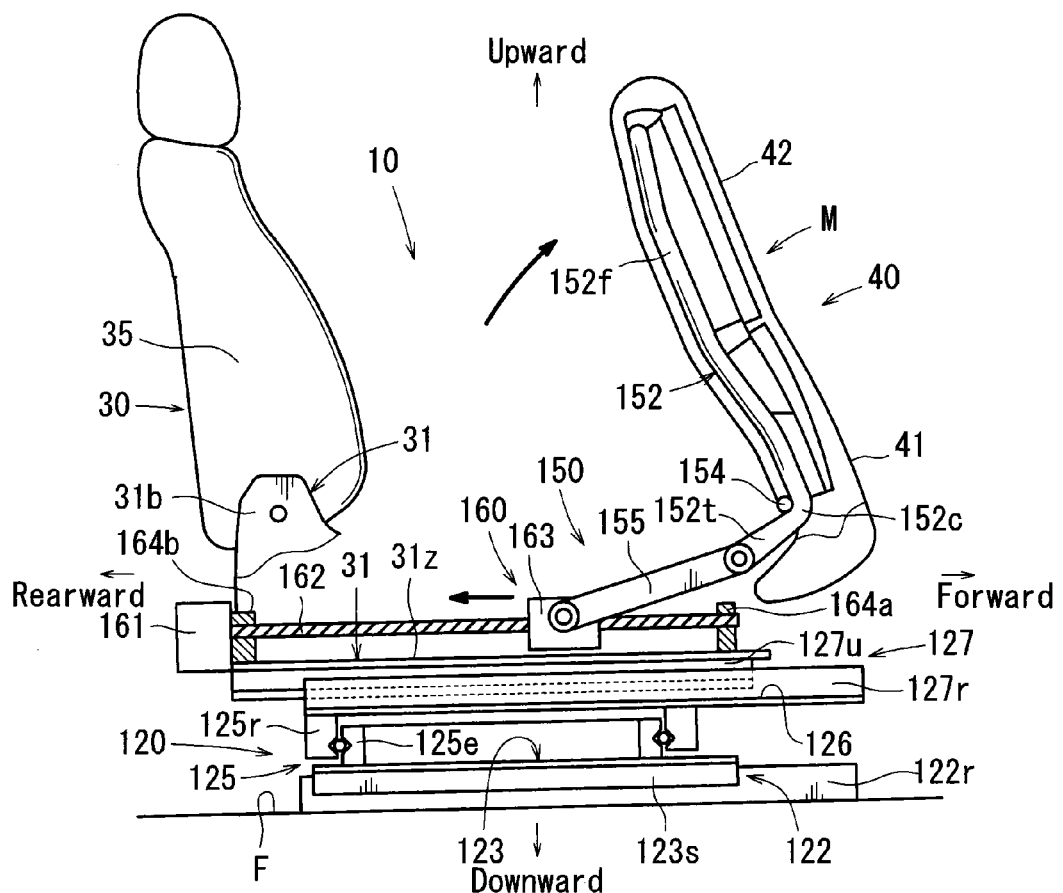
FIG. 10 is a partially cutaway side view of the vehicle seat, illustrating the condition in which the occupant gets in and out of the vehicle.
Figure 11:
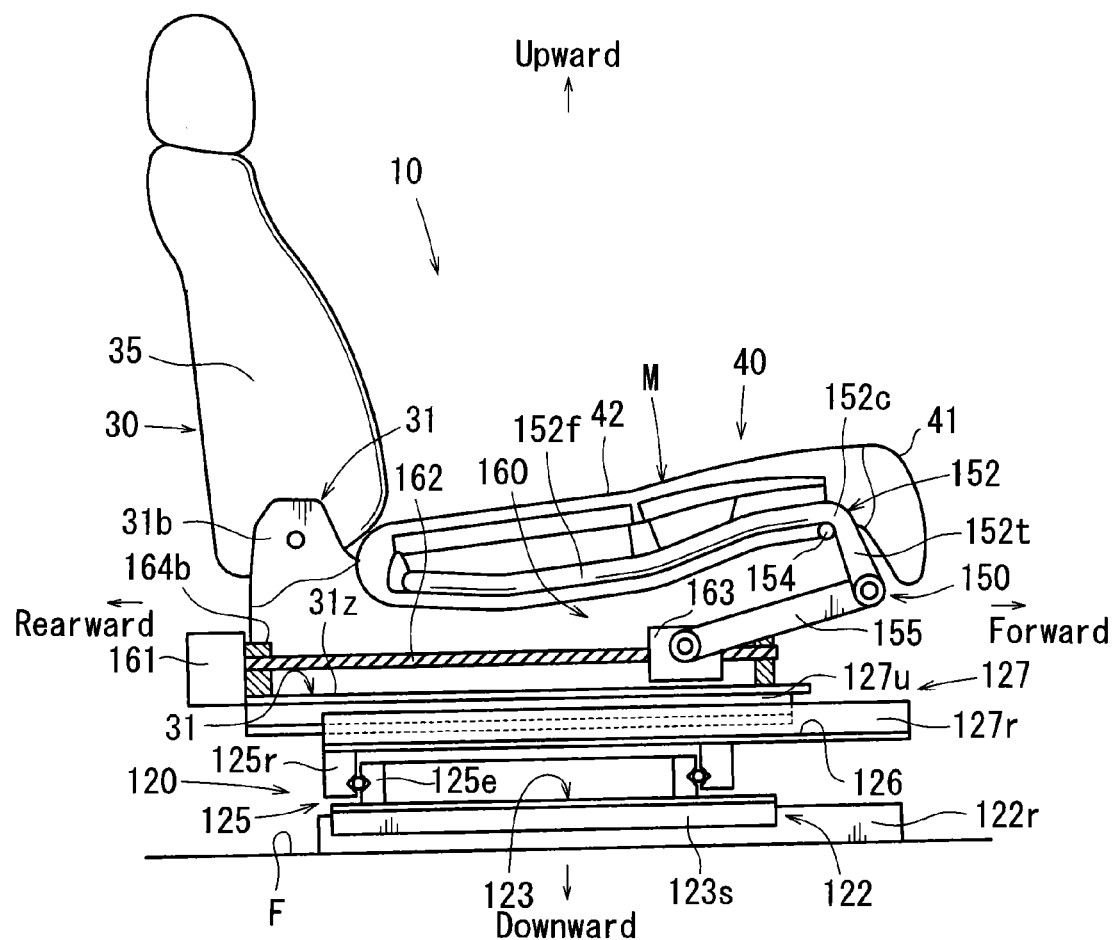
FIG. 11 is a partially cutaway side view of the vehicle seat, illustrating the condition in which the vehicle travels.
Figure 12:
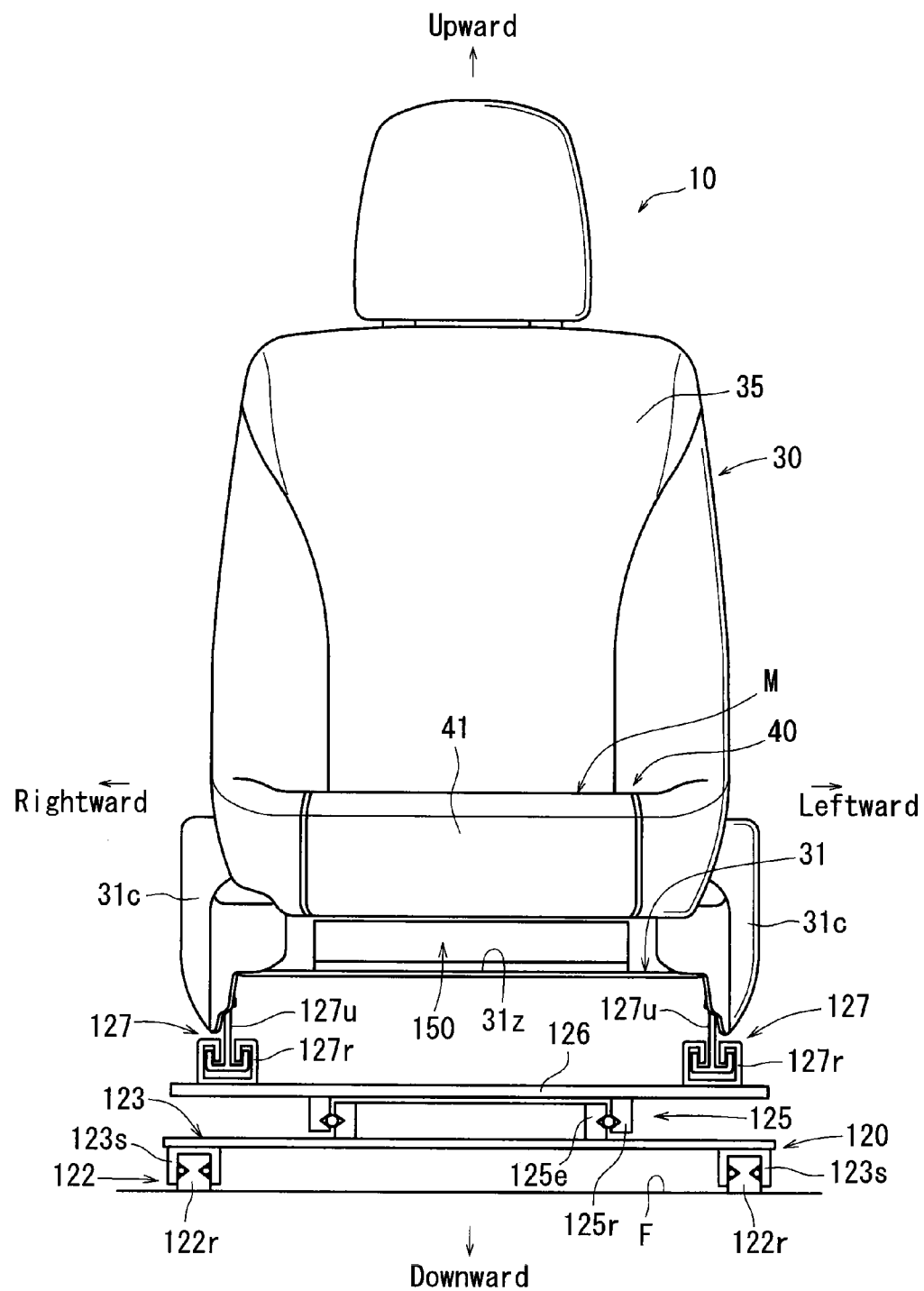
FIG. 12 is an elevational view of the vehicle seat, illustrating the condition in which the vehicle travels.

As shown in FIGS. 10 to 12, the vehicle seat 10 has a seat main body 30, a slide rotation mechanism 120 that is configured to horizontally rotate the seat main body 30 while sliding longitudinally with respect to a vehicle floor F, and a longitudinal slide mechanism 127 that is configured to longitudinally slide the seat main body 30 with respect to a rotation table 126 of the slide rotation mechanism 120.

As shown in, for example, FIG. 11, the seat main body 30 is composed of a seat frame 31, a seat cushion 40 disposed on the seat frame 31, a seat back 35 that is vertically rotatably connected to a rear end portion 31b of the seat frame 31, and a cushion tilting mechanism 150 that is capable of tilting (raising) a movable cushion portion M of the seat cushion 40 such that a front end edge side thereof can be positioned down (FIG. 10).

<Regarding the Slide Rotation Mechanism 120 and the Longitudinal Slide Mechanism 127>

As shown in FIG. 8, the slide rotation mechanism 120 is a mechanism that is configured to horizontally rotate the seat main body 30 to the right without interfering with a center pillar Cp while sliding the seat main body 30 forwardly when the occupant gets out of the vehicle. As shown in FIGS. 10 to 12, the slide rotation mechanism 120 is composed of a slide mechanism 122 that is capable of sliding a slide table 123 longitudinally on the vehicle floor F, a rotation mechanism 125 that is capable of rotating a rotation table 126 horizontally on the slide table 123, and an interlock mechanism (not shown) that is capable of moving both of the mechanisms 122 and 125 in conjunction with each other. The slide mechanism 122 is composed of a pair of right and left lower rails 122r that are disposed on the vehicle floor F so as to extend in a longitudinal direction, right and left slide rails 123s that are attached to a lower surface of the slide table 123 and slidably fit-engaged with the right and left lower rails 122r, and a drive mechanism such as a motor (not shown) that is capable of sliding the slide table 123 longitudinally.

The rotation mechanism 125 is composed of an inner wheel 125e and an outer wheel 125r that are connected to each other so as to be rotated relative to each other about an axis thereof, and a drive mechanism such as a motor (not shown) that is capable of rotating the wheels 125e and 125r relative to each other about the axis thereof. Further, a lower surface of the inner wheel 125e is secured to an upper surface of the slide table 123, and an upper surface of the outer wheel 125r is secured to a lower surface of the rotation table 126.

Figure 9:
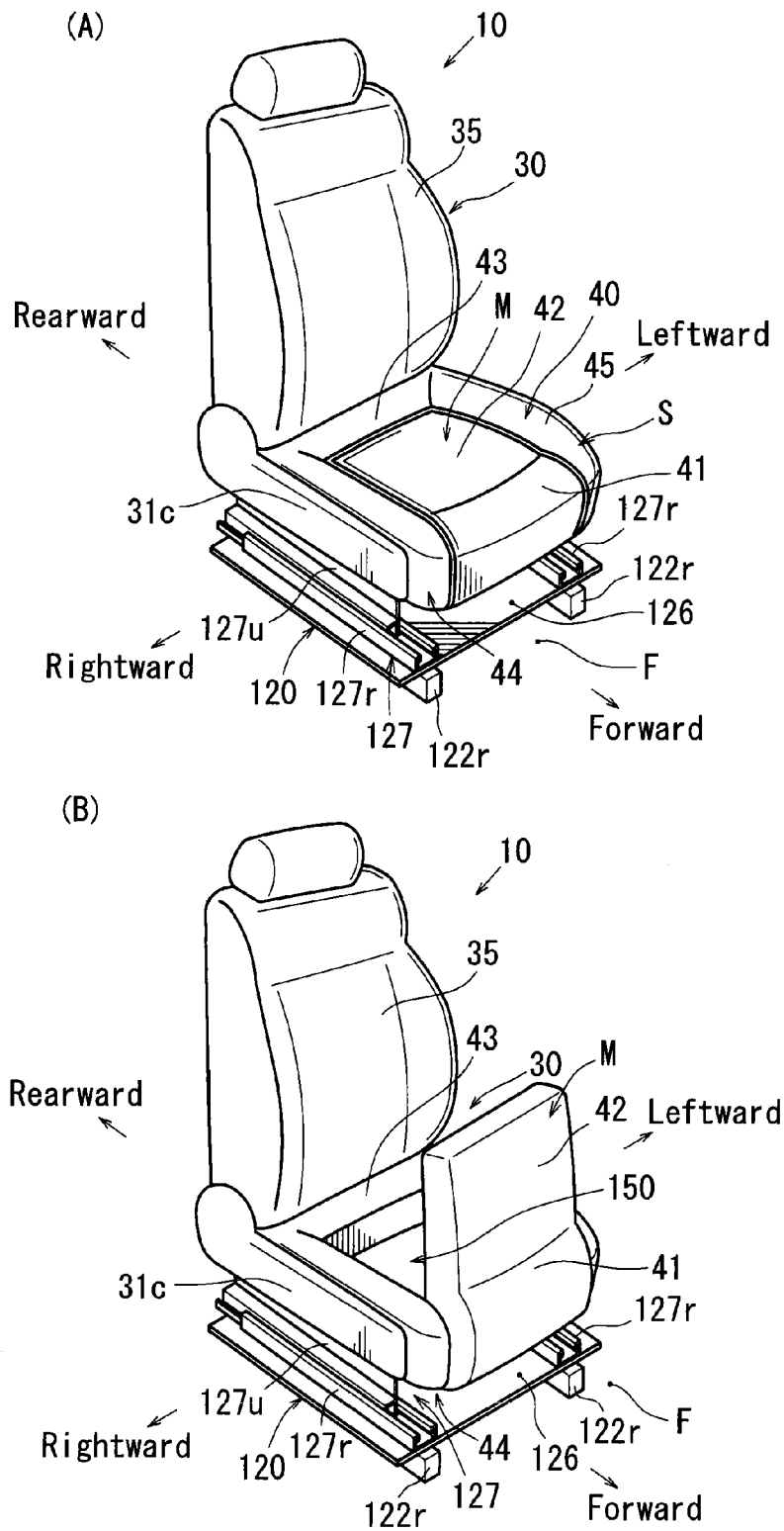
FIG. 9(A) is a schematic perspective view of the vehicle seat, illustrating a condition in which the vehicle travels.
FIG. 9(B) is a schematic perspective view of the vehicle seat, illustrating a condition in which the occupant gets in and out of the vehicle.

The seat main body 30 is disposed on the rotation table 126 via the longitudinal slide mechanism 127. The longitudinal slide mechanism 127 is a mechanism that is capable of adjusting a longitudinal position of the seat main body 30. As shown in FIG. 9, the longitudinal slide mechanism 127 is composed of a pair of right and left lower rails 127r that are disposed on the rotation table 126 so as to extend in the longitudinal direction, upper rails 127u that are attached to widthwise both sides (side wall portions) of the seat frame 31 and are fit-engaged with the right and left lower rails 127r, and a drive mechanism such as a motor (not shown) that is capable of sliding the seat frame 31 longitudinally.

Here, as shown in, for example, FIGS. 9(A), 9(B) and 12, the side wall portions of the seat frame 31 are covered by frame covers 31c. In FIGS. 10 and 11, the frame cover 31c and the side wall portions of the seat frame 31 are omitted.

<Regarding the Seat Cushion 40>

As shown in FIG. 9(A), the seat cushion 40 has a cushion front portion 41, a cushion central portion 42 and a cushion rear portion 43 in order from a front side of a central portion thereof. Further, the seat cushion 40 has a right side portion 44 that is provided to a right side (a side facing the door opening (not shown)) of the central portion, and a left side portion 45 that is provided to a left side (a side facing a center of a vehicle interior) of the central portion.

The cushion front portion 41 is a portion that mainly supports the thighs of the sitting occupant, and is formed to be gently inclined such that a seating surface thereof can be low in a rear side thereof. The cushion central portion 42 is a portion that mainly supports the buttocks of the occupant, and is formed such that a seating surface thereof can be positioned at a lowest level and be flattened. The cushion rear portion 43 is formed to be gently inclined so as to be low in a front side thereof.

The right side portion 44 is inclined such that a seating surface thereof can be heightened in a right side (a side facing the door opening). The left side portion 45 is inclined such that a seating surface thereof can be heightened in a left side (a side facing the center of the vehicle interior). That is, because the seating surface of the right side portion 44 and the seating surface of the left side portion 45 are formed as inclined surfaces that are inclined with respect to the seating surfaces of the cushion front portion 41, the cushion central portion 42 and the cushion rear portion 43, the seat cushion 40 can have an increased holding performance when the occupant sits thereon.

The cushion front portion 41 and the cushion central portion 42 of the seat cushion 40 are integrated with each other and are separated from remaining portions of the seat cushion 40, i.e., the cushion rear portion 43, the right side portion 44 and the left side portion 45. The cushion rear portion 43, the right side portion 44 and the left side portion 45 of the seat cushion 40 are secured to the seat frame 31. Further, as shown in FIG. 9(B), the cushion front portion 41 and the cushion central portion 42 of the seat cushion 40 can be vertically rotatable about the front end edge side of the cushion front portion 41 due to the action of a cushion tilting mechanism 50 (which will be hereinafter described).

Further, the cushion front portion 41 and the cushion central portion 42 of the seat cushion 40 may be referred to as the movable cushion portion M, and the cushion rear portion 43, the right side portion 44 and the left side portion 45 of the seat cushion 40 may be referred to as a stationary cushion portion S.

<Regarding the Cushion Tilting Mechanism 150>

The cushion tilting mechanism 150 is a mechanism that is capable of raising the cushion central portion 42 while gradually tilting (raising) the movable cushion portion M of the seat cushion 40 such that the front end edge side thereof can be positioned low. The cushion tilting mechanism 150 is positioned under the seat cushion 40. As shown in FIGS. 10 and 11, the cushion tilting mechanism 150 is composed of a cushion support member 152 that is integrated with the movable cushion portion M so as to support the movable cushion portion M from below, a horizontal support shaft 154 that is capable of vertically rotatabley supporting a front portion of the cushion support member 152, a link 155 that is capable of vertically rotating the cushion support member 152 about the horizontal support shaft 154, and a drive portion 160.

The cushion support member 152 is constructed of a frame portion 152f that is positioned along the movable cushion portion M, a rotation center portion 152c that is hooked over the horizontal support shaft 154, and a protruding portion 152t that is projected from a position of the rotation center portion 152c at a substantially right angle with respect to the frame portion 152f, so as to have a substantially reverse L-shape in side view.

The horizontal support shaft 154 is positioned in a front portion of the seat main body 30 so as to extend in a width direction of the seat main body 30. Both ends of the horizontal support shaft 154 are connected to the right and left side wall portions (not shown) of the seat frame 31. Thus, the rotation center portion 152c of the cushion support member 152 can be determined on a predetermined position of the seat main body 30.

Further, the horizontal support shaft 154 corresponds to a horizontal support portion of the present invention. Also, the horizontal support shaft 154, the cushion support member 152 and the link 155 correspond to a link mechanism of the present invention.

The drive portion 160 of the cushion tilting mechanism 150 has a screw shaft 162 that is disposed on a bottom plate 31z of the seat frame 31 so as to extend longitudinally therealong, and a nut 163 that is threadably engaged with the screw shaft 162. Connected to a proximal end portion (rear end portion) of the screw shaft 162 is a motor 161 that is configured to rotate the screw shaft 162 about an axis thereof. A distal end portion and the proximal end portion of the screw shaft 162 are respectively rotatably supported by bearings 164a and 164b. Further, a proximal end portion of the link 155 is vertically rotatably connected to the nut 163. Conversely, a distal end portion of the link 155 is vertically rotatably connected to a distal end of the protruding portion 152t of the cushion support member 152.

Thus, when the motor 161 is driven in a condition shown in, for example, FIG. 11, the screw shaft 162 rotates in a normal direction, so that the nut 163 can move backwards (toward the motor 161) along the screw shaft 162 because the screw shaft 162 and the nut 163 are threadably engaged with each other. Therefore, the protruding portion 152t of the cushion support member 152 is pulled backwardly and downwardly by the link 155. As a result, as shown in FIG. 10, the cushion support member 152 and the movable cushion portion M of the seat cushion 40 rotate to the right about the horizontal support shaft 154. In other words, the movable cushion portion M of the seat cushion 40 can be tilted about the front end edge side of the movable cushion portion M such that the cushion central portion 42 can be positioned high. Further, in a condition in which the nut 163 has reached a retreat limit position, the motor 161 stops, so that the movable cushion portion M can be maintained in a condition in which it is tilted by a predetermined angle (FIG. 10).

When the screw shaft 162 rotates in a reverse direction in this condition, the nut 163 can move forwards along the screw shaft 162 because the screw shaft 162 and the nut 163 are threadably engaged with each other. As a result, the protruding portion 152t of the cushion support member 152 is pushed forwards and upwards by the link 155, and the movable cushion portion M of the seat cushion 40 can rotate to the left about the horizontal support shaft 154 under its own weight. Further, in a condition in which the nut 163 is advanced to an advancement limit position, the motor 161 stops, so that the movable cushion portion M is returned to an initial position. Thus, a seating surface of the movable cushion portion M can b continuous with a seating surface of the stationary cushion portion S (FIG. 9(A)).

Further, the above-mentioned drive portion 160 corresponds to a drive mechanism of the present invention. Also, the nut 163 of the drive portion 160 corresponds to a movable portion of the drive mechanism of the present invention.

<Regarding Operation of the Vehicle Seat 10 According to the Present Embodiment>

First, an operation of the vehicle seat 10 will be described starting from a condition in which the occupant has completely got in the vehicle. In this condition, as shown in FIG. 9(A), the movable cushion portion M of the seat cushion 40 is maintained in a lower limit position, so that the seating surface of the movable cushion portion M is continuous with a seating surface of the stationary cushion portion S. Further, it is possible to adjust a longitudinal position of the seat main body 30 for physical constitution of the occupant by operating the longitudinal slide mechanism 127.

Next, when the occupant gets out of the vehicle, a seat belt is detached. Thereafter, a getting-out switch (not shown) is operated while a right door is opened. As a result, the slide rotation mechanism 120 is first operated, so that the seat main body 30 can be rotated to the right while being slid forwardly. Thus, the seat main body 30 is directed toward the door opening E. Next, the motor 161 of the cushion tilting mechanism 150 is operated, so that the screw shaft 162 can be rotated in the normal direction. Thus, the nut 163 can move backwards along the screw shaft 162 from the condition shown in FIG. 11. As a result, the protruding portion 152t of the cushion support member 152 is pulled backwards and downwards by the link 155. Thus, as shown in FIG. 10, the cushion support member 152 and the movable cushion portion M of the seat cushion 40 can rotate to the right about the horizontal support shaft 154. As a result, the movable cushion portion M of the seat cushion 40 is gradually raised (tilted) while the front end edge side is positioned low, so that the cushion central portion 42 can be positioned high. Thus, the buttocks of the occupant can be pushed up (FIG. 8). As a result, the knees of the occupant can be extended. Therefore, a burden on the body of the occupant can be reduced.

When the occupant gets in a vehicle in a condition shown in FIG. 8, a getting-in switch (not shown) is operated while his/her weight is applied to the movable cushion portion M of the seat cushion 40. As a result, first, the motor 161 of the cushion tilting mechanism 150 is operated, so that the screw shaft 162 can be rotated in the reverse direction. As a result, the nut 163 moves forwards along the screw shaft 162 from a condition shown in FIG. 10. Thus, the cushion support member 152 and the movable cushion portion M of the seat cushion 40 rotate to the left about the horizontal support shaft 154, so that the cushion central portion 42 can be gradually lowered. As shown in FIGS. 9(A) and 11, in a condition in which the movable cushion portion M of the seat cushion 40 has reached the lower limit position, the seating surface of the movable cushion portion M can be continuous with the seating surface of the stationary cushion portion S. Next, the slide rotation mechanism 120 is operated, so that the seat main body 30 can be rotated to the left while sliding backwardly. Thus, the seat main body 30 can be directed forwardly.

In this condition, the right side door is closed. Thus, the occupant can get in the vehicle.

<Advantages of the Vehicle Seat According to the Present Embodiment>

In the vehicle seat 10 according to the present embodiment, the drive portion 160 of the cushion tilting mechanism 150 that is positioned under the seat cushion 40 is constructed to horizontally reciprocate the nut 163 (the movable portion) along the screw shaft 162. Therefore, the height of the drive portion 160 can be reduced as compared with the construction in which the nut 163 (the movable portion) is vertically reciprocated. As a result, the seating position of the seat cushion 40 that is positioned above the drive portion 160 can be kept low.

Further, because the nut 163 (the movable portion) is constructed to be horizontally reciprocated, a reciprocation stroke of the nut 163 (the movable portion) can be increased while the seating position of the seat cushion 40 is kept low. As a result, the movable cushion portion M of the seat cushion 40 can be largely inclined when the occupant gets in and out of the vehicle, so that a rising amount of the movable cushion portion M can be increased.

Further, because the seat cushion 40 can be rotated horizontally toward the door opening E by the slide rotation mechanism 120, the occupant can further easily get in and out of the vehicle.

<Modified Form>

Figure 13:
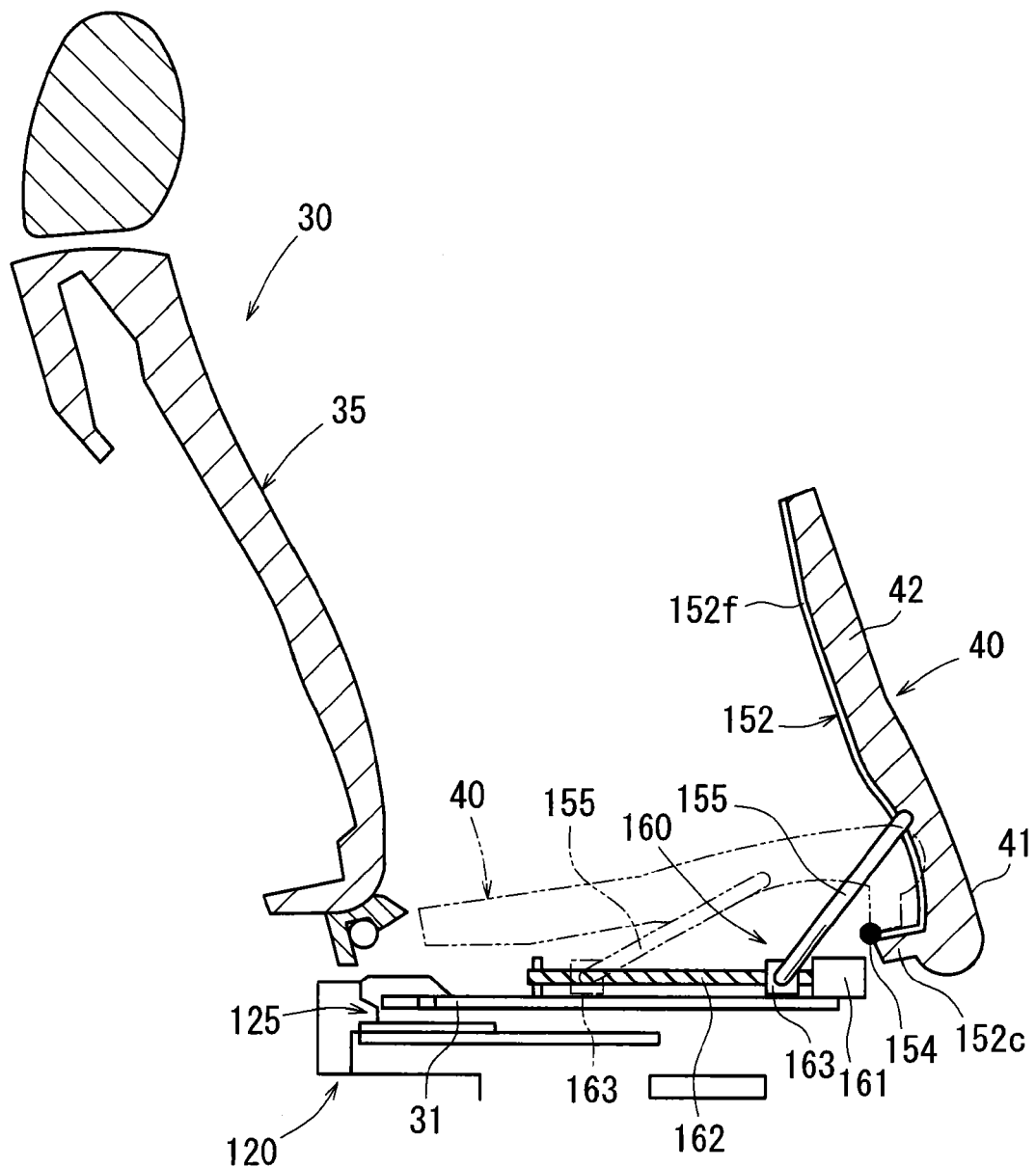
FIG. 13 is a side view of a vehicle seat according to Modified Form 1, illustrating a condition in which the occupant gets in and out of the vehicle.

Further, the present invention is not limited to the embodiment and can be modified without departing from the scope of the present invention. For example, in the vehicle seat 10 according to the present embodiment described above, the rotation center portion 152c positioned in a midway position of the cushion support member 152 of the cushion tilting mechanism 150 is supported by the horizontal support shaft 154, and the distal end of the protruding portion 152t of the cushion support member 152 is connected to the nut 163 of the drive portion 160 via the link 155. However, as shown in FIG. 13, the rotation center portion 152c provided to a distal end portion of the cushion support member 152 can be supported by the horizontal support shaft 154, and the midway position of the cushion support member 152 can be connected to the nut 163 of the drive portion 160 via the link 155.

Further, in the present embodiment, after the seat main body 30 is horizontally rotated toward the door opening E by the slide rotation mechanism 120, the movable cushion portion M of the seat cushion 40 is gradually tilted such that the front end edge side thereof can be positioned low. However, as shown in FIG. 14, the movable cushion portion M of the seat cushion 40 can be constructed to be tilted such that the right end edge side can be positioned low after the movable cushion portion M is slid to the right toward the door opening E.

Figure 14:
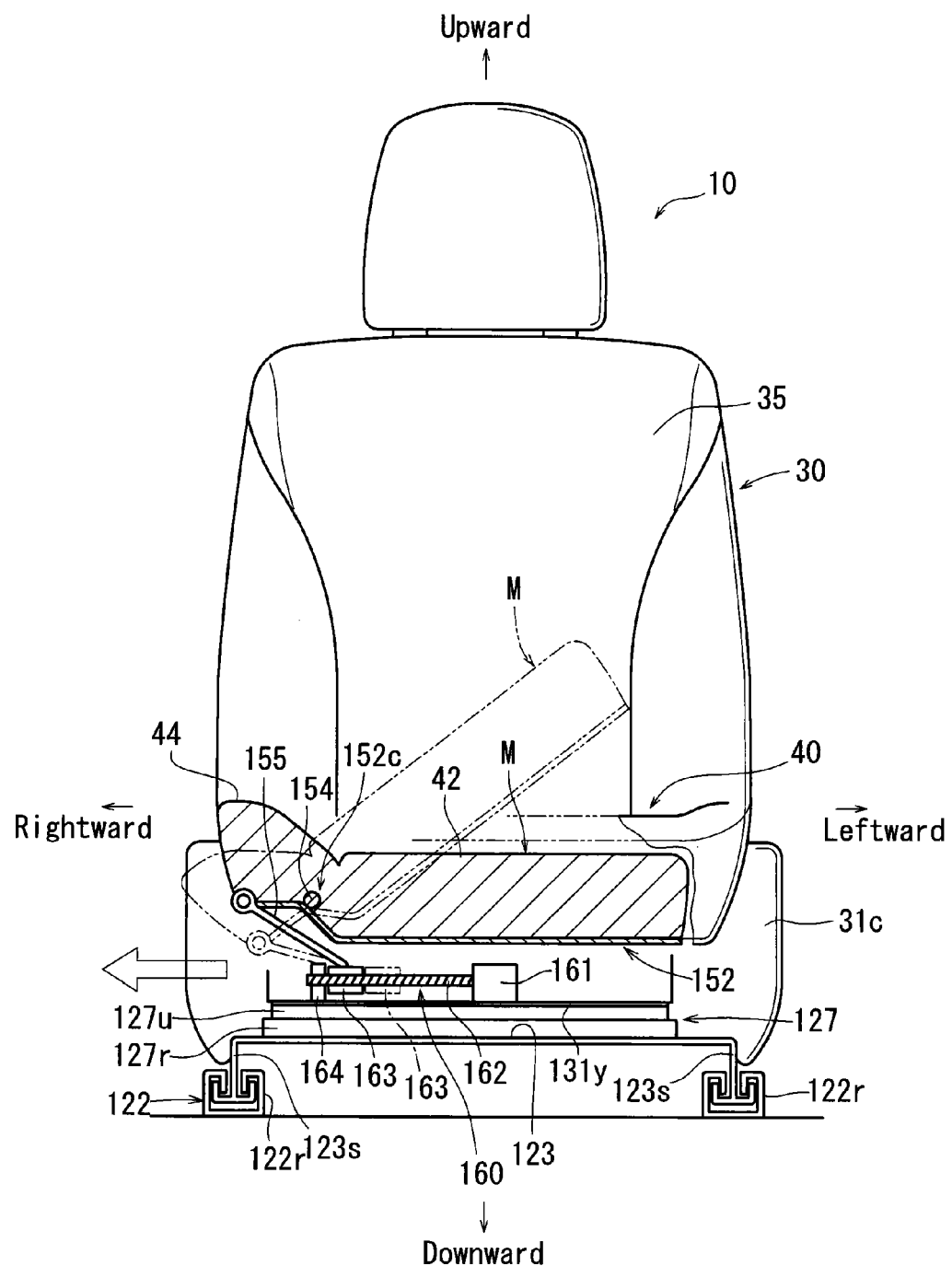
FIG. 14 is a partially cutaway elevational view of a vehicle seat according to Modified Form 2.

That is, in the seat cushion 40 shown in FIG. 14, the movable cushion portion M is composed of the cushion central portion 42 and a central portion of the right side portion 44. The cushion support member 152 is provided to a lower surface of the movable cushion portion M. Further, the rotation center portion 152c is positioned in the vicinity of a right end of the cushion support member 152. The rotation center portion 152c is supported by the horizontal support shaft 154 that is extended longitudinally.

The horizontal support shaft 154 is supported horizontally by a wall portion (not shown) of a right slide table 131y that is capable of sliding to the right with respect to the seat cushion 40.

The screw shaft 162 of the drive portion 160 of the cushion tilting mechanism 150 is disposed on the right slide table 131y so as to be laterally extended. The nut 163 is threadably engaged with the screw shaft 162. Connected to the proximal end portion of the screw shaft 162 is the motor 161 that is capable of rotating the screw shaft 162 about the axis thereof Conversely, the distal end portion of the screw shaft 162 is rotatably supported by the bearing 164. Further, the proximal end portion of the link 155 is vertically rotatably connected to the nut 163. Conversely, the distal end portion of the link 155 is vertically rotatably connected to the right end of the cushion support member 152.

Thus, when the screw shaft 162 is rotated by the motor 161, the nut 163 moves to the left or to the right along the screw shaft 162 because the nut 163 is threadably engaged with the screw shaft 162. As a result, the movable cushion portion M of the seat cushion 40 can be rotated to the left or to the right in FIG. 14 about the horizontal support shaft 154.

The right slide table 131y is constructed to slide laterally on the longitudinal slide table 123 due to the action of a longitudinal slide mechanism 127 having lower rails 127r and upper rails 127u.

Thus, the movable cushion portion M of the seat cushion 40 can be tilted such that the right end edge side can be positioned low after the movable cushion portion M is slid to the right toward the door opening E when the occupant gets in and out of the vehicle, such that the buttocks of the occupant can be pushed up.

In the present embodiment, the drive portion 160 of the cushion tilting mechanism 150 is composed of the screw shaft 162 and the nut 163 and the rest. However, instead of the screw shaft 162 and the nut 163, for example, a rack/pinion, an air cylinder or other such devices can be used.

Further, in the present embodiment, each of the slide rotation mechanism 120 and the longitudinal slide mechanism 127 is operated by the drive mechanism such as the motor. However, they can be constructed to be manually operated.

Further, in the present embodiment, the present invention is applied to the vehicle seat 10 (the driver's seat or other such seats) that is constructed to allow the occupant to sit thereon from right passing through the right door opening E. However, the present invention is also applicable to a vehicle seat (e.g., an assistant driver's seat) that is constructed to allow the occupant to sit thereon from left passing through a left door opening.

Further, in the present embodiment, the present invention is applied to a seat that is directed forwardly of the vehicle. However, the present invention is also applicable to a seat that is directed laterally of the vehicle.

The embodiment can be expressed as follows.

A vehicle seat includes a seat cushion, a drive mechanism, and a link mechanism, wherein the seat cushion has a stationary cushion portion and a movable cushion portion and is configured to raise a buttocks receiving portion supporting the buttocks of an occupant by a portion of the movable cushion portion when the movable cushion portion is tilted, wherein the drive mechanism is positioned under the seat cushion and is configured to horizontally reciprocate a movable portion under the seat cushion, and wherein the link mechanism is configured such that when the movable portion moves in a predetermined direction due to the action of the drive mechanism, the movable cushion portion of the seat cushion can be tilted according to an amount of motion of the movable portion.

The vehicle seat may further include a rotation mechanism that is configured to horizontally rotate the seat cushion toward a door opening of a vehicle.

In the vehicle seat, the link mechanism may configured to tilt the movable cushion portion of the seat cushion toward a door opening of a vehicle. The vehicle seat may further include a slide mechanism that is configured to slide the movable cushion portion, the link mechanism and the drive mechanism horizontally toward the door opening of the vehicle.

In the vehicle seat, the link mechanism may be formed along the movable cushion portion of the seat cushion, and may have a cushion support member that is integrated with the movable cushion portion, a horizontal support portion that supports a midway portion of the cushion support member horizontally as a center of vertical rotation thereof, and a link that vertically rotatably connects one end of the cushion support member nearer to the horizontal support portion and the movable portion of the drive mechanism.

In the vehicle seat, the link mechanism may be formed along the movable cushion portion of the seat cushion, and may have a cushion support member that is integrated with the movable cushion portion, a horizontal support portion that supports one end of the cushion support member horizontally as a center of vertical rotation thereof, and a link that vertically rotatably connects a midway portion of the cushion support member and the movable portion of the drive mechanism.

Embodiment 3

In the following, a vehicle seat according to Embodiment 3 of the present invention will be described with reference to FIGS. 15 to 24.

<Conventional Construction>

Figure 33:
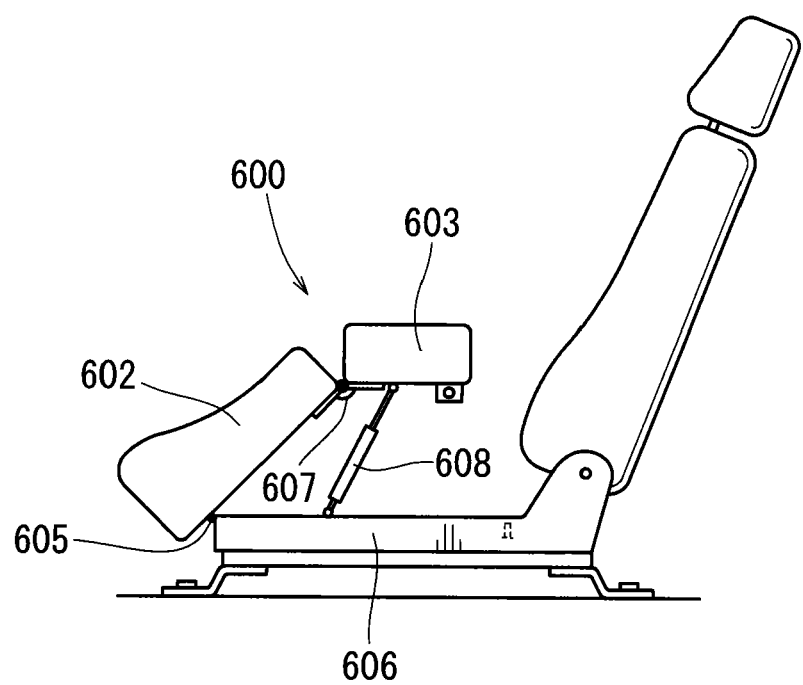
FIG. 33 is a schematic elevational view of a conventional vehicle seat.

As shown in FIG. 33, a conventional vehicle seat (Japanese Laid-Open Patent Publication No. 2007-237804) has a seat cushion 600 that is composed of a cushion front portion 602 and a cushion rear portion 603. A front end lower portion of the cushion front portion 602 is connected to a front end portion of a seat frame 606 via a hinge 605. Conversely, a rear end lower portion of the cushion front portion 602 is connected to a front end lower portion of the cushion rear portion 603 via a hinge 607. Further, the cushion rear portion 603 is supported by a damper 608 from below. As a result, when an occupant sits on the cushion rear portion 603 and the cushion front portion 602 pushed up by the damper 608 in order to get in a vehicle, the cushion rear portion 603 and the cushion front portion 602 can be gently lowered to a sitting position against a force of the damper 608 by weight of the occupant. When the occupant gets out of the vehicle, the damper 608 can function to push up the buttocks of the occupant trying to stand up.

As shown in FIG. 33, in the vehicle seat, in a condition in which the cushion front portion 602 and the cushion rear portion 603 are pushed up by the damper 608, a space formed between the cushion front portion 602 and the cushion rear portion 603 and the seat frame 606 is fully opened. Thus, when the occupant gets in the vehicle, the occupant can access a lower surface of the cushion rear portion 603 and the damper 608. This is undesirable to safety.

It is an object of a vehicle seat of the present embodiment to prevent a hand or the like from being caught between the movable cushion portion capable of moving up and down and the stationary cushion portion, so as to increase safety thereof.

<Outline of the Vehicle Seat 10>

A vehicle seat 10 according to the present embodiment is a seat (driver's seat or other such seats) of a vehicle having a relatively low vehicle height, which seat is constructed to allow an occupant to sit thereon from right passing through a right door opening.

Figure 15:
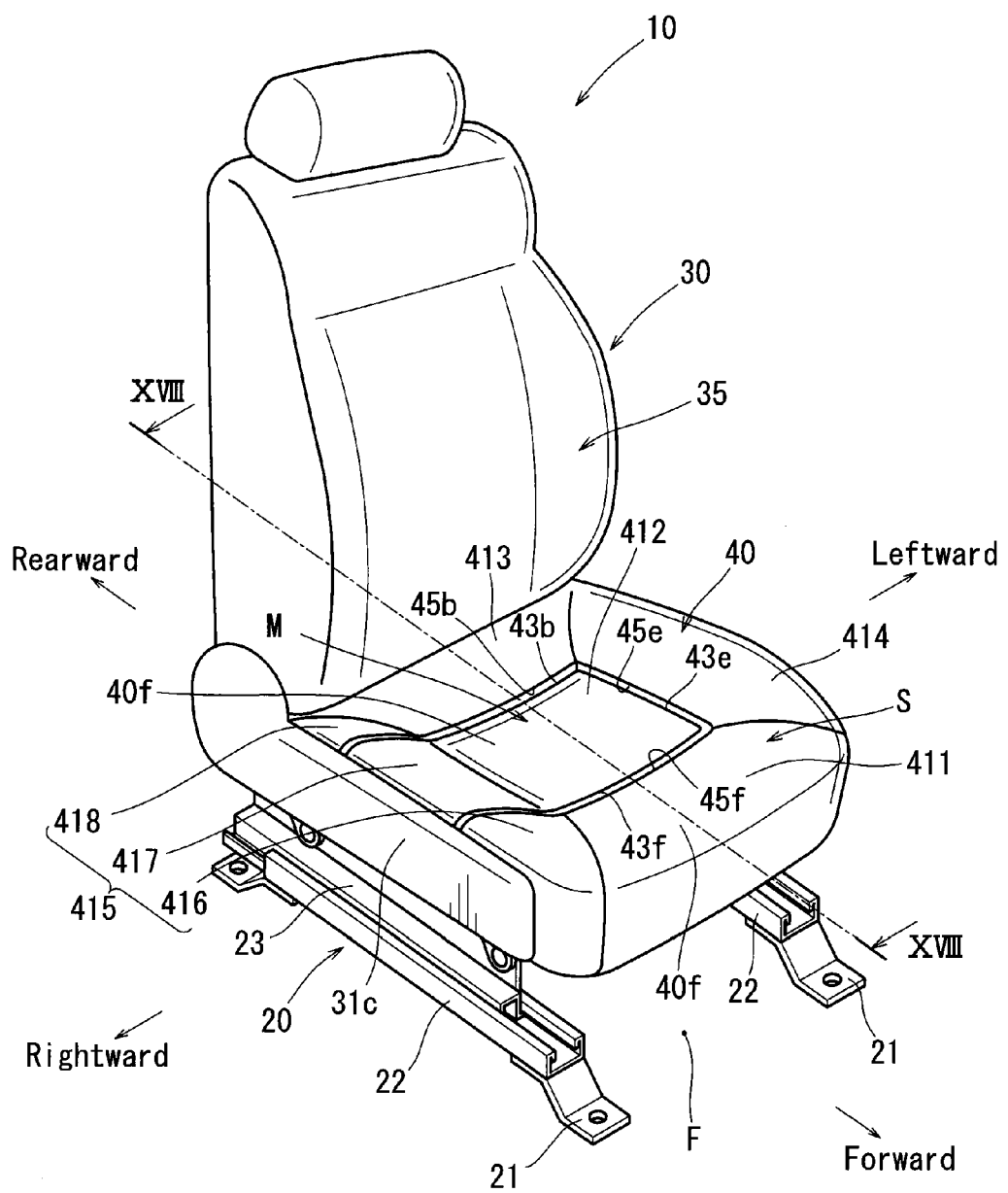
FIG. 15 is a full perspective view of a vehicle seat according to Embodiment 3 of the present invention.
Figure 16:
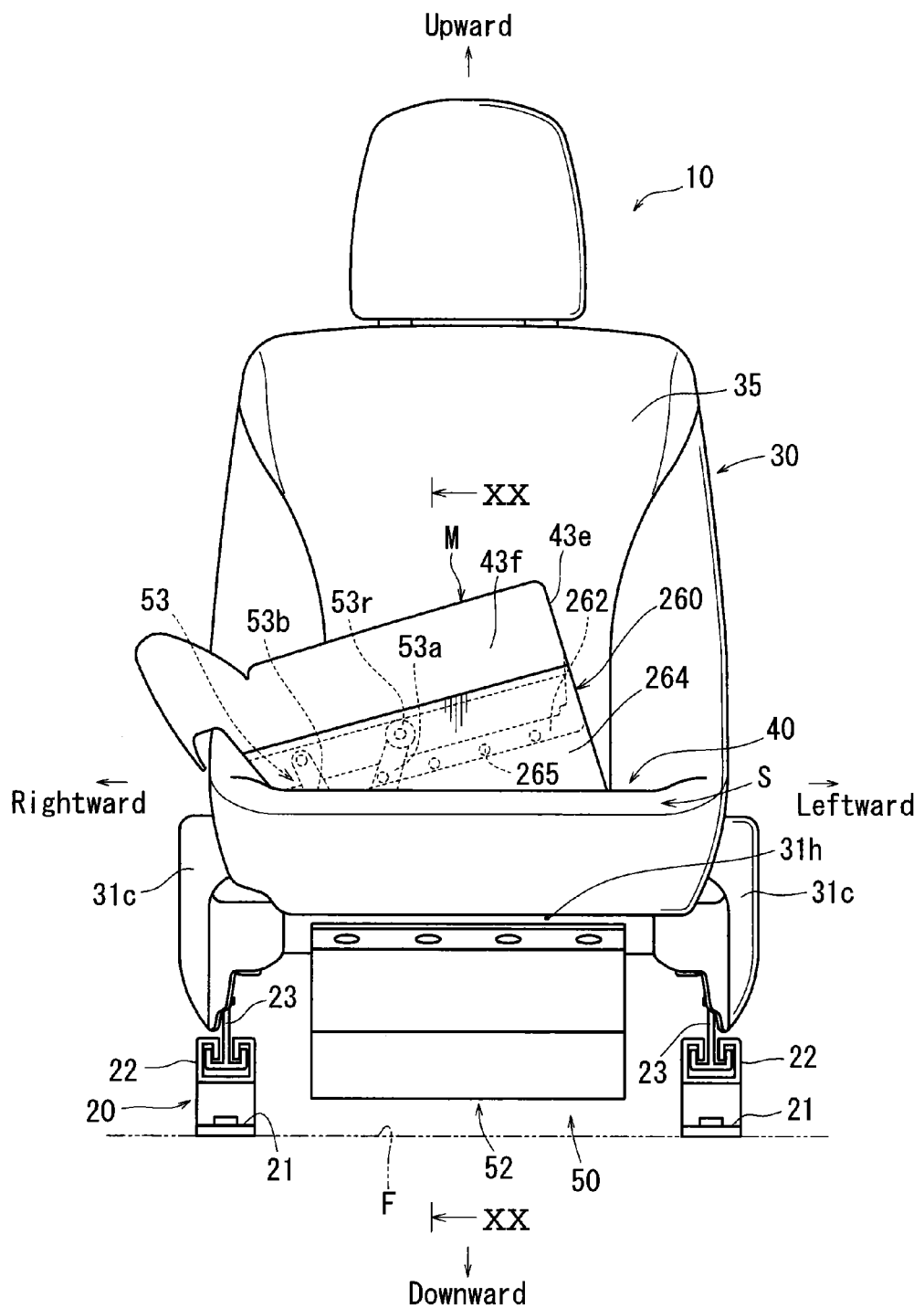
FIG. 16 is an elevational view of the vehicle seat, illustrating a condition in which a movable cushion portion is raised to a loading/unloading position.
Figure 17:
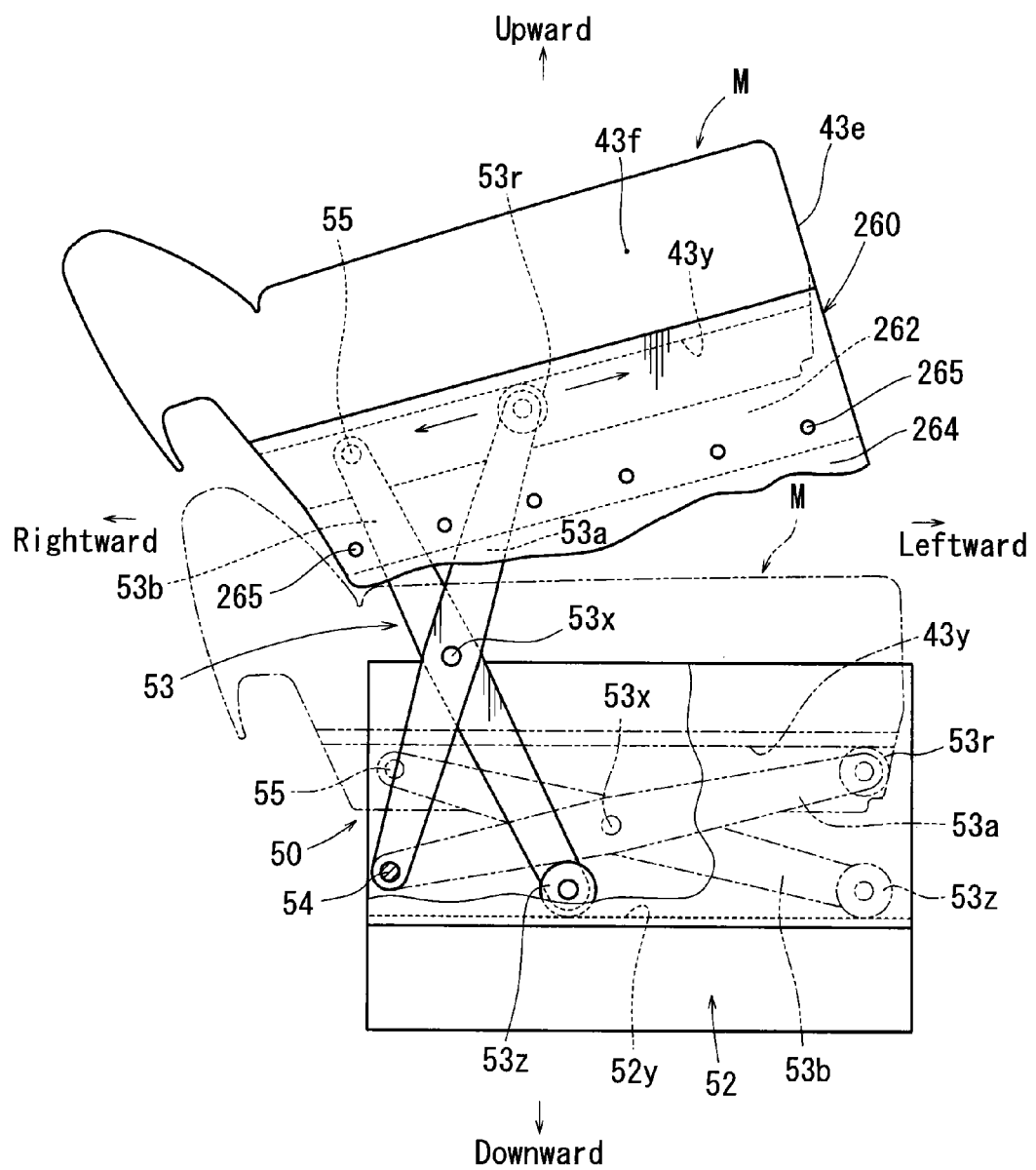
FIG. 17 is an elevational view of a raising/lowering mechanism of the movable cushion portion.

As shown in FIGS. 15 and 16, the vehicle seat 10 has a seat main body 30, and a longitudinal slide mechanism 20 that is configured to longitudinally slide the seat main body 30 with respect to a vehicle floor F.

Further, the seat main body 30 is composed of a seat frame (not shown) supported by the longitudinal slide mechanism 20, a seat cushion 40 that is disposed on the seat frame, a seat back 35 that is vertically rotatably connected to a rear end portion of the seat frame, and a cushion tilting mechanism 50 that is capable of raising a portion M of the seat cushion 40 with respect to the seat frame and the rest and tilting the same toward the door opening. Further, the seat frame is covered by side covers 31c, so as to be invisible from outside.

<Regarding the Slide Mechanism 20>

As shown in FIGS. 15 and 16, the longitudinal slide mechanism 20 is composed of a pair of right and left lower rails 22 that are disposed on the vehicle floor F so as to extend in a longitudinal direction, right and left upper rails 23 that are configured to be slidable in the longitudinal direction along the right and left lower rails 22, and a drive mechanism (not shown) that is configured to slide the upper rails 23 longitudinally with respect to the lower rails 22. Each of the lower rails 22 is a grooved rail having an open-topped substantially C-shape in cross section. As shown in, for example, FIG. 16, lower sides of front and rear end portions of each of the lower rails 22 are respectively connected to the vehicle floor F by support strips 21. As shown in FIG. 16, each of the upper rails 23 is a plate-shaped rail having a substantially reverse T-shape in cross section. A lower portion of each of the upper rails 23 is fit-engaged with each of the lower rails 22 from a front end or a rear end thereof. Thus, the upper rails 23 can slide in the longitudinal direction along the lower rails 22 while the upper rails 23 and the lower rails 22 are fit-engaged with each other.

<Regarding the Seat Cushion 40>

As shown in FIG. 15, the seat cushion 40 has a cushion front portion 411, a cushion central portion 412 and a cushion rear portion 413 in order from a front side of a central portion thereof. Further, the seat cushion 40 has a left side portion 414 that is provided to a left side (a side facing a center of a vehicle interior) of the central portion, and a right side portion 415 that is provided to a right side (a side facing the door opening (not shown)) of the central portion. The right side portion 415 is divided into a front portion 416, a central portion 417 and a back portion 418.

The cushion central portion 412 and the central portion 417 of the right side portion 415 of the seat cushion 40 are integrated with each other and are separated from remaining portions of the seat cushion 40, i.e., the front portion 416 and the back portion 418 of the right side portion 415, the cushion front portion 411, the left side portion 414 and the cushion rear portion 413. Further, the front portion 416 and the back portion 418 of the right side portion 415, the cushion front portion 411, the left side portion 414 and the cushion rear portion 413 of the seat cushion 40 are secured to the seat frame. Thus, in the following, the front portion 416 and the back portion 418 of the right side portion 415, the cushion front portion 411, the left side portion 414 and the cushion rear portion 413 of the seat cushion 40 will be referred to as a stationary cushion portion S.

Further, the cushion central portion 412 and the central portion 417 of the right side portion 415 of the seat cushion 40 can be raised and lowered with respect to the stationary cushion portion S due to the action of a cushion tilting mechanism 50 (which will be hereinafter described). Thus, in the following, the cushion central portion 412 and the central portion 417 of the right side portion 415 of the seat cushion 40 will be referred to as a movable cushion portion M.

As shown in FIG. 15, the movable cushion portion M has a front end boundary position-side surface 43*f*, a left end boundary position-side surface 43*e* and a rear end boundary position-side surface 43*b* that are vertically formed in a boundary portion between the movable cushion portion M and the stationary cushion portion S. Further, the stationary cushion portion S has a front end boundary position-side surface 45*f*, a left end boundary position-side surface 45*e* and a rear end boundary position-side surface 45*b* that are vertically formed in a boundary position between the stationary cushion portion S and the movable cushion portion M. As shown in FIG. 15, in a condition in which the movable cushion portion M is lowered to the sitting position, the front end boundary position-side surface 43*f*, the left end boundary position-side surface 43*e* and the rear end boundary position-side surface 43*b* of the movable cushion portion M are respectively capable of surface-contacting the front end boundary position-side surface 43*f*, the left end boundary position-side surface 45*e* and the rear end boundary position-side surface 45*b* of the stationary cushion portion S.

Figure 18:
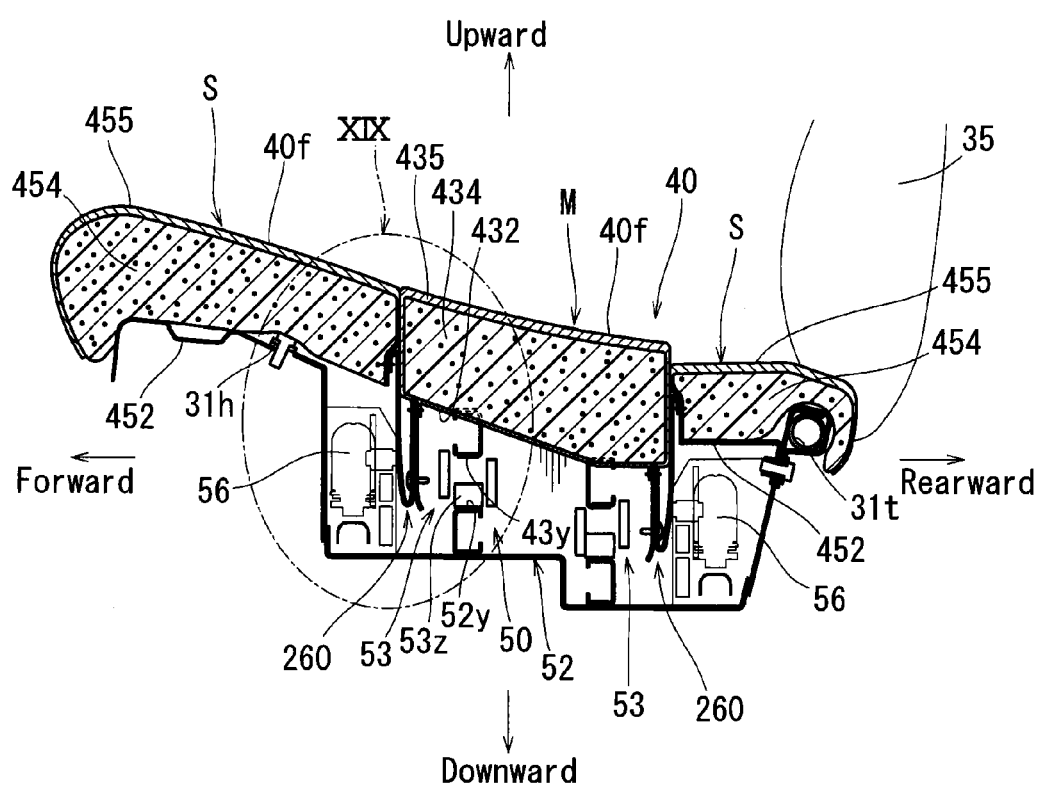
FIG. 18 is a sectional view taken along line XVIII-XVIII of FIG. 15.
Figure 19:
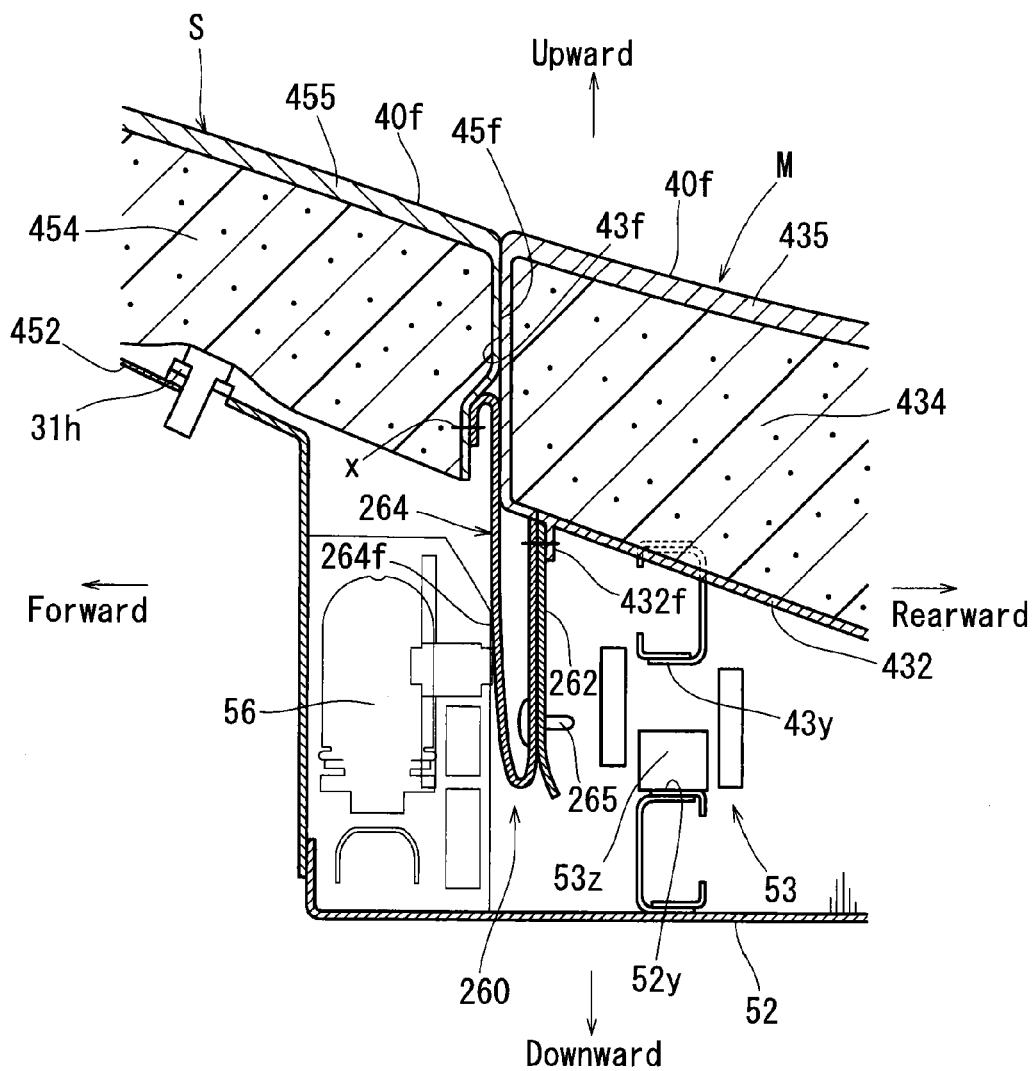
FIG. 19 is an enlarged view of a portion shown by XIX of FIG. 18.

As shown in, for example, vertically sectional views of FIGS. 18 and 19, the movable cushion portion M has a cushion main body 434 formed of urethane or other such materials is superimposed on an upper side of a shaped steel plate 432. A surface of the cushion main body 434 is covered by a skin member 435.

Similarly, the stationary cushion portion S has a cushion main body 454 formed of urethane or other such materials is superimposed on an upper side of a shaped steel plate 452. Further, a surface of the cushion main body 454 is covered by a skin member 455.

<Regarding the Cushion Tilting Mechanism 50>

The cushion tilting mechanism 50 is a mechanism that is capable of raising the movable cushion portion M of the seat cushion 40 with respect to the stationary cushion portion S of the seat cushion 40 and is capable of tilting the movable cushion portion M so as to be low in a side facing the door opening and high in a side facing the vehicle interior. As shown in, for example, FIGS. 16 to 18, the cushion tilting mechanism 50 is composed of a base plate 52 of which the front end portion and the rear end portions are suspended from the seat frame, a pair of front and rear cross links 53 (FIG. 17) disposed on the base plate 52, and a drive portion 56 (FIG. 18) that is capable of moving the cross links 53.

As shown in, for example, FIG. 18, the base plate 52 of the cushion tilting mechanism 50 is bent into a substantially U-shape in a side view. A front upper end portion of the base plate 52 is bolted on a front beam portion 31*h* that is positioned in a front portion of the seat frame so as to extend in a width direction. Conversely, a rear upper end portion of the base plate 52 is connected to a rear support pipe 31*t* that is positioned in a rear portion of the seat frame so as to extend in the width direction.

The pair of front and rear cross links 53 of the cushion tilting mechanism 50 are constructed to support the movable cushion portion M at front and rear portions thereof, so as to raise and lower and tilt the movable cushion portion M. Further, the front and rear cross links 53 are formed symmetrically in the longitudinal direction and has the same construction as each other. Therefore, the front cross link 53 will be representatively described with reference to the elevational views shown in FIG. 17.

The cross link 53 is constructed of a linear first link 53*a* and a linear second link 53*b*. The two links 53*a* and 53*b* are vertically rotatably connected to each other by a center connection pin 53*x* at portions in the vicinity of the centers thereof. Further, a lower end portion of the first link 53*a* is vertically rotatably connected to a receiving portion (not shown) that is formed in a right end of a front bottom portion of the base plate 52 via a lower end connection pin 54. Conversely, a roller 53*r* is attached to an upper end portion of the first link 53*a*. The roller 53*r* is capable of rolling over along a front side rail portion 43*y* that is formed in a lower side of the movable cushion portion M so as to be extended laterally.

An upper end portion of the second link 53*b* is vertically rotatably connected to the front side rail portion 43*y* formed in the movable cushion portion M by an upper end connection pin 55 at a portion in the vicinity of a right end thereof. Conversely, a roller 53*z* is attached to a lower end portion of the second link 53*b*. The roller 53*z* is capable of laterally rolling over along the front bottom portion 52*y* of the base plate 52.

When the drive portion 56 of the cushion tilting mechanism 50 is operated such that the first link 53*a* is raised while rotating to the left about the lower end connection pin 54, the second link 53*b* connected to the first link 53*a* via the central connection pin 53*x* is raised while rotating to the right about the upper end connection pin 55 of the movable cushion portion M of the seat cushion 40. That is, the cross link 53 can be raised due to the action of the drive portion 56 of the cushion tilting mechanism 50. As a result, the movable cushion portion M is pushed up by the cross link 53 and is gradually tilted such that a right side thereof (a side facing the door opening) can be low while being raised with respect to the stationary cushion portion S. When the movable cushion portion M is raised with respect to the stationary cushion portion S beyond a thickness of the movable cushion portion M, that is, beyond a height of the boundary position-side surfaces 43*f*, 43*e* and 43*b*, an open portion extended in a height direction can be formed in the boundary portion between the movable cushion portion M and the stationary cushion portion S. In a condition in which the cross link 53 is further raised, so as to have a predetermined angle, as shown by solid line in FIG. 17, the movable cushion portion M can be raised to a predetermined height position and is inclined such that the right side thereof (the side facing the door opening) can be low. That is, the movable cushion portion M can be maintained in a getting in/out position.

When the drive portion 56 is reversely operated such that the cross link 53 is operated so as to be folded, to the contrary of the above, the movable cushion portion M rotates so as to be inclined more gently while being lowered. Thereafter, when the movable cushion portion M is lowered to an initial position (a sitting position), a seating surface 40f of the movable cushion portion can be continuous with a seating surface 40f of the stationary cushion portion S.

<Regarding the Closing Member 260>

Figure 20:
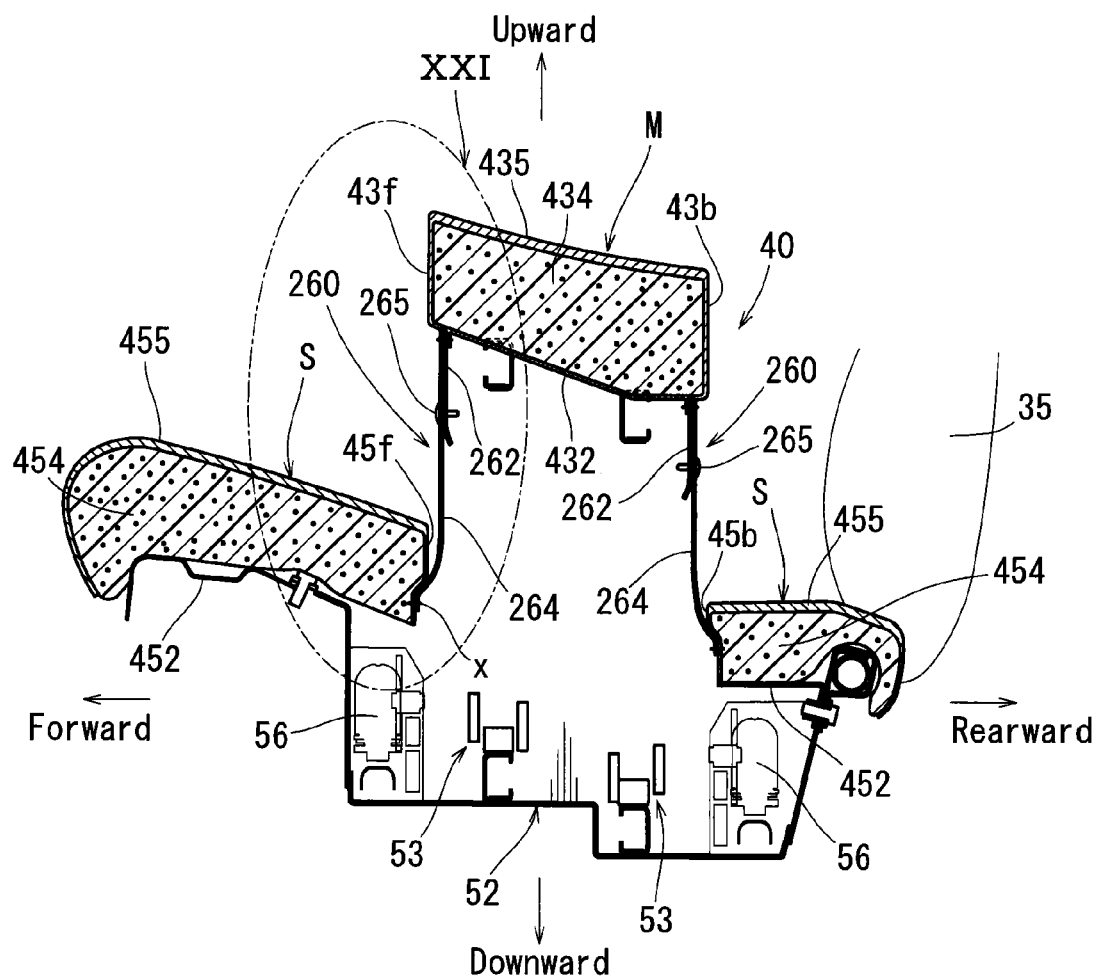
FIG. 20 is a longitudinal sectional view of the vehicle seat, illustrating the condition in which the movable cushion portion is raised to the loading/unloading position (a sectional view taken along line XX-XX of FIG. 16)
Figure 21:
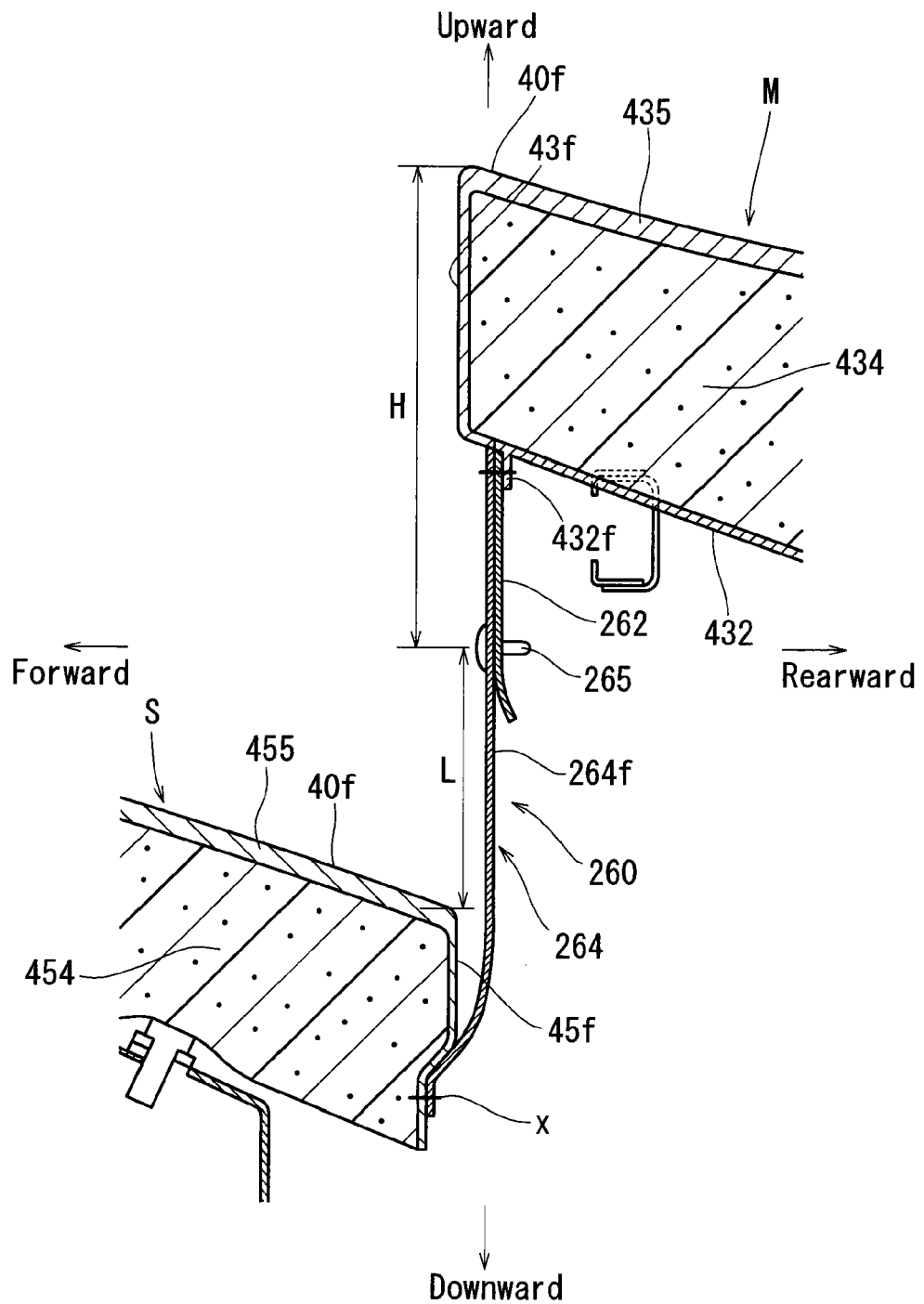
FIG. 21 is an enlarged view of a portion shown by XXI of FIG. 20.

A closing member 260 is positioned in the boundary position between the movable cushion portion M and the stationary cushion portion S and a boundary position between the movable cushion portion and a right side of the seat frame. The closing member 260 is a member capable of closing the open portion that is formed in the boundary portion when the movable cushion portion M is raised with respect to the stationary cushion portion S and the rest beyond the height of the boundary position-side surfaces 43f, 43e and 43b of the movable cushion portion M. As shown in FIGS. 19 to 21, the closing member 260 is composed of a resin plate portion 262 and a sheet member 264 that is made of the same material as the skin member 435 of the movable cushion portion M. The plate portion 262 is a rectangular tubular body that is formed along a peripheral edge of a lower surface of the movable cushion portion M in a fence-like fashion. As shown in, for example, FIG. 19, an upper end edge of the plate portion 262 is secured to a vertical rib 432f that is formed in the shaped steel plate 432 of the movable cushion portion M by clips, screws or other such devices (not shown). Further, a height of the plate portion 262 is set such that a distal end (a lower end) of the plate portion 262 cannot interfere with the base plate 52 and the rest of the cushion tilting mechanism 50 in a condition in which the movable cushion portion M is lowered to the sitting position.

The sheet member 264 is a member capable of covering the plate portion 262 and closing an open portion that can be formed between a lower end portion of the plate portion 262 and the stationary cushion portion S and the seat frame in a condition in which the movable cushion portion M is raised to the getting in/out position. As shown in, for example, FIGS. 19 and 21, a proximal end edge of the sheet member 264 is sewn on a lower end edge of the skin member 435 of the movable cushion portion M. Further, a portion in the vicinity of the proximal end edge of the sheet member 264 is secured to the vertical rib 432f of the shaped steel plate 432 of the movable cushion portion M together with an upper end edge of the plate portion 262. Further, a portion of the sheet member 264 covering the lower end portion of the plate portion 262 is secured to the lower end portion of the plate portion 262 by a plurality of securing pins 265 that are circumferentially positioned at equal intervals.

Further, each position of the securing pins 265 corresponds to a connecting position of the present invention in which the plate portion and the sheet member are connected to each other.

The sheet member 264 has a portion that can be hanged down below the lower end portion of the plate portion 262 when the movable cushion portion M is raised to the getting in/out position (FIGS. 20 and 21), which portion is slit vertically at four corners thereof. That is, the sheet member 264 is cut into a front side sheet portion 264f that is positioned below the front end boundary position-side surface 43f of the movable cushion portion M, a left side sheet portion (not shown) that is positioned below the left end boundary position-side surface 43e of the movable cushion portion M, a rear side sheet portion (not shown) that is positioned below the rear end boundary position-side surface 43b of the movable cushion portion M, and a right side sheet portion (not shown).

Further, as shown in, for example, FIGS. 19 and 21, a distal end portion of the front side sheet portion 264f of the sheet member 264 is sewn on a lower side of the skin member 455 in the front end boundary position-side surface 45f of the stationary cushion portion S.

Similarly, distal end portions of the left side sheet portion and the rear side sheet portion of the sheet member 264 are respectively sewn on the skin member 455 in the left end boundary position-side surface 45e of the stationary cushion portion S and the skin member 455 in the rear end boundary position-side surface 45b of the stationary cushion portion S. Further, a distal end portion of the sheet member 264 is connected to the right side seat frame.

Further, as shown in FIG. 21, a height H as measured from the seating surface 40f of the movable cushion portion M to a lower end edge of the plate portion 262 (i.e., the securing pins 265) is set to be larger than a height L as measured from a position of the securing pins 265 to the seating surface 40f of the stationary cushion portion S when the movable cushion portion M is positioned in the getting in/out position.

<Regarding Operation of the Vehicle Seat 10 According to the Present Embodiment>

First, an operation of the vehicle seat 10 will be described starting from a condition in which the occupant has completely got in the vehicle. In this condition, as shown in FIG. 15, the movable cushion portion M of the seat cushion 40 is maintained in the sitting position (the lower limit position), so that the seating surface 40f of the movable cushion portion M is continuous with the seating surface 40f of the stationary cushion portion S. Further, it is possible to adjust a longitudinal position of the seat main body 30 for physical constitution of the occupant by operating the longitudinal slide mechanism 20.

Next, when the occupant gets out of the vehicle, a seat belt is detached. Thereafter, a raising switch (not shown) is operated while the right door is opened. As a result, the cushion tilting mechanism 50 is actuated to raise the movable cushion portion M of the seat cushion 40, so that the buttocks of the occupant can be pushed up gradually.

Further, when the movable cushion portion M is raised, the plate portion 262 of the closing member 260 can also be raised together with the movable cushion portion M. As a result, the proximal end portion of the sheet member connected 264 connected to the plate portion 262 can also be raised, so that the sheet member 264 can be gradually unfolded. Thus, the boundary position-side surfaces 43f, 43e and 43b of the movable cushion portion M can be upwardly separated from the boundary position-side surfaces 45f, 45e and 45b of the stationary cushion portion S. Further, the open portion that is formed when a right end of the movable cushion portion M is separated from the right side of the seat frame can be closed by the closing member 260.

Further, in the condition in which the movable cushion portion M is raised to the getting in/out position, the cushion tilting mechanism 50 stops, so that the movable cushion portion M can be maintained in the getting in/out position. At the same time, as shown in FIGS. 20 and 21, the sheet member 264 of the closing member 260 can be completely unfolded.

When the occupant gets in the vehicle, after the occupant sits on the movable cushion portion M that is positioned in the getting in/out position, the occupant operates a lowering switch (not shown). As a result, the cushion tilting mechanism 50 can be actuated to lower the movable cushion portion M.

When the movable cushion portion is lowered, the plate portion 262 of the closing member 260 can be also lowered together with the movable cushion portion M, so that the proximal end portion of the sheet member 264 connected to the plate portion 262 can be also lowered. As a result, the sheet member 264 can be gradually loosened. When the lower end portion of the plate portion 262 is further lowered beyond the seating surface 40f of the stationary cushion portion S, the proximal end portion of the sheet member 264 is pulled downwards by the lower end portion of the plate portion 262, so that the sheet member 264 can be received within an inner side of the boundary position between the movable cushion portion M and the stationary cushion portion S and the boundary position between the movable cushion portion and the right side of the seat frame. Thus, in the condition in which the movable cushion portion M is lowered to the sitting position, the cushion tilting mechanism 50 stops, so that the movable cushion portion M is maintained in the sitting position. At the same time, as shown in FIGS. 18 and 19, the sheet member 264 of the closing member 260 can be completely received within the inner side of the boundary position. Further, the seating surface 40f of the movable cushion portion M can be continuous with the seating surface 40f of the stationary cushion portion S.

<Advantages of the Vehicle Seat 10 According to the Present Embodiment>

In the vehicle seat 10 according to the present embodiment, the closing member 260 can close the open portion formed between a lower end of the movable cushion portion M and the seating surface 40f of the stationary cushion portion S in the boundary position between the movable cushion portion M and the stationary cushion portion S when the movable cushion portion M is raised with respect to the stationary cushion portion S. Thus, even if the occupant inadvertently moves his/her hand toward the open portion between the movable cushion portion M and the stationary cushion portion S when the movable cushion portion M positioned in the getting in/out position is being lowered, the closing member 260 can prevent his/her hand from entering the open portion. Therefore, it is possible to avoid trouble, for example, to prevent his/her hand or the like from being caught between the movable cushion portion M and the stationary cushion portion S.

Further, since the closing member 260 is formed by the plate portion 262 and the deformable sheet member 264, it is possible to prevent the closing member 260 from being interfered with the stationary cushion portion S, the cushion tilting mechanism 50 and the rest with a simple construction.

Further, as shown in FIG. 21, the height dimension H as measured from the seating surface 40f of the movable cushion portion M to the connecting position in which the lower end edge of the plate portion 262 and the sheet member 264 are connected each other (a position of the securing pins 265) is set to be larger than the height dimension L as measured from the position of the securing pins 265 to the seating surface 40f of the stationary cushion portion S when the movable cushion portion M is positioned in the getting in/out position.

Thus, as the movable cushion portion M is lowered to the sitting position, the proximal end portion of the sheet member 264 is pulled downwardly by the lower end edge of the plate portion 262, so that the sheet member 264 can be received in a lower side of the seating surface 40f. That is, in the condition in which the movable cushion portion M is lowered to the sitting position, a portion of the sheet member 264 can be prevented from being left on the seating surfaces 40f of the movable cushion portion M and the stationary cushion portion S. Therefore, comfort of the seat cushion 40 can be avoided from being deteriorated. In addition, appearance of the seating surfaces 40f can be avoided from being deteriorated.

<Modified Form>

Figure 22:
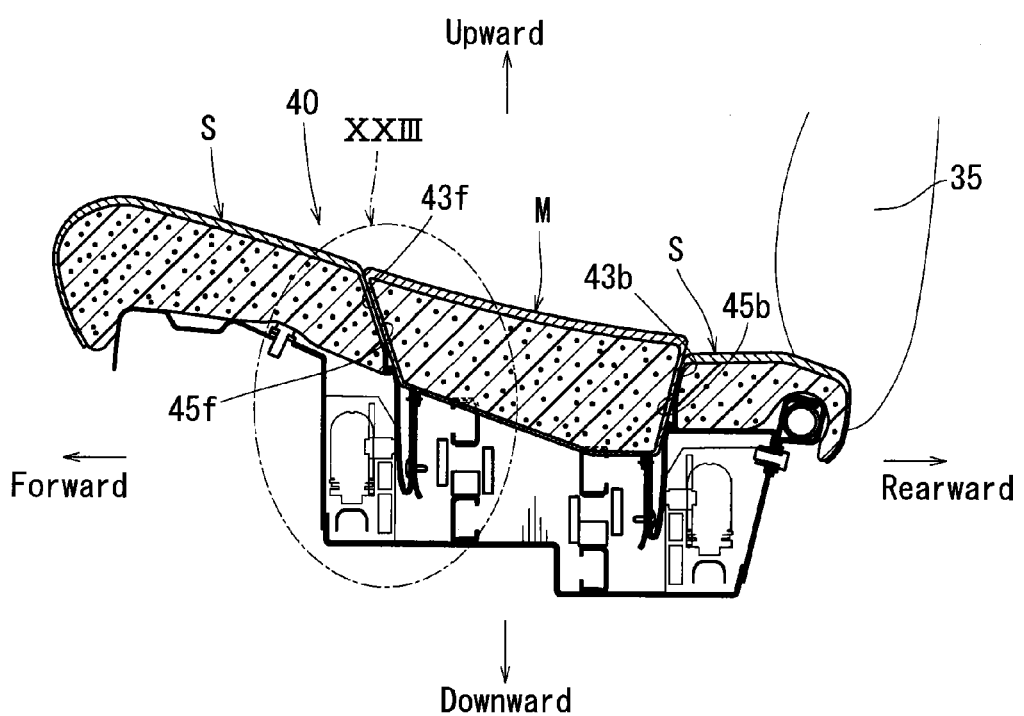
FIG. 22 is a full longitudinal sectional view of a vehicle seat according to a modified form.
Figure 23:
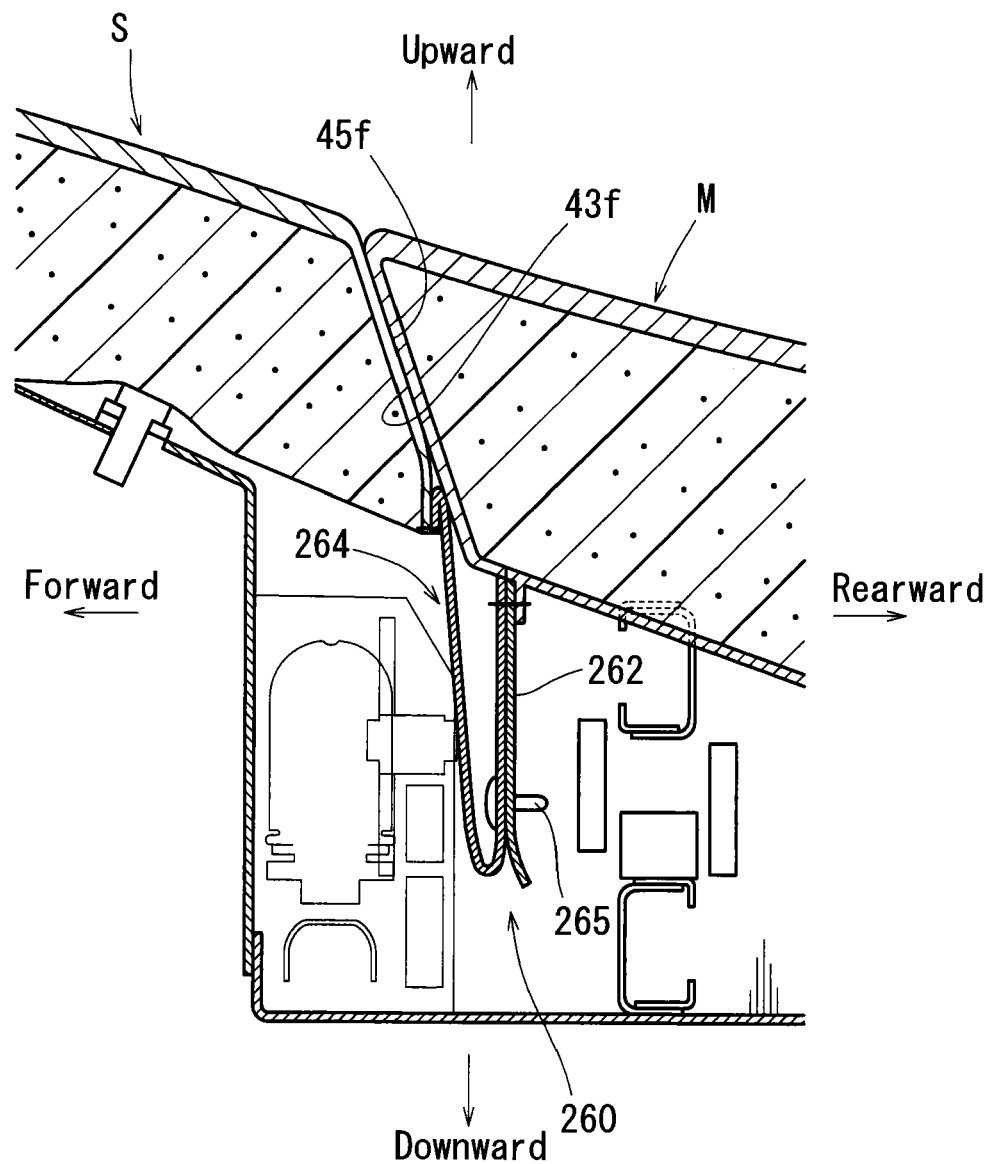
FIG. 23 is an enlarged view of a portion shown by XXIII of FIG. 22.
Figure 24:
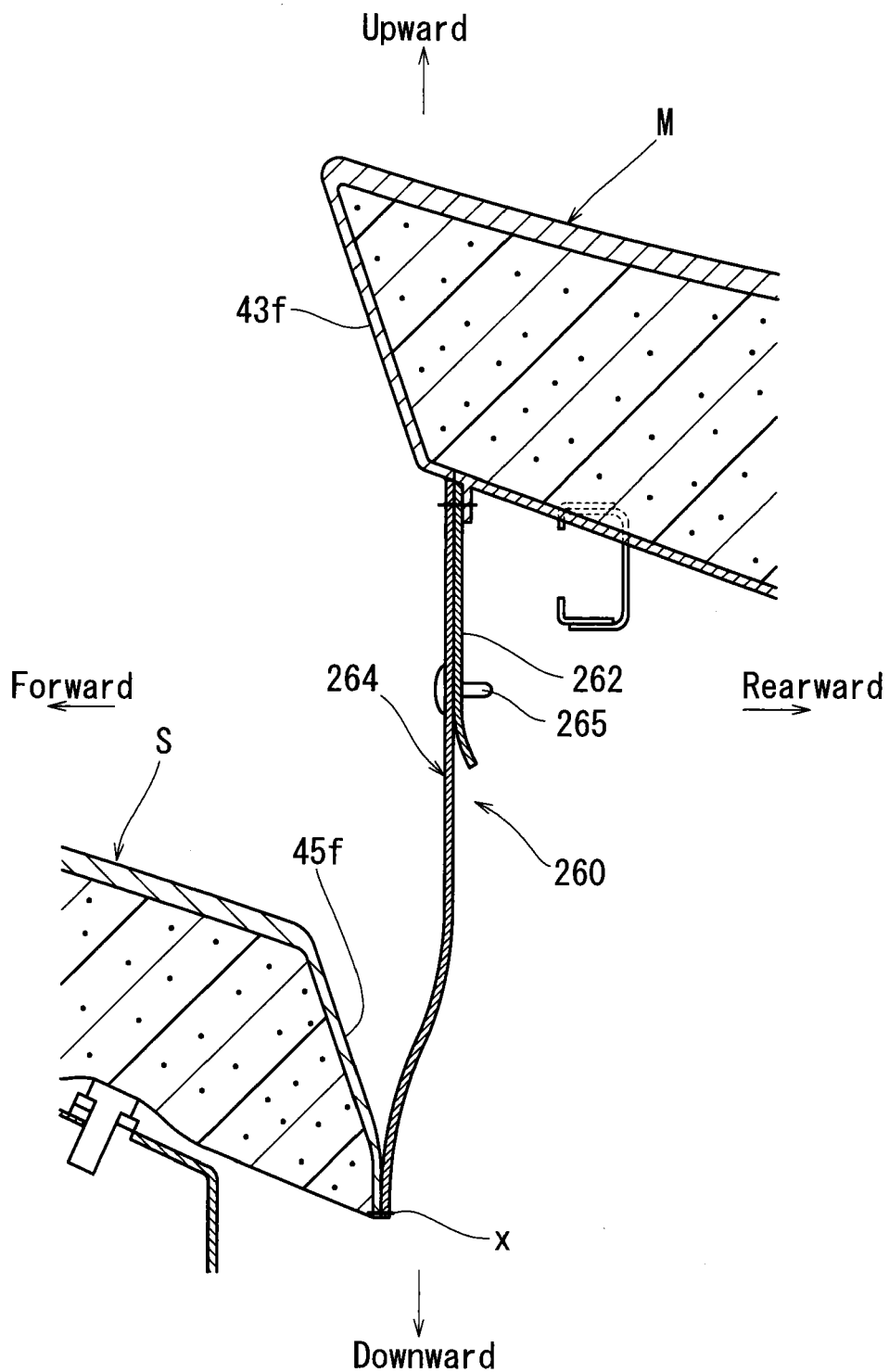
FIG. 24 is an enlarged longitudinal sectional view the vehicle seat, illustrating a condition in which a movable cushion portion is raised to a loading/unloading position.
Figure 25:
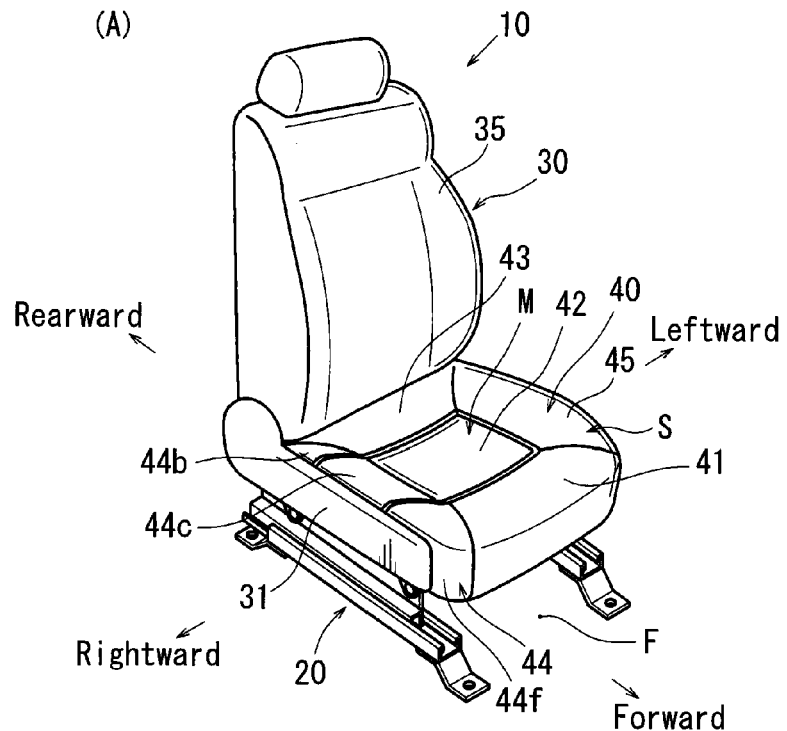
FIG. 25(A) is a schematic perspective view of a vehicle seat according to Embodiment 4 of the present invention, illustrating a condition in which the vehicle travels.
FIG. 25(B) is a schematic perspective view of the vehicle seat, illustrating a condition in which an occupant gets out of the vehicle.
Figure 25:
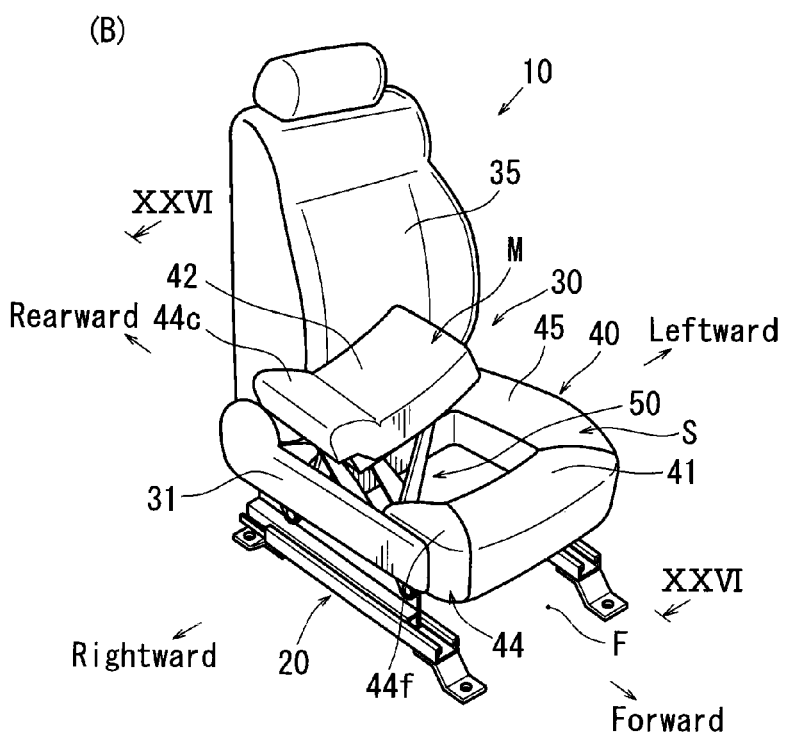

Further, the present invention is not limited to the embodiment described above and can be modified without departing from the scope of the present invention. For example, as shown in FIGS. 18 to 21, in the present embodiment, the boundary position-side surfaces 43f, 43e and 43b (which will be hereinafter referred to as the boundary position-side surface 430 of the movable cushion portion M and the boundary position-side surfaces 45f, 45e and 45b (which will be hereinafter referred to as the boundary position-side surface 45f) of the stationary cushion portion S are formed vertically. However, as shown in FIGS. 22 to 24, the boundary position-side surface 45f of the stationary cushion portion S and the boundary position-side surface 43f of the movable cushion portion M can respectively be formed as an upwardly inclined surface and a downwardly inclined surface, so that the boundary position-side surface 43f of the movable cushion portion M can surface-contact the boundary position-side surface 45f of the stationary cushion portion S in the sitting position.

Thus, when the occupant is sitting on the seat cushion 40 in a condition in which the movable cushion portion M is in the sitting position, his/her weight can be applied to the boundary position-side surface 45f of the stationary cushion portion S from the boundary position-side surface 43f of the movable cushion portion M. As a result, the boundary position-side surface 43f of the movable cushion portion M and the boundary position-side surface 45f of the stationary cushion portion S can completely surface-contact each other under the weight of the occupant, so as to prevent forming a clearance in the boundary position between the movable cushion portion M and the stationary cushion portion S. Therefore, comfort of the seat cushion 40 can be avoided from being deteriorated.

Further, as compared with the case in which the boundary position-side surfaces 45f and 43f of the stationary cushion portion S and the movable cushion portion M are formed vertically, a larger clearance can be formed between both of the boundary position-side surfaces 45f and 43f when the movable cushion portion M is raised and lowered, so that the sheet member 264 can be easily received under the seating surface 40f.

Further, as shown in FIG. 15, in the present embodiment, the movable cushion portion M is composed of the cushion central portion 412 and the central portion 417 of the right side portion 415 of the seat cushion 40, so that the boundary position between the movable cushion portion M and the stationary cushion portion S can have a U-shape configuration in plan view. However, the seat cushion 40 can be variously divided so as to change the boundary position between the movable cushion portion M and the stationary cushion portion S and to change an attaching position of the closing member 260.

Further, in the present embodiment, the closing member 260 is arranged to be extended to an area between the right end of the movable cushion portion M and the right side of the seat frame. However, the closing member 260 can be arranged to not be extended to such an area if no clearance cannot be formed between the right end of the movable cushion portion M and the seat frame cover 31c when the movable cushion portion M is raised.

Further, in the present embodiment, the sheet member 264 and the lower end edge of the plate portion 262 of the closing member 260 are connected to each other by the securing pins 265. However, the sheet member 264 can be connected to the lower end of the movable cushion portion M in an inner side of the plate portion 262 without connecting to the plate portion 262. According to this construction, the sheet member 264 can be pushed down (pulled) by the lower end of the plate portion 262 when the movable cushion portion M is lowered.

Further, in the present embodiment, the proximal end portion of the sheet member 264 of the closing member 260 is connected to the lower end portion of the plate portion 262 attached to the movable cushion portion M. Conversely, the distal end portion of the sheet member 264 is sewn on the boundary position-side surface 45f of the stationary cushion portion S. However, it is possible to provide a take-up device to the seat frame side, so that a distal end side of the sheet member 264 can be taken up and paid out.

Further, in the present embodiment, the present invention is applied to the driver's seat. However, the present invention is applicable to an assistant driver's seat or other such seats. Further, the structure of the cushion tilting mechanism 50 that functions to raise and lower the movable cushion portion M can be modified as appropriate.

The embodiment can be expressed as follows.

A vehicle seat includes a seat cushion and a closing member, wherein the seat cushion is composed of a stationary cushion portion and a movable cushion portion, wherein the movable cushion portion can be raised and lowered between a sitting position in which sitting surfaces of the movable cushion portion and the movable cushion portion are continuous with each other and a getting in/out position in which the movable cushion portion is positioned higher than the stationary cushion portion, and wherein the closing member is capable of closing an open portion that is formed between a lower end of the movable cushion portion and a seating surface of the stationary cushion portion in a boundary position between the movable cushion portion and the stationary cushion portion when the movable cushion portion is raised with respect to the stationary cushion portion.

In the vehicle seat, the closing member may be composed of a fence-like plate portion that is projected downwardly from a lower end of a boundary position-side surface of the movable cushion portion, and a deformable sheet member that is capable of closing the open portion between a lower end edge of the plate portion and a boundary position-side surface of the stationary cushion portion.

In the vehicle seat, the sheet member may be connected to the plate portion.

In the vehicle seat, a proximal end portion of the sheet member may be connected to a lower end edge of the plate portion attached to the movable cushion portion or is connected to the movable cushion portion in an inner side of the plate portion. A distal end portion of the sheet member may be connected to the boundary position-side surface of the stationary cushion portion, so that the sheet member can be unfolded as the movable cushion portion is raised. A height as measured from a seating surface of the movable cushion portion to a connecting position of the plate portion and the sheet member or to the lower end edge of the plate portion may be set to be larger than a height as measured from the connecting position or the lower end edge of the plate portion to the seating surface of the stationary cushion portion when the movable cushion portion is positioned in the getting in/out position.

In the vehicle seat, the boundary position-side surface of the stationary cushion portion may be inclined upwardly. The boundary position-side surface of the movable cushion portion may be inclined downwardly. The boundary position-side surface of the movable cushion portion may be capable of surface-contacting the boundary position-side surface of the stationary cushion portion when the movable cushion portion is positioned in the sitting position.

Embodiment 4

In the following, a vehicle seat according to Embodiment 4 of the present invention will be described with reference to FIGS. 25(A), 25(B) to 31.

<Conventional Construction>

As shown in FIG. 33, a conventional vehicle seat (Japanese Laid-Open Patent Publication No. 2007-237804) has a seat cushion 600 that is composed of a cushion front portion 602 and a cushion rear portion 603. A front end lower portion of the cushion front portion 602 is connected to a front end portion of a seat frame 606 via a hinge 605. Conversely, a rear end lower portion of the cushion front portion 602 is connected to a front end lower portion of the cushion rear portion 603 via a hinge 607. Further, the cushion rear portion 603 is supported by a damper 608 from below.

According to the above construction, when an occupant gets out of a vehicle, the seat cushion 600 can function to push up the buttocks of the occupant by a force of the damper 608. As a result, the occupant can easily stand up. Thus, the occupant can get out of the vehicle under his/her own power even if his/her strength is diminished.

However, in the vehicle seat described above, the seat cushion 600 pushes up the buttocks of the occupant regardless of a posture of the occupant when the occupant tries to stand up. Thus, when the occupant tries to stand up in a sitting-up position, the head of the occupant may contact a ceiling portion of a door opening of the vehicle.

It is an object of a vehicle seat of the present embodiment to prevent the head of the occupant from contacting the ceiling portion of the door opening when the occupant gets out of the vehicle.

<Outline of the Vehicle Seat 10>

Figure 30:
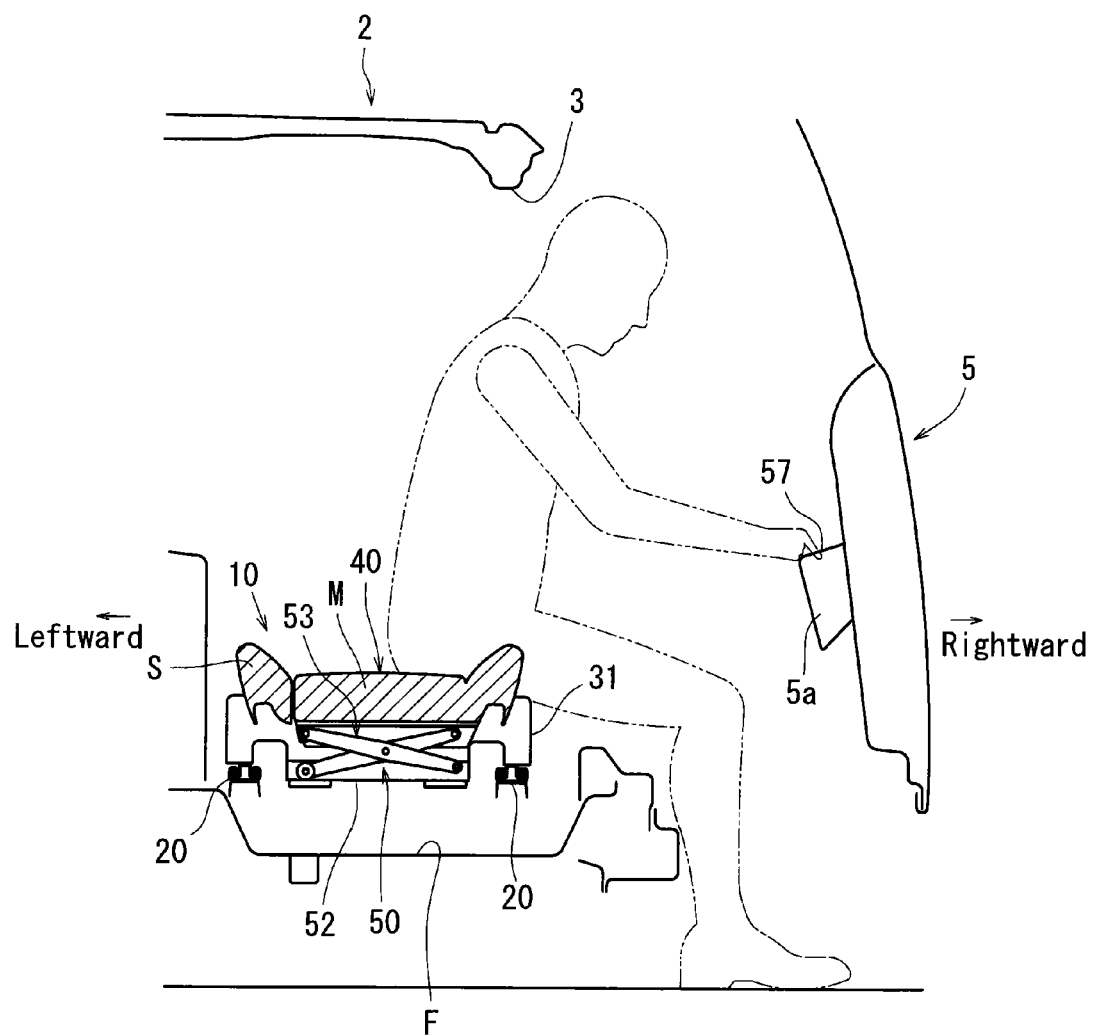
FIG. 30 is a rear view, illustrating an operation of the vehicle seat.
Figure 31:
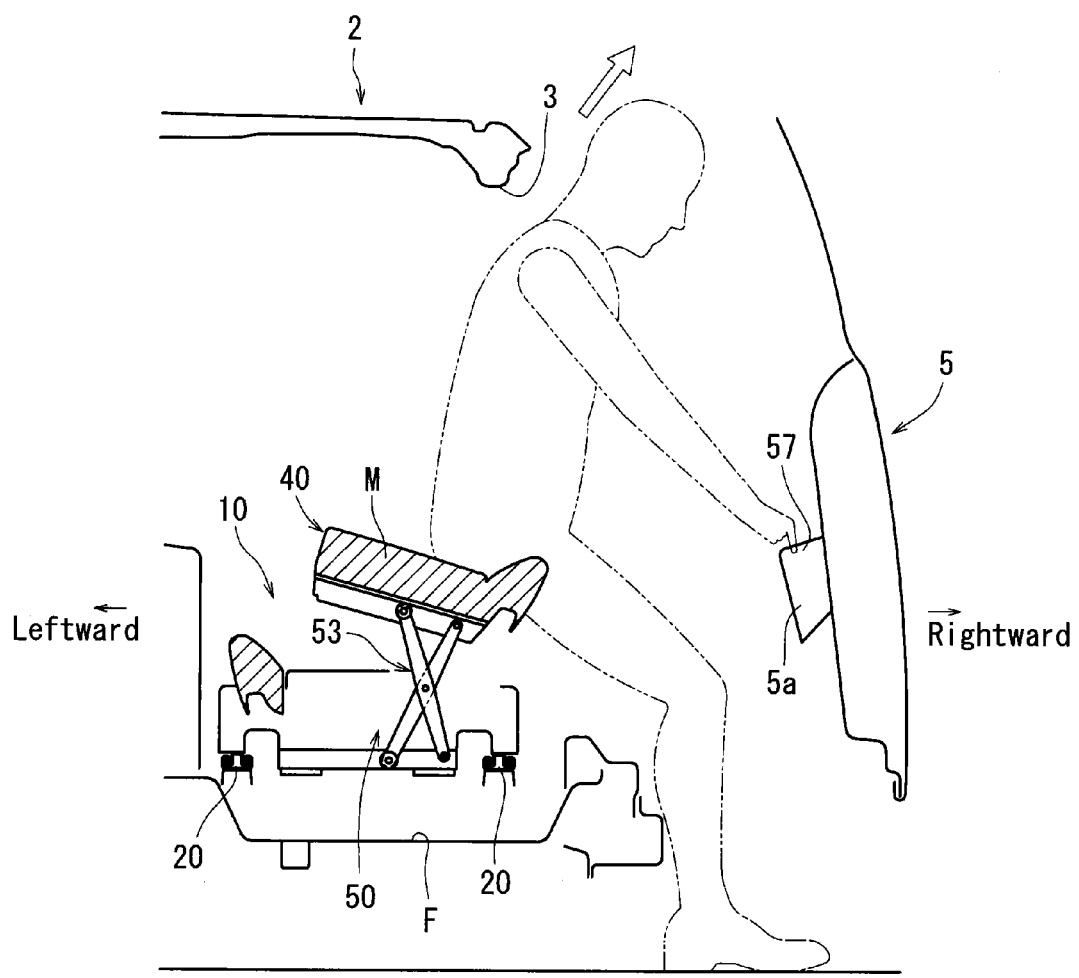
FIG. 31 is a rear view, illustrating the operation of the vehicle seat.
Figure 32:
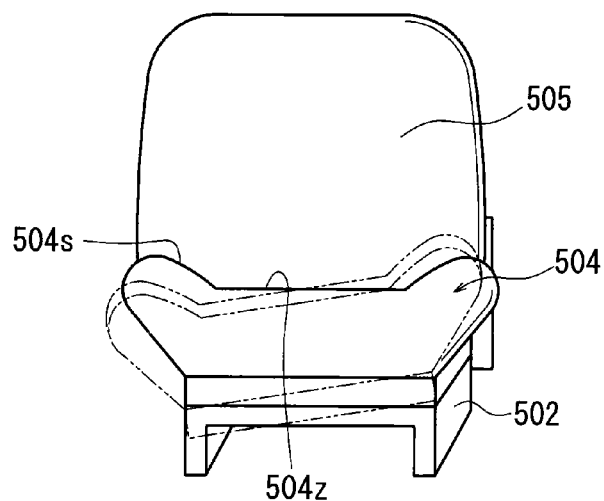
FIG. 32 is a schematic elevational view of a conventional vehicle seat.

As shown in FIGS. 30 and 31, a vehicle seat 10 according to the present embodiment is a seat (driver's seat or other such seats) of a vehicle 2 having a relatively low vehicle height, which seat is constructed to allow an occupant to sit thereon from right passing through a right door opening 3.

As shown in FIGS. 25(A) and 25(B), the vehicle seat 10 has a seat main body 30, and a longitudinal slide mechanism 20 that is configured to longitudinally slide the seat main body 30 with respect to a vehicle floor F.

The seat main body 30 is composed of a seat frame 31, a seat cushion 40 that is disposed on the seat frame 31, a seat back 35 that is vertically rotatably connected to a rear end portion of the seat frame 31, and a cushion tilting mechanism 50 that is capable of raising a portion M (42, 44c) of the seat cushion 40 with respect to the seat frame 31 and the rest.

<Regarding the Seat Cushion 40>

As shown in FIG. 25(A), the seat cushion 40 has a cushion front portion 41, a cushion central portion 42 and a cushion rear portion 43 in order from a front side of a central portion thereof. Further, the seat cushion 40 has a right side portion 44 that is provided to a right side (a side facing the door opening (not shown)) of the central portion, and a left side portion 45 that is provided to a left side (a side facing a center of a vehicle interior) of the central portion.

The cushion front portion 41 is a portion that mainly supports the thighs of the sitting occupant, and is formed to be gently inclined such that a seating surface thereof can be low in a rear side thereof. The cushion central portion 42 is a portion that mainly supports the buttocks of the occupant, and is formed such that a seating surface thereof can be positioned at a lowest level and be flattened. The cushion rear portion 43 is formed to be gently inclined so as to be low in a front side thereof.

The right side portion 44 is inclined such that a seating surface thereof can be heightened in a right side (a side facing the door opening), and is divided into a front portion 44f, a central portion 44c and a back portion 44b. The left side portion 45 is inclined such that a seating surface thereof can be heightened in a left side (a side facing the center of the vehicle interior).

The cushion central portion 42 and the central portion 44c of the right side portion 44 of the seat cushion 40 are integrated with each other and are separated from remaining portions of the seat cushion 40, i.e., the front portion 44f and the back portion 44b of the right side portion 44, the cushion front portion 41, the left side portion 45 and the cushion rear portion 43. Further, the front portion 44f and the back portion 44b of the right side portion 44, the cushion front portion 41, the left side portion 45 and the cushion rear portion 43 of the seat cushion 40 are secured to the seat frame 31. Thus, in the following, the front portion 44f and the back portion 44b of the right side portion 44, the cushion front portion 41, the left side portion 45 and the cushion rear portion 43 of the seat cushion 40 will be referred to as a stationary cushion portion S.

Further, as shown in FIG. 25(B), the cushion central portion 42 and the central portion 44c of the right side portion 44 of the seat cushion 40 can be raised and lowered with respect to the stationary cushion portion S of the seat cushion 40 and the seat frame 31 due to the action of a cushion tilting mechanism 50 (which will be hereinafter described). Thus, in the following, the cushion central portion 42 and the central portion 44c of the right side portion 44 of the seat cushion 40 will be referred to as a movable cushion portion M of the seat cushion 40.

<Regarding the Cushion Tilting Mechanism 50>

The cushion tilting mechanism 50 is a mechanism that is capable of raising the movable cushion portion M of the seat cushion 40 with respect to the seat frame 31 and the stationary cushion portion S of the seat cushion 40 and is capable of tilting the same so as to be low in a side facing the door opening and high in a side facing the vehicle interior. As shown in the longitudinal sectional view of FIG. 26, the cushion tilting mechanism 50 is composed of a base plate 52 suspended from front and rear portion of the seat frame 31, a pair of front and rear cross links 53 (FIG. 27) disposed on the base plate 52, and a drive portion (not shown) that is capable of moving the cross links 53.

Figure 26:
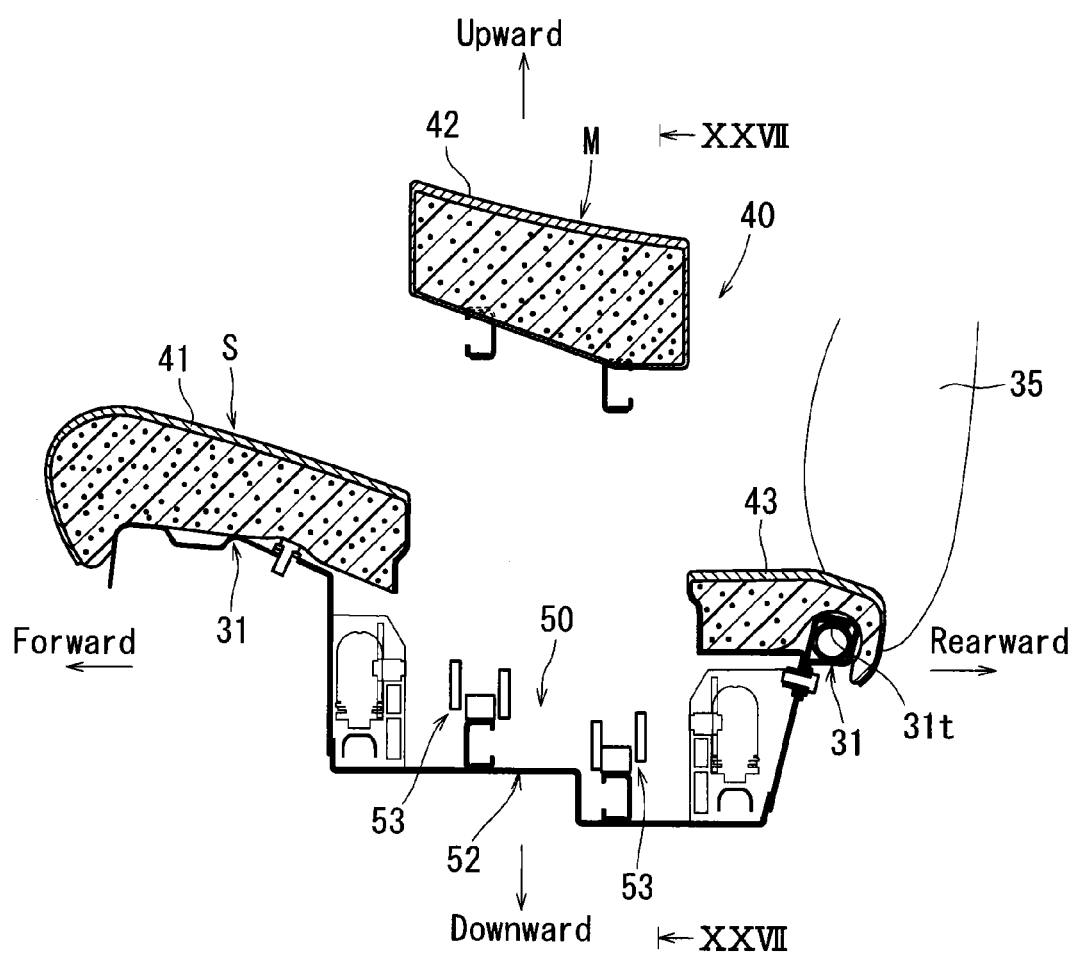
FIG. 26 is a longitudinal sectional view of the vehicle seat, illustrating a condition in which the occupant gets out of the vehicle (a sectional view taken along line XXVI-XXVI of FIG. 25(B)

As shown in FIG. 26, the base plate 52 of the cushion tilting mechanism 50 is bent into a substantially U-shape in a side view. A front upper end portion of the base plate 52 is bolted on the front portion of the seat frame 31. Conversely, a rear upper end portion of the base plate 52 is connected to a rear support pipe 31t that is positioned in the rear portion of the seat frame 31 so as to extend in a width direction.

The pair of front and rear cross links 53 of the cushion tilting mechanism 50 are constructed to support the movable cushion portion M of the seat cushion 40 at front and rear portions thereof, so as to raise and lower and tilt the movable cushion portion M.

Figure 27:
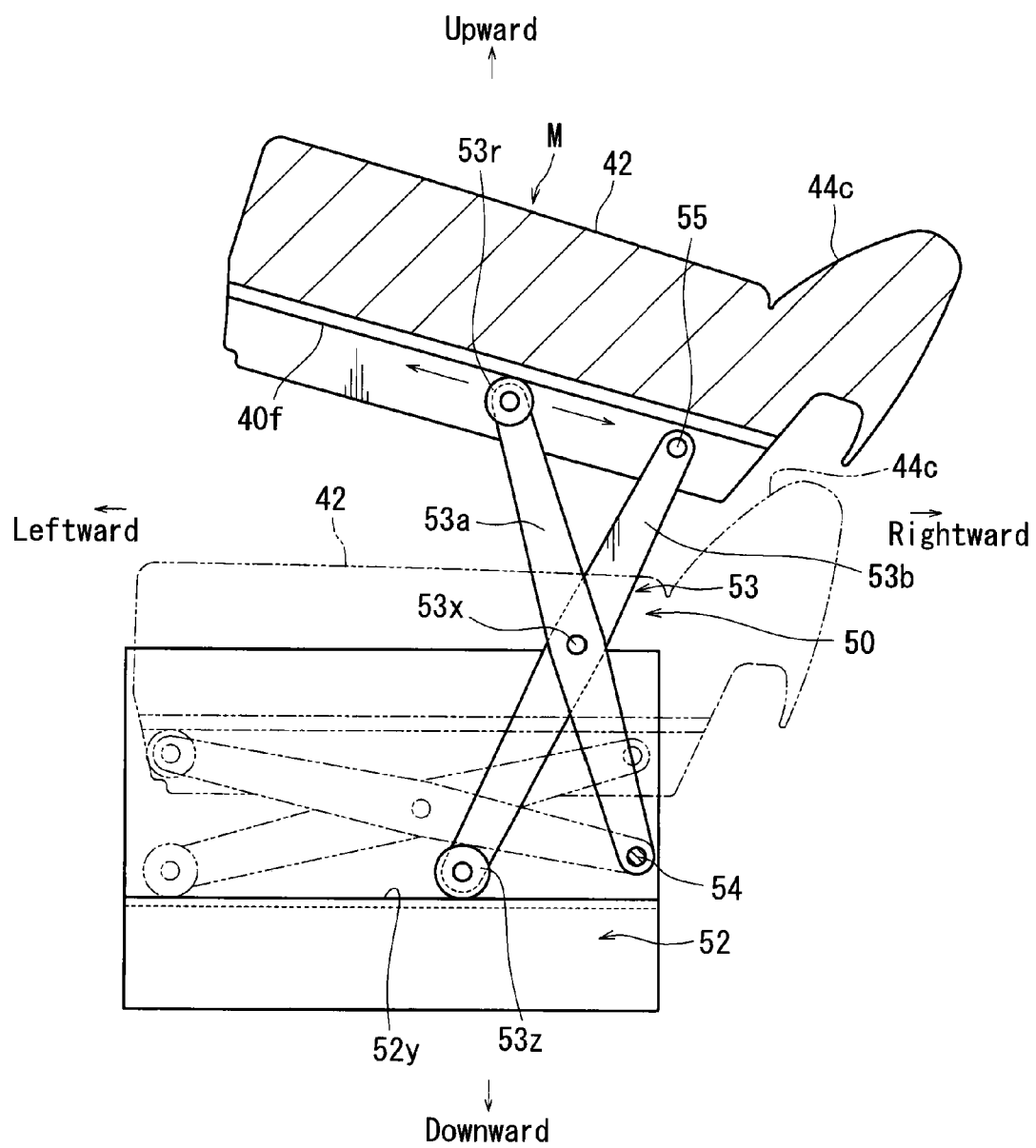
FIG. 27 is an elevational view of a cushion tilting mechanism of the vehicle seat (a view that is viewed from line XXVII-XXVII of FIG. 26)

As shown in FIG. 27, each of the cross links 53 is constructed of a linear first link 53a and a linear second link 53b. The two links 53a and 53b are vertically rotatably connected to each other by a center connection pin 53x at portions in the vicinity of the centers thereof. Further, a proximal end portion (a lower end portion) of the first link 53a is vertically rotatably connected to a receiving portion (not shown) that is formed in a right end of a bottom portion of the base plate 52 via a lower end connection pin 54. Conversely, a roller 53r is attached to a distal end portion (an upper end portion) of the first link 53a. The roller 53r is capable of rolling over along one of rail portions 40f that are formed in a lower side of the movable cushion portion M of the seat cushion 40 so as to be extended laterally.

A proximal end portion (an upper end portion) of the second link 53b is vertically rotatably connected to the rail portion 40f formed in the movable cushion portion M of the seat cushion 40 by an upper end connection pin 55 at a portion in the vicinity of a right end thereof. Conversely, a roller 53z is attached to a distal end portion (a lower end portion) of the second link 53b. The roller 53z is capable of laterally rolling over along a bottom portion 52y of the base plate 52.

The drive portion (not shown) of the cushion tilting mechanism 50 is a portion that is capable of moving the first link 53a and the second link 53b of each of the cross links 53 in a rising direction or a folding direction using a rotational force of a motor 56 (FIG. 28), so as to raise, lower and tilt the movable cushion portion M. That is, when the motor 56 is rotated in a normal rotational direction, the drive portion can be actuated to raise the cross links 53. As a result, the movable cushion portion M of the seat cushion 40 is raised from a sitting position, and is inclined toward the door opening 3 by a predetermined angle as the movable cushion portion M is raised to an upper limit position. Conversely, when the motor 56 is rotated in a reverse rotational direction, the drive portion can be actuated to fold the cross links 53. As a result, the movable cushion portion M of the seat cushion 40 can be lowered to be returned to an initial sitting position.

Figure 28:
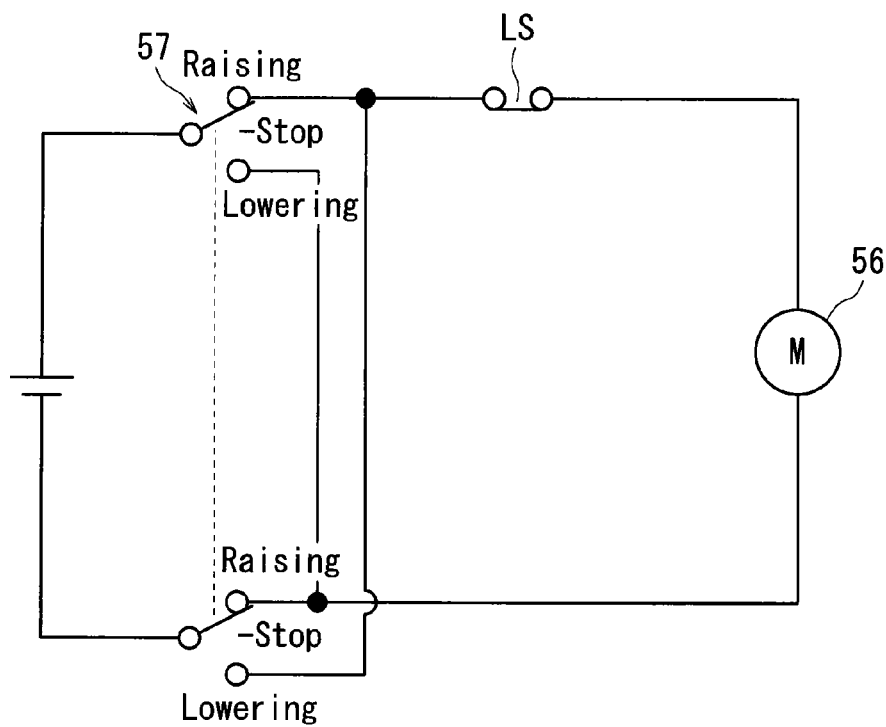
FIG. 28 is a schematic diagram illustrating an electric circuit of a motor as a drive source of a cushion raising/lowering mechanism.

The motor 56 is constructed to be driven by an electric circuit shown in FIG. 28.

That is, the electric circuit is mainly composed of an operating switch 57 that can be operated by the occupant, a door switch LS that is capable of being turned on when a door 5 facing the driver's seat is rotated horizontally in an opening direction beyond a predetermined angle (e.g., approximately 30 degrees). The seat cushion 40 is also provided with a body weight detection sensor or other such sensors, so that a turn-on angle of the door switch LS can be adjusted depending on the body weight.

Figure 29:
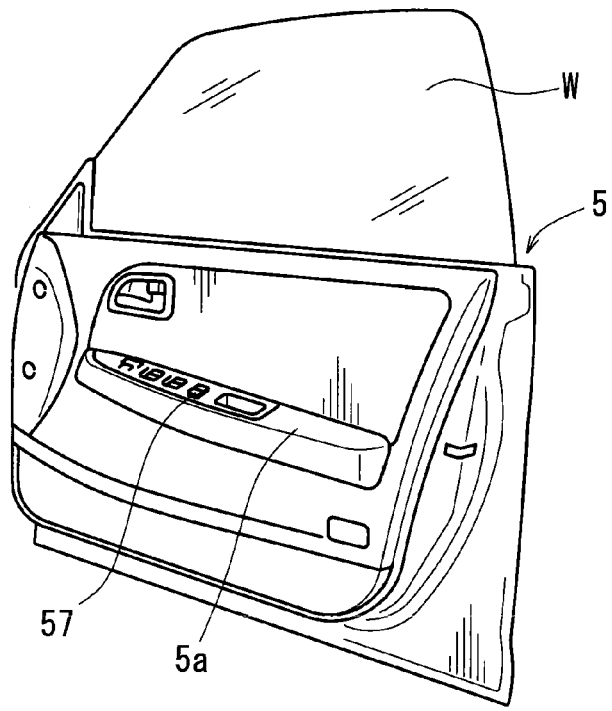
FIG. 29 is a perspective view of a door to which an operation switch of the motor is attached.

As shown in FIG. 29, the operating switch 57 is attached to a front portion of an upper surface of an armrest 5a that is attached to an interior side of the door 5 so as to be positioned under a window W. Therefore, when the occupant gets in and out of the vehicle, the occupant can touch the operating switch 57 with the head bent forward after the occupant can project the upper portion of his/her body out of the door opening 3 while the door 5 is horizontally rotated in the opening direction by the predetermined angle (approximately 30 degrees).

As shown in FIG. 28, the operating switch 57 is capable of being switched to the three positions of a raising position, a lowering position and a stop position. Further, the operating switch 57 may preferably be biased to be constantly maintained in the stop position by, for example, a spring force. In the stop position, a raising-side contact and a lowering-side contact are respectively opened (an OFF state). In this condition, as shown in FIG. 28, when the operating switch 57 is depressed toward the raising position against the spring force, the raising-side contact is closed (a raising-side ON state) while it is being depressed. When the operating switch 57 is depressed toward the lowering position against the spring force, the lowering-side contact is closed (a lowering-side ON state) while it is being depressed.

As shown in FIG. 28, the operating switch 57 is connected to the motor 56 via the door switch LS. Therefore, when the door 5 facing the driver's seat is opened beyond the predetermined angle (e.g., approximately 30 degrees) and the door switch LS is turned on, and when the operating switch 57 is simultaneously positioned in the raising-side ON state or the lowering-side ON state, electricity is supplied to the motor 56.

Even when the operating switch 57 is in the raising-side ON state or in the lowering-side ON state, no electricity is supplied to the motor 56 unless the door 5 is opened beyond the predetermined angle (e.g., approximately 30 degrees), because the door switch LS is turned off.

<Operation of the Vehicle Seat 10 According to the Present Embodiment>

As shown in FIG. 30, when the occupant sitting on the vehicle seat 10 (the driver's seat) gets out of the vehicle, the door 5 is first opened. Thereafter, the occupant directs his/her body to the right and put his/her legs out of the vehicle via the door opening 3. In this condition, the door 5 is rotated horizontally by approximately 30 degrees or more, so as to be maintained in a half-open condition. Next, the occupant depresses the operating switch 57 toward the raising position while the upper portion of his/her body is projected out of the door opening 3. As described above, because the operating switch 57 is attached to the upper surface of the armrest 5a of the door 5, the occupant has a forwardly tilted posture when the operating switch 57 is operated. Thus, when the operating switch 57 is depressed toward the raising position, electricity is supplied to the motor 56 of the cushion tilting mechanism 50, so that the motor 56 can rotate in the normal rotational direction. As a result, the cross links 53 is operated in the rising direction, so that the movable cushion portion M of the seat cushion 40 can be raised. Thus, the buttocks of the occupant can be pushed up by the movable cushion portion M. At this time, because the occupant is depressing the operating switch 57 with the head bent forward, even if the buttocks of the occupant are pushed up by the movable cushion portion M (FIG. 31), the head of the occupant can be prevented from contacting a ceiling portion of the door opening 3. Further, as shown in FIG. 31, in a condition in which the movable cushion portion M of the seat cushion 40 is raised to the upper limit position and is inclined such that the side facing the door opening 3 can be low and that the side facing the vehicle interior can be high, the motor 56 stops. In this condition, because the occupant is in a half-crouching position, the knees of the occupant can be extended, so that the occupant can easily stand up. As a result, the occupant can get out of the vehicle under his/her own power even if his/her strength is diminished.

Further, in order to lower the movable cushion portion M to the initial sitting position in this condition, the operating switch 57 is depressed toward the lowering position while the door 5 is left open.

<Advantages of the Vehicle Seat 10 According to the Present Embodiment>

In the vehicle seat 10 according to the present embodiment, the operating switch 57 of the cushion tilting mechanism 50 is positioned in the interior side of the door 5 that is opened when the occupant gets out of the vehicle, and is arranged such that the occupant can touch the same with the head bent forward in a condition in which the door 5 is horizontally rotated to a desired position in the opening direction. Therefore, when the occupant gets out of the vehicle, the occupant can operate the operating switch 57 in the forwardly tilted posture while the occupant projects the upper portion of his/her body out of the vehicle after the door 5 is opened. When the occupant operates the operating switch 57, the cushion tilting mechanism 50 is actuated, so that the movable cushion portion M of the seat cushion 40 can be raised. Thus, because the buttocks of the occupant can be pushed up by the movable cushion portion M while the occupant is in the forwardly tilted posture, the occupant can stand up in the forwardly tilted posture. As a result, the head of the occupant can be avoided from contacting the ceiling portion of the door opening 3.

Further, the operating switch 57 can be turned on only when it is operated. In addition, electricity can be supplied to the motor 56 only when the operating switch 57 is turned on. Therefore, the occupant can maintain the forwardly tilted posture by constantly operating the operating switch 57 while the movable cushion portion M is raised. As a result, the head of the occupant does not easily contact the ceiling portion of the door opening 3.

Further, in a condition in which the door 5 is not rotated to the desired position in the opening direction, even when the operating switch 57 is turned on, no electricity is supplied to the motor 56. Therefore, even if the occupant inadvertently touches the operating switch 57 during driving, the movable cushion portion M can never be raised.

<Modified Form>

Further, the present invention is not limited to the embodiment described above and can be modified without departing from the scope of the present invention. For example, in the present embodiment, exemplified is the cushion tilting mechanism 50 that is capable of raising the movable cushion portion M of the seat cushion 40 and tilting the same such that the side facing the door opening 3 can be low and that the side facing the vehicle interior can be high. However, it is possible to provide a construction in which the seat cushion 40 is horizontally rotated from a forwardly directed position so as to direct the door opening 3 and in which the movable cushion portion M of the seat cushion 40 is tilted such that a front side (a side facing the door opening 3) can be low while it is raised.

Further, in the present embodiment, the operating switch 57 is attached to the armrest 5a of the door 5. However, the operating switch 57 can be positioned in the vicinity of a opening lever of the door 5.

Further, in the present embodiment, the seat cushion 40 is composed of the movable cushion portion M and the stationary cushion portion S, so that the movable cushion portion M can be raised and lowered by the cushion tilting mechanism 50. However, for example, the seat cushion 40 can be constructed such that the whole seat cushion 40 can be raised and lowered by the cushion tilting mechanism 50.

Further, the cushion tilting mechanism 50 using the cross links 53 is exemplified. However, it is possible to provide a cushion tilting mechanism using a ball screw/nut mechanism, an air cylinder or other such mechanisms instead of the cross links 53.

Further, a sensor that is capable of detecting approach of the head of the occupant, e.g., a photoelectric sensor, and a light source can be positioned in the ceiling portion of the door opening 3, so that the cushion tilting mechanism 50 can stop rising motion of the movable cushion portion M when the photoelectric sensor detects that the head of the occupant shuts off light in the vicinity of the ceiling portion.

Further, in the example, the vehicle seat 10 is the driver's seat, and the operating switch 57 is attached to the door 5 facing the driver's seat. However, the vehicle seat 10 of the present invention may be a seat other than the driver's seat.

The embodiment can be expressed as follows.

A vehicle seat has a seat cushion, and a cushion tilting mechanism that is configured to raise at least a portion of the seat cushion, wherein an occupant sitting on the seat cushion is capable of being applied with a pushing-up force due to rising motion of the seat cushion when the occupant gets out of a vehicle, wherein an operating switch of a drive portion of the cushion tilting mechanism is positioned in an interior side of the door that is opened when the occupant gets out of the vehicle, so as to be positioned under a window, and wherein when the operating switch is operated while the door is opened, the drive portion can be driven.

In the vehicle seat, the drive portion may have a motor. The operating switch can be turned on only when the operating switch is operated. Electricity can be supplied to the motor only when the operating switch is turned on.

In the vehicle seat, in a condition in which the door is not rotated to a desired position in an opening direction, even when the operating switch is turned on, no electricity can be supplied to the motor.

DESCRIPTION OF SYMBOLS

20 . . . longitudinal slide mechanism
25 . . . raising/lowering mechanism
31 . . . seat frame (support member)
35 . . . seat back
40 . . . seat cushion
41 . . . cushion front portion
42 . . . cushion central portion
44 . . . right side portion
44c . . . central portion (side support portion)
50 . . . cushion tilting mechanism
53 . . . cross link
53a . . . first link
53b . . . second link
56 . . . drive portion
60 . . . cushion tilting mechanism
60c . . . connection mechanism
60z . . . drive portion
F . . . vehicle floor
M . . . movable cushion portion
S . . . stationary cushion portion

The invention claimed is:

1. A vehicle seat, comprising:
a seat cushion that is composed of a stationary cushion portion and a movable cushion portion, in which the movable cushion portion is capable of being tilted so as to be low in a side facing a door opening while being raised with respect to the stationary cushion portion, and
a cushion tilting mechanism that is disposed under the seat cushion and is configured to tilt the movable cushion portion while raising the same with respect to the stationary cushion portion,
wherein the seat cushion has a central portion that is longitudinally divided into a plurality of portions, and side portions that are positioned in right and left sides of the central portion and are formed to be higher than the central portion,
wherein the movable cushion portion is composed of a cushion central portion of the central portion of the seat cushion and a central portion of the side portion that is positioned in the side facing a door opening,
wherein the stationary cushion portion is composed of a cushion front portion and a cushion rear portion of the central portion of the seat cushion, a front portion and a back portion of the side portion that is positioned in the side facing a door opening, and the side portion that is positioned in a side opposite to the side facing a door opening, and
wherein the movable cushion portion is integrally formed and is separated from the stationary cushion portion.

2. The vehicle seat as defined in claim 1, wherein the cushion tilting mechanism has a first link that is rotatable from a folded position to a raised position under the seat cushion, a second link that is positioned to intersect with the first link and is connected thereto so as to be substantially symmetrically movable with the first link, and a drive portion that is capable of rotating the first and second links from the folded position to the raised position, and
wherein when the first link and the second link is rotated from the folded position to the raised position, the movable cushion portion of the seat cushion can be tilted so as to be low in the side facing a door opening while being raised with respect to the stationary cushion portion.

3. The vehicle seat as defined in claim 1, wherein the cushion tilting mechanism has a connection mechanism that is capable of vertically rotatably connecting the movable cushion portion of the seat cushion to a support member, and a drive portion that is capable of vertically rotating the movable cushion portion about a rotation center of the connection mechanism, and
wherein when the movable cushion portion rotates upwardly about the rotation center of the connection mechanism, the movable cushion portion can be tilted so as to be low in the side facing a door opening while being raised with respect to the stationary cushion portion.

4. The vehicle seat as defined in claim 1 further comprising a longitudinal slide mechanism that is configured to slide a seat frame supporting the seat cushion along a vehicle floor, and a frame raising/lowering mechanism that is configured to raise and lower the seat frame with respect to the vehicle floor.

5. The vehicle seat as defined in claim 1, wherein when a raising switch is operated while a door of a door opening is opened, the cushion tilting mechanism can be driven in a direction in which the movable cushion portion of the seat cushion can be raised.

6. The vehicle seat as defined in claim 1, wherein the cushion tilting mechanism has a drive mechanism that is configured to horizontally reciprocate a movable portion under the seat cushion, and
a link mechanism that is configured such that when the movable portion moves in a predetermined direction due to the action of the drive mechanism, the movable cushion portion of the seat cushion can be tilted according to an amount of motion of the movable portion.

7. The vehicle seat as defined in claim 6 further including a rotation mechanism that is configured to horizontally rotate the seat cushion toward a door opening of a vehicle.

8. The vehicle seat as defined in claim 6, wherein the link mechanism is configured to tilt the movable cushion portion of the seat cushion toward a door opening of a vehicle, and
further including a slide mechanism that is configured to slide the movable cushion portion, the link mechanism and the drive mechanism horizontally toward the door opening of the vehicle.

9. The vehicle seat as defined in claim 6, wherein the link mechanism is formed along the movable cushion portion of the seat cushion, and has a cushion support member that is integrated with the movable cushion portion, a horizontal support portion that supports a midway portion of the cushion support member horizontally as a center of vertical rotation thereof, and a link that vertically rotatably connects one end of the cushion support member nearer to the horizontal support portion and the movable portion of the drive mechanism.

10. The vehicle seat as defined in claim 6, wherein the link mechanism is formed along the movable cushion portion of the seat cushion, and has a cushion support member that is integrated with the movable cushion portion, a horizontal support portion that supports one end of the cushion support member horizontally as a center of vertical rotation thereof, and a link that vertically rotatably connects a midway portion of the cushion support member and the movable portion of the drive mechanism.

11. The vehicle seat as defined in claim 1 further comprising a closing Member that is capable of closing an open portion that is formed between a lower end of the movable cushion portion and a seating surface of the stationary cushion portion in a boundary position between the movable cushion portion and the stationary cushion portion when the movable cushion portion is raised with respect to the stationary cushion portion.

12. The vehicle seat as defined in claim 11, wherein the closing member is composed of a fence-like plate portion that is projected downwardly from a lower end of a boundary position-side surface of the movable cushion portion, and a deformable sheet member that is capable of closing the open portion between a lower end edge of the plate portion and a boundary position-side surface of the stationary cushion portion.

13. The vehicle seat as defined in claim 12, wherein the sheet member is connected to the plate portion.

14. The vehicle seat as defined in claim 12, wherein a proximal end portion of the sheet member is connected to a lower end edge of the plate portion attached to the movable cushion portion or is connected to the movable cushion portion in an inner side of the plate portion, wherein a distal end portion of the sheet member is connected to the boundary position-side surface of the stationary cushion portion, so that the sheet member can be unfolded as the movable cushion portion is raised, and wherein a height as measured from a seating surface of the movable cushion portion to a connecting position of the plate portion and the sheet member or to the lower end edge of the plate portion is set to be larger than a height as measured from the connecting position or the lower end edge of the plate portion to the seating surface of the stationary cushion portion when the movable cushion portion is positioned in a getting in/out position.

15. The vehicle seat as defined in claim 11, wherein the boundary position-side surface of the stationary cushion portion is inclined upwardly, wherein the boundary position-side surface of the movable cushion portion is inclined downwardly, and wherein the boundary position-side surface of the movable cushion portion is capable of surface-contacting the boundary position-side surface of the stationary cushion portion when the movable cushion portion is positioned in the sitting position.

16. The vehicle seat as defined in claim 1, wherein an operating switch of a drive portion of the cushion tilting mechanism is positioned in an interior side of the door that is opened when the occupant gets out of the vehicle, so as to be positioned under a window, and wherein the drive portion can be driven when the operating switch is operated while the door is opened.

17. The vehicle seat as defined in claim 16, wherein the drive portion has a motor, wherein the operating switch can be turned on only when the operating switch is operated, and wherein electricity can be supplied to the motor only when the operating switch is turned on.

18. The vehicle seat as defined in claim 16, wherein in a condition in which the door is not rotated to a desired position in an opening direction, even when the operating switch is turned on, no electricity is supplied to the motor.

* * * * *